United States Patent
Conrad

(10) Patent No.: US 10,842,330 B2
(45) Date of Patent: Nov. 24, 2020

(54) HANDHELD SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 11 days.

(21) Appl. No.: 15/642,824

(22) Filed: Jul. 6, 2017

(65) Prior Publication Data

US 2019/0008340 A1 Jan. 10, 2019

(51) Int. Cl.
*A47L 5/24* (2006.01)
*A47L 9/32* (2006.01)
(Continued)

(52) U.S. Cl.
CPC ............ *A47L 5/24* (2013.01); *A47L 9/106* (2013.01); *A47L 9/122* (2013.01); *A47L 9/127* (2013.01); *A47L 9/1608* (2013.01); *A47L 9/1625* (2013.01); *A47L 9/1641* (2013.01); *A47L 9/1666* (2013.01); *A47L 9/1683* (2013.01); *A47L 9/246* (2013.01); *A47L 9/2842* (2013.01); *A47L 9/2857* (2013.01); *A47L 9/2878* (2013.01);
(Continued)

(58) Field of Classification Search
CPC .......... A47L 5/24; A47L 9/322; A47L 9/2878; A47L 9/2884; A47L 9/1608; A47L 9/1625; A47L 9/1641
See application file for complete search history.

(56) References Cited

U.S. PATENT DOCUMENTS 911,258 A 2/1909 Gotthilf
1,600,762 A 9/1926 Hawley
(Continued)

FOREIGN PATENT DOCUMENTS

AU 112778 A 4/1940
AU 2008200579 A1 8/2008
(Continued)

OTHER PUBLICATIONS

English machine translation of WO2016173466A1 published on Nov. 3, 2016.
(Continued)

*Primary Examiner* — Andrew A Horton
(74) *Attorney, Agent, or Firm* — Philip C. Mendes da Costa; Bereskin & Parr LLP

(57) ABSTRACT

A hand vacuum cleaner has an air flow path extending from a dirty air inlet to a clean air outlet. A handle has a hand grip portion. The handle upwardly and forwardly when the upper end of the hand vacuum cleaner is positioned above the lower end of the hand vacuum cleaner. A cyclone chamber, a pre-motor filter and a suction motor are positioned in the air flow path. The cyclone axis of rotation and the suction motor axis of rotation each extend in a forward/rearward direction. The handle is positioned at the rear end of the hand vacuum cleaner and the suction motor is located at an upper end of the handle. The suction motor axis of rotation is vertically displaced from the cyclone axis of rotation when the upper end of the hand vacuum cleaner is positioned above the lower end of the hand vacuum cleaner.

19 Claims, 50 Drawing Sheets

(51) Int. Cl.
    *A47L 9/16* (2006.01)
    *A47L 9/28* (2006.01)
    *A47L 9/10* (2006.01)
    *A47L 9/24* (2006.01)
    *A47L 9/12* (2006.01)

(52) U.S. Cl.
    CPC ............ *A47L 9/2884* (2013.01); *A47L 9/2889* (2013.01); *A47L 9/322* (2013.01)

(56) References Cited

U.S. PATENT DOCUMENTS

| | | |
|---|---|---|
| 1,797,812 A | 3/1931 | Waring |
| 1,898,608 A | 2/1933 | Alexander |
| 1,937,765 A | 12/1933 | Leathers |
| 2,015,464 A | 9/1935 | Saint-Jacques |
| 2,152,114 A | 3/1939 | Van Tongeren |
| 2,542,634 A | 2/1951 | Davis et al. |
| 2,678,110 A | 5/1954 | Madsen |
| 2,731,102 A | 1/1956 | James |
| 2,811,219 A | 10/1957 | Wenzl |
| 2,846,024 A | 8/1958 | Bremi |
| 2,913,111 A | 11/1959 | Rogers |
| 2,917,131 A | 12/1959 | Evans |
| 2,937,713 A | 5/1960 | Stephenson et al. |
| 2,942,691 A | 6/1960 | Dillon |
| 2,942,692 A | 6/1960 | Benz |
| 2,946,451 A | 7/1960 | Culleton |
| 2,952,330 A | 9/1960 | Winslow |
| 2,981,369 A | 4/1961 | Yellott et al. |
| 3,032,954 A | 5/1962 | Racklyeft |
| 3,085,221 A | 4/1963 | Kelly |
| 3,130,157 A | 4/1964 | Kelsall et al. |
| 3,200,568 A | 8/1965 | McNeil |
| 3,204,772 A | 9/1965 | Ruxton |
| 3,217,469 A | 11/1965 | Eckert |
| 3,269,097 A | 8/1966 | German |
| 3,320,727 A | 5/1967 | Farley et al. |
| 3,372,532 A | 3/1968 | Campbell |
| 3,426,513 A | 2/1969 | Bauer |
| 3,518,815 A | 7/1970 | McFarland et al. |
| 3,530,649 A | 9/1970 | Porsch et al. |
| 3,543,325 A | 12/1970 | Hamrick |
| 3,561,824 A | 2/1971 | Homan |
| 3,582,616 A | 6/1971 | Wrob |
| 3,675,401 A | 7/1972 | Cordes |
| 3,684,093 A | 8/1972 | Kono et al. |
| 3,822,533 A | 7/1974 | Oranje |
| 3,898,068 A | 8/1975 | McNeil |
| 3,933,450 A | 1/1976 | Percevaut |
| 3,988,132 A | 10/1976 | Oranje |
| 3,988,133 A | 10/1976 | Schady |
| 4,097,381 A | 6/1978 | Ritzler |
| 4,187,088 A | 2/1980 | Hodgson |
| 4,218,805 A | 8/1980 | Brazier |
| 4,236,903 A | 12/1980 | Malmsten |
| 4,307,485 A | 12/1981 | Dessig, III |
| 4,373,228 A | 2/1983 | Dyson |
| 4,382,804 A | 5/1983 | Mellor |
| 4,409,008 A | 10/1983 | Solymes |
| 4,486,207 A | 12/1984 | Baillie |
| 4,494,270 A | 1/1985 | Ritzau et al. |
| 4,523,936 A | 6/1985 | Disanza, Jr. |
| 4,678,588 A | 7/1987 | Shortt |
| 4,700,429 A | 10/1987 | Martin et al. |
| 4,744,958 A | 5/1988 | Pircon |
| 4,778,494 A | 10/1988 | Patterson |
| 4,826,515 A | 5/1989 | Dyson |
| D303,173 S | 8/1989 | Miyamoto et al. |
| 4,853,008 A | 8/1989 | Dyson |
| 4,853,011 A | 8/1989 | Dyson |
| 4,853,111 A | 8/1989 | MacArthur et al. |
| 4,905,342 A | 3/1990 | Ataka |
| 4,944,780 A | 7/1990 | Usmani |
| 4,980,945 A | 1/1991 | Bewley |
| 5,054,157 A | 10/1991 | Werner et al. |
| 5,078,761 A | 1/1992 | Dyson |
| 5,080,697 A | 1/1992 | Finke |
| 5,090,976 A | 2/1992 | Dyson |
| 5,129,125 A | 7/1992 | Gamou et al. |
| 5,224,238 A | 7/1993 | Bartlett |
| 5,230,722 A | 7/1993 | Yonkers |
| 5,254,019 A | 10/1993 | Noschese |
| 5,267,371 A | 12/1993 | Soler et al. |
| 5,287,591 A | 2/1994 | Rench et al. |
| 5,307,538 A | 5/1994 | Rench et al. |
| 5,309,600 A | 5/1994 | Weaver et al. |
| 5,309,601 A | 5/1994 | Hampton et al. |
| 5,347,679 A | 9/1994 | Saunders et al. |
| 5,363,535 A | 11/1994 | Rench et al. |
| 5,467,835 A | 11/1995 | Obermeier et al. |
| 5,481,780 A | 1/1996 | Daneshvar |
| 5,515,573 A | 5/1996 | Frey |
| 5,599,365 A | 2/1997 | Alday et al. |
| D380,033 S | 6/1997 | Theiss et al. |
| 5,709,007 A | 1/1998 | Chiang |
| 5,755,096 A | 5/1998 | Holleyman |
| 5,815,878 A | 10/1998 | Murakami et al. |
| 5,815,881 A | 10/1998 | Sjoegreen |
| 5,858,038 A | 1/1999 | Dyson et al. |
| 5,858,043 A | 1/1999 | Geise |
| 5,893,938 A | 4/1999 | Dyson et al. |
| 5,935,279 A | 8/1999 | Kilstrom |
| 5,950,274 A | 9/1999 | Kilstrom |
| 5,970,572 A | 10/1999 | Thomas |
| 6,071,095 A | 6/2000 | Verkaart |
| 6,071,321 A | 6/2000 | Trapp et al. |
| 6,080,022 A | 6/2000 | Shaberman et al. |
| 6,113,663 A | 9/2000 | Liu |
| 6,122,796 A | 9/2000 | Downham et al. |
| 6,195,835 B1 | 3/2001 | Song et al. |
| 6,210,469 B1 | 4/2001 | Tokar |
| 6,221,134 B1 | 4/2001 | Conrad et al. |
| 6,228,260 B1 | 5/2001 | Conrad et al. |
| 6,231,645 B1 | 5/2001 | Conrad et al. |
| 6,251,296 B1 | 6/2001 | Conrad et al. |
| 6,260,234 B1 | 7/2001 | Wright et al. |
| 6,345,408 B1 | 2/2002 | Nagai et al. |
| 6,406,505 B1 | 6/2002 | Oh et al. |
| 6,434,785 B1 | 8/2002 | Vandenbelt et al. |
| 6,440,197 B1 | 8/2002 | Conrad et al. |
| 6,484,350 B2 | 11/2002 | Yung |
| 6,502,278 B2 | 1/2003 | Oh et al. |
| 6,514,131 B1 | 2/2003 | Reich et al. |
| 6,519,810 B2 | 2/2003 | Kim |
| 6,531,066 B1 | 3/2003 | Saunders et al. |
| 6,553,612 B1 | 4/2003 | Dyson et al. |
| 6,553,613 B2 | 4/2003 | Onishi et al. |
| 6,560,818 B1 | 5/2003 | Hasko |
| 6,562,093 B2 | 5/2003 | Oh |
| 6,581,239 B1 | 6/2003 | Dyson et al. |
| 6,599,338 B2 | 7/2003 | Oh et al. |
| 6,599,350 B1 | 7/2003 | Rockwell et al. |
| 6,613,316 B2 | 9/2003 | Sun et al. |
| 6,623,539 B2 | 9/2003 | Lee et al. |
| 6,625,845 B2 | 9/2003 | Matsumoto et al. |
| 6,640,385 B2 | 11/2003 | Oh et al. |
| 6,648,934 B2 | 11/2003 | Choi et al. |
| 6,662,403 B2 | 12/2003 | Oh |
| 6,712,868 B2 | 3/2004 | Murphy et al. |
| 6,732,403 B2 | 5/2004 | Moore et al. |
| 6,746,500 B1 | 6/2004 | Park et al. |
| 6,775,882 B2 | 8/2004 | Murphy et al. |
| 6,782,583 B2 | 8/2004 | Oh |
| 6,782,585 B1 | 8/2004 | Conrad et al. |
| 6,810,558 B2 | 11/2004 | Lee |
| 6,818,036 B1 | 11/2004 | Seaman |
| 6,833,015 B2 | 12/2004 | Oh et al. |
| 6,868,578 B1 | 3/2005 | Kasper et al. |
| 6,874,197 B1 | 4/2005 | Conrad et al. |
| 6,896,711 B2 | 5/2005 | Oh |
| 6,896,719 B2 | 5/2005 | Coates et al. |
| 6,901,625 B2 | 6/2005 | Yang et al. |
| 6,925,680 B2 | 8/2005 | Oh |

(56) References Cited

U.S. PATENT DOCUMENTS

| | | |
|---|---|---|
| 6,929,516 B2 | 8/2005 | Brochu et al. |
| 6,952,680 B1 | 10/2005 | Melby et al. |
| 6,968,596 B2 | 11/2005 | Oh et al. |
| 6,976,885 B2 | 12/2005 | Lord |
| 7,074,248 B2 | 7/2006 | Jin et al. |
| 7,113,847 B2 | 9/2006 | Chmura et al. |
| 7,117,973 B2 | 10/2006 | Graefenstein |
| 7,128,770 B2 | 10/2006 | Oh et al. |
| 7,152,276 B2 | 12/2006 | Jin et al. |
| 7,160,346 B2 | 1/2007 | Park |
| 7,162,770 B2 | 1/2007 | Davidshofer |
| 7,175,682 B2 | 2/2007 | Nakai et al. |
| 7,181,803 B2 | 2/2007 | Park et al. |
| 7,198,656 B2 | 4/2007 | Takemoto et al. |
| 7,222,393 B2 | 5/2007 | Kaffenberger et al. |
| 7,247,181 B2 | 7/2007 | Hansen et al. |
| 7,272,872 B2 | 9/2007 | Choi |
| 7,278,181 B2 | 10/2007 | Harris et al. |
| 7,288,129 B2 | 10/2007 | Oh et al. |
| 7,341,611 B2 | 3/2008 | Greene et al. |
| 7,354,468 B2 | 4/2008 | Arnold et al. |
| 7,370,387 B2 | 5/2008 | Walker et al. |
| 7,377,007 B2 | 5/2008 | Best |
| 7,377,953 B2 | 5/2008 | Oh |
| 7,386,915 B2 | 6/2008 | Blocker et al. |
| 7,395,579 B2 | 7/2008 | Oh |
| 7,448,363 B1 | 11/2008 | Rasmussen et al. |
| 7,449,040 B2 | 11/2008 | Conrad et al. |
| 7,485,164 B2 | 2/2009 | Jeong et al. |
| 7,488,363 B2 | 2/2009 | Jeong et al. |
| 7,547,337 B2 | 6/2009 | Oh et al. |
| 7,547,338 B2 | 6/2009 | Kim et al. |
| 7,563,298 B2 | 7/2009 | Oh |
| 7,565,853 B2 | 7/2009 | Arnold et al. |
| 7,588,616 B2 | 9/2009 | Conrad et al. |
| 7,597,730 B2 | 10/2009 | Yoo et al. |
| 7,628,831 B2 | 12/2009 | Gomiciaga-Pereda et al. |
| 7,640,624 B2 | 1/2010 | Crouch et al. |
| 7,645,309 B2 | 1/2010 | Jeong et al. |
| 7,686,861 B2 | 3/2010 | Oh |
| 7,691,161 B2 | 4/2010 | Oh et al. |
| 7,708,789 B2 | 5/2010 | Fester |
| 7,717,973 B2 | 5/2010 | Oh et al. |
| 7,740,676 B2 | 6/2010 | Bumham et al. |
| 7,770,256 B1 | 8/2010 | Fester |
| 7,776,120 B2 | 8/2010 | Conrad |
| 7,779,506 B2 | 8/2010 | Kang et al. |
| 7,780,753 B2 | 8/2010 | Lang |
| 7,803,207 B2 | 9/2010 | Conrad |
| 7,805,804 B2 | 10/2010 | Loebig |
| 7,811,349 B2 | 10/2010 | Nguyen |
| 7,867,308 B2 | 1/2011 | Conrad |
| 7,882,593 B2 | 2/2011 | Beskow et al. |
| 7,887,612 B2 | 2/2011 | Conrad |
| 7,922,794 B2 | 4/2011 | Morphey |
| 7,931,716 B2 | 4/2011 | Oakham |
| 7,938,871 B2 | 5/2011 | Lloyd |
| 7,958,598 B2 | 6/2011 | Yun et al. |
| 7,979,959 B2 | 7/2011 | Courtney |
| 7,996,956 B2 | 8/2011 | Wood et al. |
| 8,021,453 B2 | 9/2011 | Howes |
| 8,028,373 B2 | 10/2011 | Rowntree |
| 8,048,180 B2 | 11/2011 | Oh et al. |
| 8,062,398 B2 | 11/2011 | Luo et al. |
| 8,074,321 B2 | 12/2011 | Fry et al. |
| 8,100,999 B2 | 1/2012 | Ashbee et al. |
| 8,101,001 B2 | 1/2012 | Qian |
| 8,117,712 B2 | 2/2012 | Dyson et al. |
| 8,146,201 B2 | 4/2012 | Conrad |
| 8,150,907 B2 | 4/2012 | Otsuka et al. |
| 8,151,407 B2 | 4/2012 | Conrad |
| 8,152,877 B2 | 4/2012 | Greene |
| 8,156,609 B2 | 4/2012 | Milne et al. |
| 8,161,599 B2 | 4/2012 | Griffith et al. |
| 8,206,482 B2 | 6/2012 | Williams et al. |
| 8,225,456 B2 | 7/2012 | Håkan et al. |
| 8,347,455 B2 | 1/2013 | Dyson et al. |
| 8,444,731 B2 | 5/2013 | Gomiciaga-Pereda et al. |
| 8,484,799 B2 | 7/2013 | Conrad |
| 8,510,907 B2 | 8/2013 | Conrad |
| 8,544,143 B2 | 10/2013 | Hwang et al. |
| 8,549,703 B2 | 10/2013 | Smith |
| 8,578,555 B2 | 11/2013 | Conrad |
| 8,595,895 B2 | 12/2013 | Smith |
| 8,607,407 B2 | 12/2013 | Conrad |
| 8,657,904 B2 | 2/2014 | Smith |
| 8,673,487 B2 | 3/2014 | Churchill |
| 8,713,751 B2 | 5/2014 | Conrad |
| 8,813,305 B2 | 8/2014 | Conrad |
| 8,869,345 B2 | 10/2014 | Conrad |
| 8,918,952 B2 | 12/2014 | Rowntree |
| 8,945,258 B2 | 2/2015 | Smith |
| 8,979,960 B2 | 3/2015 | Smith |
| 9,005,324 B2 | 4/2015 | Smith |
| 9,005,325 B2 | 4/2015 | Smith |
| 9,095,245 B2 | 8/2015 | Conrad |
| 9,144,358 B2 | 9/2015 | Smith |
| 9,192,269 B2 | 11/2015 | Conrad |
| 9,204,773 B2 | 12/2015 | Conrad |
| 9,492,045 B2 | 11/2016 | Conrad |
| 9,516,979 B2 | 12/2016 | Gidwell |
| 9,675,218 B2 | 6/2017 | Kim et al. |
| 9,711,986 B2 | 7/2017 | Sunderland et al. |
| 9,962,047 B2 | 5/2018 | Brown et al. |
| 9,962,048 B2 | 5/2018 | Conrad et al. |
| 9,986,880 B2 | 6/2018 | Conrad |
| 10,117,550 B1 | 11/2018 | Conrad |
| 10,238,249 B2 | 3/2019 | Brown et al. |
| 2001/0018865 A1 | 9/2001 | Wegelin et al. |
| 2002/0011050 A1 | 1/2002 | Hansen et al. |
| 2002/0011053 A1 | 1/2002 | Oh |
| 2002/0062531 A1 | 5/2002 | Oh |
| 2002/0062632 A1 | 5/2002 | Oh |
| 2002/0066262 A1 | 6/2002 | Oh |
| 2002/0088208 A1 | 7/2002 | Lukac et al. |
| 2002/0112315 A1 | 8/2002 | Conrad |
| 2002/0134059 A1 | 9/2002 | Oh |
| 2002/0134238 A1 | 9/2002 | Conrad et al. |
| 2002/0178535 A1 | 12/2002 | Oh et al. |
| 2002/0178698 A1 | 12/2002 | Oh et al. |
| 2002/0178699 A1 | 12/2002 | Oh |
| 2003/0046910 A1 | 3/2003 | Lee et al. |
| 2003/0066273 A1 | 4/2003 | Choi et al. |
| 2003/0106180 A1 | 6/2003 | Tsen |
| 2003/0159238 A1 | 8/2003 | Oh |
| 2003/0159411 A1 | 8/2003 | Hansen et al. |
| 2003/0167591 A1 | 9/2003 | Oh |
| 2003/0200736 A1 | 10/2003 | Ni |
| 2004/0010885 A1 | 1/2004 | Hitzelberger et al. |
| 2004/0025285 A1 | 2/2004 | McCormick et al. |
| 2004/0098828 A1 | 5/2004 | Oh |
| 2004/0107530 A1 | 6/2004 | Lee |
| 2004/0112022 A1 | 6/2004 | Vuijk |
| 2004/0134022 A1 | 7/2004 | Murphy et al. |
| 2004/0163206 A1 | 8/2004 | Oh |
| 2004/0200029 A1 | 10/2004 | Jin et al. |
| 2004/0216264 A1 | 11/2004 | Shaver et al. |
| 2004/0231093 A1 | 11/2004 | Oh |
| 2004/0237248 A1 | 12/2004 | Oh et al. |
| 2005/0081321 A1 | 4/2005 | Milligan et al. |
| 2005/0115409 A1 | 6/2005 | Conrad |
| 2005/0132528 A1 | 6/2005 | Yau |
| 2005/0198769 A1 | 9/2005 | Lee et al. |
| 2005/0198770 A1 | 9/2005 | Jung et al. |
| 2005/0252179 A1 | 11/2005 | Oh et al. |
| 2005/0252180 A1 | 11/2005 | Oh et al. |
| 2006/0037172 A1 | 2/2006 | Choi |
| 2006/0042206 A1 | 3/2006 | Arnold et al. |
| 2006/0090290 A1 | 5/2006 | Lau |
| 2006/0102005 A1 | 5/2006 | Oh et al. |
| 2006/0123590 A1 | 6/2006 | Fester et al. |
| 2006/0137304 A1 | 6/2006 | Jeong et al. |
| 2006/0137306 A1 | 6/2006 | Jeong et al. |
| 2006/0137309 A1 | 6/2006 | Jeong et al. |

(56) References Cited

U.S. PATENT DOCUMENTS

| | | |
|---|---|---|
| 2006/0137314 A1 | 6/2006 | Conrad et al. |
| 2006/0156508 A1 | 7/2006 | Khalil |
| 2006/0162298 A1 | 7/2006 | Oh et al. |
| 2006/0162299 A1 | 7/2006 | North |
| 2006/0168922 A1 | 8/2006 | Oh |
| 2006/0168923 A1 | 8/2006 | Lee et al. |
| 2006/0207055 A1 | 9/2006 | Ivarsson et al. |
| 2006/0207231 A1 | 9/2006 | Arnold |
| 2006/0230715 A1 | 10/2006 | Oh et al. |
| 2006/0230723 A1 | 10/2006 | Kim et al. |
| 2006/0230724 A1 | 10/2006 | Han et al. |
| 2006/0236663 A1 | 10/2006 | Oh |
| 2006/0254226 A1 | 11/2006 | Jeon |
| 2006/0277711 A1 | 12/2006 | Hong et al. |
| 2006/0278081 A1 | 12/2006 | Han et al. |
| 2006/0288516 A1 | 12/2006 | Sawalski |
| 2007/0033765 A1 | 2/2007 | Walker et al. |
| 2007/0039292 A1 | 2/2007 | Oh et al. |
| 2007/0067943 A1 | 3/2007 | Makarov |
| 2007/0067944 A1 | 3/2007 | Kitamura et al. |
| 2007/0077810 A1 | 4/2007 | Gogel et al. |
| 2007/0079473 A1 | 4/2007 | Min et al. |
| 2007/0079585 A1 | 4/2007 | Oh et al. |
| 2007/0084159 A1 | 4/2007 | Oh et al. |
| 2007/0095028 A1 | 5/2007 | Kim et al. |
| 2007/0095029 A1 | 5/2007 | Min et al. |
| 2007/0136984 A1 | 6/2007 | Hsu |
| 2007/0209334 A1 | 9/2007 | Conrad |
| 2007/0209335 A1 | 9/2007 | Conrad |
| 2007/0271724 A1 | 11/2007 | Hakan et al. |
| 2007/0289089 A1 | 12/2007 | Yacobi |
| 2007/0289266 A1 | 12/2007 | Oh |
| 2008/0040883 A1 | 2/2008 | Beskow et al. |
| 2008/0047091 A1 | 2/2008 | Nguyen |
| 2008/0134460 A1 | 6/2008 | Conrad |
| 2008/0134462 A1 | 6/2008 | Jansen et al. |
| 2008/0178416 A1 | 7/2008 | Conrad |
| 2008/0178420 A1 | 7/2008 | Conrad |
| 2008/0190080 A1 | 8/2008 | Oh et al. |
| 2008/0196194 A1 | 8/2008 | Conrad |
| 2008/0196745 A1 | 8/2008 | Conrad |
| 2008/0256744 A1 | 10/2008 | Rowntreer et al. |
| 2008/0289306 A1 | 11/2008 | Han et al. |
| 2008/0301903 A1 | 12/2008 | Cunningham et al. |
| 2009/0019663 A1 | 1/2009 | Rowntree |
| 2009/0100633 A1 | 4/2009 | Bates et al. |
| 2009/0113659 A1 | 5/2009 | Jeon et al. |
| 2009/0113663 A1 | 5/2009 | Follows et al. |
| 2009/0144932 A1 | 6/2009 | Yoo |
| 2009/0165431 A1 | 7/2009 | Oh |
| 2009/0205160 A1 | 8/2009 | Conrad |
| 2009/0205161 A1 | 8/2009 | Conrad |
| 2009/0205298 A1 | 8/2009 | Hyun et al. |
| 2009/0209666 A1 | 8/2009 | Hellberg et al. |
| 2009/0265877 A1 | 10/2009 | Dyson et al. |
| 2009/0282639 A1 | 11/2009 | Dyson et al. |
| 2009/0300874 A1 | 12/2009 | Tran et al. |
| 2009/0300875 A1 | 12/2009 | Inge et al. |
| 2009/0305862 A1 | 12/2009 | Yoo |
| 2009/0307564 A1 | 12/2009 | Vedantham et al. |
| 2009/0307863 A1 | 12/2009 | Milne et al. |
| 2009/0307864 A1 | 12/2009 | Dyson |
| 2009/0307866 A1 | 12/2009 | Witter et al. |
| 2009/0308254 A1 | 12/2009 | Oakham |
| 2009/0313958 A1 | 12/2009 | Gomiciaga-Pereda et al. |
| 2009/0313959 A1 | 12/2009 | Gomiciaga-Pereda et al. |
| 2010/0045215 A1 | 2/2010 | Hawker et al. |
| 2010/0083459 A1 | 4/2010 | Beskow et al. |
| 2010/0132319 A1 | 6/2010 | Ashbee et al. |
| 2010/0154150 A1 | 6/2010 | McLeod |
| 2010/0154367 A1* | 6/2010 | Luo .................. A47L 5/362 55/337 |
| 2010/0175217 A1 | 7/2010 | Conrad |
| 2010/0212104 A1 | 8/2010 | Conrad |
| 2010/0224073 A1 | 9/2010 | Oh et al. |
| 2010/0229321 A1 | 9/2010 | Dyson et al. |
| 2010/0229322 A1 | 9/2010 | Conrad |
| 2010/0229324 A1 | 9/2010 | Conrad |
| 2010/0229328 A1 | 9/2010 | Conrad |
| 2010/0236016 A1 | 9/2010 | Tran |
| 2010/0242210 A1 | 9/2010 | Conrad |
| 2010/0243158 A1 | 9/2010 | Conrad |
| 2010/0293745 A1 | 11/2010 | Coburn |
| 2010/0299865 A1 | 12/2010 | Conrad |
| 2010/0299866 A1 | 12/2010 | Conrad |
| 2011/0023261 A1 | 2/2011 | Proffitt, II et al. |
| 2011/0146024 A1 | 6/2011 | Conrad |
| 2011/0168332 A1 | 7/2011 | Bowe et al. |
| 2011/0219570 A1 | 9/2011 | Conrad |
| 2011/0219575 A1 | 9/2011 | Conrad |
| 2011/0219576 A1 | 9/2011 | Conrad |
| 2011/0289719 A1 | 12/2011 | Han et al. |
| 2011/0308038 A1 | 12/2011 | Rowntree |
| 2011/0314630 A1 | 12/2011 | Conrad |
| 2012/0060322 A1 | 3/2012 | Simonelli et al. |
| 2012/0079671 A1 | 4/2012 | Stickney et al. |
| 2012/0216361 A1 | 8/2012 | Millington et al. |
| 2012/0222245 A1 | 9/2012 | Conrad |
| 2012/0222260 A1 | 9/2012 | Conrad |
| 2012/0222262 A1 | 9/2012 | Conrad |
| 2012/0304417 A1 | 12/2012 | Riley |
| 2013/0091654 A1 | 4/2013 | Smith |
| 2013/0091656 A1 | 4/2013 | Smith |
| 2013/0091657 A1 | 4/2013 | Smith |
| 2013/0091658 A1 | 4/2013 | Smith |
| 2013/0091810 A1 | 4/2013 | Smith |
| 2013/0091812 A1 | 4/2013 | Smith |
| 2013/0091813 A1 | 4/2013 | Smith |
| 2013/0091814 A1 | 4/2013 | Smith |
| 2013/0207615 A1 | 8/2013 | Sunderland et al. |
| 2013/0269147 A1 | 10/2013 | Conrad |
| 2014/0137362 A1 | 5/2014 | Smith |
| 2014/0137363 A1 | 5/2014 | Wilson |
| 2014/0137364 A1 | 5/2014 | Stickney et al. |
| 2014/0182080 A1 | 7/2014 | Lee et al. |
| 2014/0208538 A1 | 7/2014 | Visel et al. |
| 2014/0237768 A1 | 8/2014 | Conrad |
| 2014/0237956 A1 | 8/2014 | Conrad |
| 2014/0245564 A1 | 9/2014 | Conrad |
| 2015/0135474 A1 | 5/2015 | Gidwell |
| 2015/0230677 A1 | 8/2015 | Andrikanish |
| 2015/0297050 A1 | 10/2015 | Marsh et al. |
| 2016/0106285 A1 | 4/2016 | Jenson |
| 2016/0113455 A1* | 4/2016 | Horvath .................. A47L 9/12 15/344 |
| 2016/0113460 A1 | 4/2016 | Williams et al. |
| 2016/0174785 A1 | 6/2016 | Conrad |
| 2016/0174786 A1 | 6/2016 | Conrad |
| 2016/0174787 A1 | 6/2016 | Conrad |
| 2016/0206162 A1 | 7/2016 | Conrad |
| 2016/0206163 A1 | 7/2016 | Conrad |
| 2016/0213212 A1 | 7/2016 | Conrad |
| 2016/0213213 A1 | 7/2016 | Conrad |
| 2016/0256023 A1 | 9/2016 | Conrad |
| 2016/0316980 A1 | 11/2016 | Conrad |
| 2016/0367094 A1 | 12/2016 | Conrad |
| 2017/0079489 A1 | 3/2017 | Dimbylow |
| 2017/0112343 A1 | 4/2017 | Innes et al. |
| 2017/0172362 A1 | 6/2017 | Reimer et al. |
| 2017/0188763 A1 | 7/2017 | Hu |
| 2017/0196419 A1 | 7/2017 | Brown et al. |
| 2017/0196420 A1 | 7/2017 | Brown et al. |
| 2017/0196421 A1 | 7/2017 | Brown et al. |
| 2017/0196422 A1 | 7/2017 | Brown et al. |
| 2017/0196423 A1 | 7/2017 | Brown et al. |
| 2017/0196424 A1 | 7/2017 | Brown et al. |
| 2017/0196425 A1 | 7/2017 | Brown et al. |
| 2017/0196426 A1 | 7/2017 | Brown et al. |
| 2017/0196427 A1 | 7/2017 | Brown et al. |
| 2017/0196428 A1 | 7/2017 | Brown et al. |
| 2017/0196429 A1 | 7/2017 | Brown et al. |
| 2017/0209007 A1 | 7/2017 | Conrad et al. |
| 2017/0215663 A1 | 8/2017 | Conrad et al. |
| 2017/0215664 A1 | 8/2017 | Conrad et al. |

(56) References Cited

U.S. PATENT DOCUMENTS

| | | | |
|---|---|---|---|
| 2017/0265696 A1 | 9/2017 | Conrad et al. |
| 2017/0290476 A1 | 10/2017 | Conrad |
| 2017/0290477 A1 | 10/2017 | Conrad |
| 2017/0290478 A1 | 10/2017 | Conrad |
| 2017/0290479 A1 | 10/2017 | Conrad |
| 2017/0290480 A1 | 10/2017 | Conrad |
| 2017/0290481 A1 | 10/2017 | Conrad |
| 2018/0000303 A1 | 1/2018 | Conrad et al. |
| 2018/0184861 A1 | 7/2018 | Brown et al. |

FOREIGN PATENT DOCUMENTS

| | | |
|---|---|---|
| AU | 2008201597 A1 | 11/2008 |
| AU | 2008200579 B2 | 10/2011 |
| AU | 2008201597 B2 | 10/2011 |
| AU | 2011211368 B2 | 9/2012 |
| CA | 1077412 A1 | 5/1980 |
| CA | 1218962 A1 | 3/1987 |
| CA | 2450450 A1 | 12/2004 |
| CA | 2484587 A1 | 4/2005 |
| CA | 2620703 A1 | 8/2008 |
| CA | 2628573 A1 | 10/2008 |
| CA | 2731525 A1 | 10/2008 |
| CA | 2438079 C | 8/2009 |
| CA | 2658014 A1 | 9/2010 |
| CA | 2659212 A1 | 9/2010 |
| CA | 2484587 C | 1/2011 |
| CA | 2730437 A1 | 9/2011 |
| CA | 2593950 C | 1/2013 |
| CA | 2628573 C | 8/2013 |
| CA | 2620703 C | 9/2013 |
| CA | 2731525 C | 1/2014 |
| CN | 1336154 A | 2/2002 |
| CN | 1424688 A | 6/2003 |
| CN | 1434688 A | 8/2003 |
| CN | 1493244 A | 5/2004 |
| CN | 1626025 A | 6/2005 |
| CN | 1875846 A | 12/2006 |
| CN | 1875855 A | 12/2006 |
| CN | 1887437 A | 1/2007 |
| CN | 1895148 A | 1/2007 |
| CN | 1911151 A | 2/2007 |
| CN | 1981688 A | 6/2007 |
| CN | 101061932 A | 10/2007 |
| CN | 101073480 A | 11/2007 |
| CN | 101095604 A | 1/2008 |
| CN | 101108081 A | 1/2008 |
| CN | 101108106 A | 1/2008 |
| CN | 101108110 A | 1/2008 |
| CN | 101288572 A | 10/2008 |
| CN | 101448447 A | 6/2009 |
| CN | 101489453 A | 7/2009 |
| CN | 101489455 A | 7/2009 |
| CN | 101489457 A | 7/2009 |
| CN | 101489461 A | 7/2009 |
| CN | 201290642 Y | 8/2009 |
| CN | 101657133 A | 2/2010 |
| CN | 101700180 A | 5/2010 |
| CN | 101822506 A | 9/2010 |
| CN | 101108081 B | 10/2010 |
| CN | 201683850 U | 12/2010 |
| CN | 1911151 B | 4/2011 |
| CN | 101243959 B | 6/2011 |
| CN | 101700180 B | 8/2011 |
| CN | 102188208 A | 9/2011 |
| CN | 102256523 A | 11/2011 |
| CN | 202173358 U | 3/2012 |
| CN | 101489455 B | 6/2012 |
| CN | 101489457 B | 6/2012 |
| CN | 1981688 B | 7/2012 |
| CN | 101288572 B | 7/2012 |
| CN | 202739907 U | 2/2013 |
| CN | 202932850 U | 5/2013 |
| CN | 103169420 A | 6/2013 |
| CN | 101073480 B | 5/2014 |
| CN | 203724037 U | 7/2014 |
| CN | 101897558 B | 9/2014 |
| CN | 102256523 B | 11/2014 |
| CN | 203914775 U | 11/2014 |
| CN | 104172986 A | 12/2014 |
| CN | 204016180 U | 12/2014 |
| CN | 204363891 U | 6/2015 |
| CN | 104822301 A | 8/2015 |
| CN | 204581145 U | 8/2015 |
| CN | 105816104 A | 8/2016 |
| CN | 205671986 U | 11/2016 |
| CN | 103784081 B | 2/2017 |
| DE | 875134 C | 4/1953 |
| DE | 9216071 U1 | 2/1993 |
| DE | 4232382 C1 | 3/1994 |
| DE | 10056935 C2 | 1/2003 |
| DE | 10110581 C2 | 11/2003 |
| DE | 69907201 T2 | 2/2004 |
| DE | 60201666 T2 | 6/2006 |
| DE | 60116336 T2 | 8/2006 |
| DE | 60211663 T2 | 5/2007 |
| DE | 102007011457 A1 | 10/2007 |
| DE | 102004028677 B4 | 1/2008 |
| DE | 602006000726 T2 | 4/2009 |
| DE | 112007003039 T5 | 10/2009 |
| DE | 112007003052 T5 | 1/2010 |
| DE | 112010001135 T5 | 8/2012 |
| DE | 112012000251 T5 | 10/2013 |
| DE | 202010018047 U1 | 11/2013 |
| DE | 102012211246 A1 | 1/2014 |
| DE | 202010018084 U1 | 2/2014 |
| DE | 202010018085 U1 | 2/2014 |
| EP | 489498 A1 | 6/1992 |
| EP | 493950 B1 | 4/1998 |
| EP | 1200196 B1 | 6/2005 |
| EP | 1779761 A2 | 5/2007 |
| EP | 1815777 A1 | 8/2007 |
| EP | 1955631 A1 | 8/2008 |
| EP | 1677661 B1 | 1/2009 |
| EP | 1594386 B1 | 4/2009 |
| EP | 1955630 A3 | 10/2009 |
| EP | 1676516 B1 | 1/2010 |
| EP | 1629758 A3 | 2/2010 |
| EP | 2012641 B1 | 8/2010 |
| EP | 2223644 A2 | 9/2010 |
| EP | 1955631 B1 | 11/2010 |
| EP | 2308360 A2 | 4/2011 |
| EP | 2223644 A3 | 3/2013 |
| EP | 2581013 A1 | 4/2013 |
| EP | 2220986 B1 | 3/2014 |
| EP | 2223644 B1 | 3/2014 |
| EP | 2848173 A1 | 3/2015 |
| EP | 2308360 B1 | 6/2015 |
| FR | 2812531 B1 | 11/2004 |
| GB | 700791 A | 12/1953 |
| GB | 1111074 A | 4/1968 |
| GB | 1436403 A | 5/1976 |
| GB | 2035787 B | 10/1982 |
| GB | 2163703 B | 1/1988 |
| GB | 2268875 A | 1/1994 |
| GB | 2307849 A | 6/1997 |
| GB | 2282979 B | 10/1997 |
| GB | 2365324 B | 7/2002 |
| GB | 2440111 A | 1/2008 |
| GB | 2465781 A | 6/2010 |
| GB | 2441962 B | 3/2011 |
| GB | 2465781 B | 10/2012 |
| GB | 2466290 B | 10/2012 |
| GB | 2508035 A | 5/2014 |
| GB | 2508035 B | 3/2015 |
| JP | 61131720 A | 6/1986 |
| JP | 03176019 A | 7/1991 |
| JP | 2000140533 A | 5/2000 |
| JP | 2002085297 A | 3/2002 |
| JP | 2003135335 A | 5/2003 |
| JP | 2004313249 A | 11/2004 |
| JP | 2005040246 A | 2/2005 |
| JP | 2006102034 A | 4/2006 |
| JP | 2006272019 A | 10/2006 |

(56) References Cited

FOREIGN PATENT DOCUMENTS

| | | |
|---|---|---|
| JP | 2008206613 A | 9/2008 |
| JP | 4352065 B2 | 10/2009 |
| JP | 2009261501 A | 11/2009 |
| JP | 2010081968 A | 4/2010 |
| JP | 2010178773 A | 8/2010 |
| JP | 2010220632 A | 10/2010 |
| JP | 2011189132 A | 9/2011 |
| JP | 2011189133 A | 9/2011 |
| JP | 2013086228 A | 5/2013 |
| JP | 2016127893 A | 7/2016 |
| KR | 1020010024752 A | 3/2001 |
| KR | 1020010045598 A | 6/2001 |
| KR | 1020020085478 A | 11/2002 |
| KR | 1020040050174 A | 6/2004 |
| KR | 1020040088978 A | 10/2004 |
| KR | 1020050013696 A | 2/2005 |
| KR | 1020050054551 A | 6/2005 |
| KR | 100516420 B1 | 9/2005 |
| KR | 1020050091829 A | 9/2005 |
| KR | 1020050091830 A | 9/2005 |
| KR | 1020050091833 A | 9/2005 |
| KR | 1020050091834 A | 9/2005 |
| KR | 1020050091835 A | 9/2005 |
| KR | 1020050091836 A | 9/2005 |
| KR | 1020050091837 A | 9/2005 |
| KR | 1020050091838 A | 9/2005 |
| KR | 1020050103343 A | 10/2005 |
| KR | 1020050108623 A | 11/2005 |
| KR | 1020060008365 A | 1/2006 |
| KR | 1020060112420 A | 11/2006 |
| KR | 1020060118795 A | 11/2006 |
| KR | 1020060118800 A | 11/2006 |
| KR | 1020060118801 A | 11/2006 |
| KR | 1020060118802 A | 11/2006 |
| KR | 1020060118803 A | 11/2006 |
| KR | 1020060119587 A | 11/2006 |
| KR | 1020060122249 A | 11/2006 |
| KR | 1020060125952 A | 12/2006 |
| KR | 1020060125954 A | 12/2006 |
| KR | 1020100084127 A | 7/2010 |
| KR | 1020110021554 A | 3/2011 |
| NL | 10681 C | 11/1923 |
| NZ | 565800 A | 5/2009 |
| NZ | 567297 A | 7/2009 |
| WO | 8002561 A1 | 11/1980 |
| WO | 9627446 A1 | 9/1996 |
| WO | 9720492 A1 | 6/1997 |
| WO | 9809121 A1 | 3/1998 |
| WO | 9843721 A1 | 10/1998 |
| WO | 0107168 A1 | 2/2001 |
| WO | 0147247 A2 | 6/2001 |
| WO | 0147247 A3 | 11/2001 |
| WO | 0217766 A2 | 3/2002 |
| WO | 2002017766 A3 | 3/2002 |
| WO | 0217766 A3 | 2/2003 |
| WO | 2004069021 A1 | 8/2004 |
| WO | 2005084511 A1 | 9/2005 |
| WO | 2006076363 A2 | 7/2006 |
| WO | 2006076363 A3 | 12/2006 |
| WO | 2006026414 A3 | 8/2007 |
| WO | 2008009883 A1 | 1/2008 |
| WO | 2008009888 A1 | 1/2008 |
| WO | 2008009890 A1 | 1/2008 |
| WO | 2008009891 A1 | 1/2008 |
| WO | 2008035032 A2 | 3/2008 |
| WO | 2008035032 A3 | 6/2008 |
| WO | 2008070969 A1 | 6/2008 |
| WO | 2008070970 A1 | 6/2008 |
| WO | 2008070971 A1 | 6/2008 |
| WO | 2008070972 A1 | 6/2008 |
| WO | 2008070973 A1 | 6/2008 |
| WO | 2008070974 A1 | 6/2008 |
| WO | 2008070975 A1 | 6/2008 |
| WO | 2008088278 A2 | 7/2008 |
| WO | 2008135708 A1 | 11/2008 |
| WO | 2009026709 A1 | 3/2009 |
| WO | 2010102396 A1 | 9/2010 |
| WO | 2010142968 A1 | 12/2010 |
| WO | 2010142969 A1 | 12/2010 |
| WO | 2010142970 A1 | 12/2010 |
| WO | 2010142971 A1 | 12/2010 |
| WO | 2010147247 A1 | 12/2010 |
| WO | 2011054106 A1 | 5/2011 |
| WO | 2012042240 A1 | 4/2012 |
| WO | 2012117231 A1 | 9/2012 |
| WO | 2014001496 A1 | 1/2014 |
| WO | 2014131105 A1 | 9/2014 |
| WO | 2015129387 A1 | 9/2015 |
| WO | 2016065151 A1 | 4/2016 |
| WO | 2016095041 A1 | 6/2016 |
| WO | 2016173466 A1 | 11/2016 |
| WO | 2017046557 A1 | 3/2017 |
| WO | 2017046559 A1 | 3/2017 |
| WO | 2017046560 A1 | 3/2017 |
| WO | 2017083497 A1 | 5/2017 |
| WO | 2017117679 A1 | 7/2017 |

OTHER PUBLICATIONS

English machine translation of WO2015129387A1 published on Sep. 3, 2015.
English machine translation of WO8002561A1 published on Nov. 27, 1980.
English machine translation of WO2010147247A1 published on Dec. 23, 2010.
English machine translation of JP2016127893, published on Jul. 14, 2016.
English machine translation of WO2014001496, published on Jan. 3, 2014.
English machine translation of JP2004313249, published on Nov. 11, 2004.
International Search Report and Written Opinion, received in connection to international patent application No. PCT/CA2018/050782, dated Oct. 2, 2018.
English machine translation of CN103784081, published on Feb. 8, 2017.
English machine translation of CN203914775U published on Nov. 5, 2014.
English machine translation of CN203724037U published on Aug. 23, 2014.
English machine translation of CN202932850U published on Nov. 9, 2012.
English machine translation of CN202739907U published on Feb. 20, 2013.
English machine translation of CN202173358U published on Mar. 25, 2012.
English machine translation of CN201683850U published on Dec. 29, 2010.
English machine translation of CN105816104A published on Aug. 3, 2016.
English machine translation of CN104822301A published on Aug. 5, 2015.
English machine translation of CN104172986A published on Dec. 3, 2014.
English machine translation of CN103169420A published on Jun. 26, 2013.
English machine translation of CN102256523A published on Nov. 23, 2011.
English machine translation of CN102256523B published on Nov. 5, 2014.
English machine translation of CN102188208A published on Sep. 21, 2011.
English machine translation of CN101897558B published on Sep. 17, 2014.
English machine translation of CN101822506A published on Sep. 8, 2010.
English machine translation of CN101700180A published on May 5, 2010.

(56) References Cited

OTHER PUBLICATIONS

English machine translation of CN101700180B published on Aug. 24, 2011.
English machine translation of CN101657133A published on Feb. 24, 2010.
English machine translation of CN101489461A published on Jul. 22, 2009.
English machine translation of CN101489457A published on Jul. 22, 2009.
English machine translation of CN101489457B published on Jun. 27, 2012.
English machine translation of CN101489455A published on Jul. 22, 2009.
English machine translation of CN101489455B published on Jun. 27, 2012.
English machine translation of CN101489453A published on Jul. 22, 2009.
English machine translation of CN101448447A published on Jun. 3, 2009.
English machine translation of CN101288572A published on Oct. 22, 2008.
English machine translation of CN101288572B published on Jul. 4, 2012.
English machine translation of CN101243959B published on Jun. 15, 2011.
English machine translation of CN101108110A published on Jan. 23, 2008.
English machine translation of CN101108106A published on Jan. 23, 2008.
English machine translation of CN101108081A published on Jan. 23, 2008.
English machine translation of CN101108081B published on Oct. 27, 2010.
English machine translation of CN101095604A published on Jan. 2, 2008.
English machine translation of CN101073480A published on Nov. 21, 2007.
English machine translation of CN101073480B published on May 14, 2014.
English machine translation of CN101061932A published on Oct. 31, 2007.
English machine translation of CN1981688A published on Jun. 20, 2007.
English machine translation of CN1981688B published on Jul. 4, 2012.
English machine translation of CN1911151A published on Feb. 14, 2007.
English machine translation of CN1911151B published on Apr. 13, 2011.
English machine translation of CN1895148A published on Jan. 17, 2007.
English machine translation of CN1887437A published on Jan. 13, 2007.
English machine translation of CN1875855A published on Dec. 13, 2006.
English machine translation of CN1875846A published on Dec. 13, 2006.
English machine translation of CN1626025A published on Jun. 15, 2005.
English machine translation of CN1493244A published on May 5, 2004.
English machine translation of CN1434688A published on Aug. 6, 2003.
English machine translation of CN1424688A published on Jun. 18, 2003.
English machine translation of CN1336154A published on Feb. 20, 2002.
English machine translation of CN201290642Y published on Aug. 19, 2009.
English machine translation of NL10681C published on Nov. 17, 1923.
English machine translation of FR2812531B1 published on Nov. 5, 2004.
English machine translation of EP1815777A1 published on Aug. 8, 2007.
English machine translation of KR1020050054551A published on Jun. 10, 2005.
English machine translation of KR1020050013696A published on Feb. 5, 2005.
English machine translation of KR1020040088978A published on Oct. 20, 2004.
English machine translation of KR1020040050174A published on Jun. 16, 2004.
English machine translation of KR1020020085478A published on Nov. 16, 2002.
English machine translation of KR1020020067489A published on Aug. 22, 2002.
English machine translation of KR1020010045598A published on Jun. 5, 2001.
English machine translation of KR1020010024752A published on Mar. 26, 2001.
English machine translation of DE602006000726T2 published on Apr. 16, 2009.
English machine translation of DE202010018085U1 published on Feb. 27, 2014.
English machine translation of DE202010018084U1 published on Feb. 27, 2014.
English machine translation of DE202010018047U1 published on Nov. 14, 2013.
English machine translation of DE112012000251T5 published on Oct. 17, 2013.
English machine translation of DE112010001135T5 published on Aug. 2, 2012.
English machine translation of DE112007003052T5 published on Jan. 14, 2010.
English machine translation of DE112007003039T5 published on Oct. 29, 2009.
English machine translation of DE102012211246A1 published on Jan. 2, 2014.
English machine translation of DE102007011457A1 published on Oct. 25, 2007.
English machine translation of DE102004028677B4 published on Jan. 10, 2008.
English machine translation of JP2013086228A published on May 13, 2013.
English machine translation of JP2011189133A published on Sep. 29, 2011.
English machine translation of JP2011189132A published on Sep. 29, 2011.
English machine translation of JP2010220632A published on Oct. 7, 2010.
English machine translation of JP2010178773A published on Aug. 19, 2010.
English machine translation of JP2010081968A published on Apr. 15, 2010.
English machine translation of JP2009261501A published on Nov. 12, 2009.
English machine translation of JP2008206613A published on Sep. 11, 2008.
English machine translation of JP2006272019A published on Oct. 12, 2006.
English machine translation of JP2006102034A published on Apr. 20, 2006.
English machine translation of JP2005040246A published on Feb. 17, 2005.
English machine translation of JP2003135335A published on May 13, 2003.
English machine translation of JP2002085297A published on Mar. 26, 2002.
English machine translation of JP2000140533A published on May 23, 2000.

(56) References Cited

OTHER PUBLICATIONS

English machine translation of CN205671986U published on Nov. 9, 2016.
English machine translation of CN204581145U published on Aug. 26, 2015.
English machine translation of CN204363891U published on Jun. 3, 2015.
English machine translation of CN204016180U published on Dec. 17, 2014.
English machine translation of DE69907201T2 published on Feb. 5, 2004.
English machine translation of JP61131720A published on Jun. 19, 1986.
English machine translation of DE60211663T2 published on May 10, 2007.
English machine translation of DE60201666T2 published on Jun. 1, 2006.
English machine translation of DE60116336T2 published on Aug. 31, 2006.
English machine translation of DE10110581C2 published on Nov. 13, 2003.
English machine translation of DE10056935C2 published on Jan. 16, 2003.
English machine translation of DE9216071U1 published on Feb. 25, 1993.
English machine translation of JP4352065B2 published on Oct. 28, 2009.
English machine translation of DE4232382C1 published on Mar. 24, 1994.
English machine translation of JP03176019A published on Jul. 31, 1991.
English machine translation of DE875134C published on Apr. 30, 1953.
English machine translation of KR1020110021554A published on Mar. 4, 2011.
English machine translation of KR1020100084127A published on Jul. 23, 2010.
English machine translation of KR1020060125954A published on Dec. 7, 2006.
English machine translation of KR1020060125952A published on Dec. 7, 2006.
English machine translation of KR1020060122249A published on Nov. 30, 2006.
English machine translation of KR1020060119587A published on Nov. 24, 2006.
English machine translation of KR1020060118803A published on Nov. 24, 2006.
English machine translation of KR1020060118802A published on Nov. 24, 2006.
English machine translation of KR1020060118801A published on Nov. 24, 2006.
English machine translation of KR1020060118800A published on Nov. 24, 2006.
English machine translation of KR1020060118795A published on Nov. 25, 2006.
English machine translation of KR1020060112420A published on Nov. 1, 2006.
English machine translation of KR1020060008365A published on Jan. 26, 2006.
English machine translation of KR1020050108623A published on Nov. 17, 2005.
English machine translation of KR1020050103343A published on Oct. 31, 2005.
English machine translation of KR1020050091838A published on Sep. 15, 2005.
English machine translation of KR1020050091837A published on Sep. 15, 2005.
English machine translation of KR1020050091836A published on Sep. 15, 2005.
English machine translation of KR1020050091835A published on Sep. 15, 2005.
English machine translation of KR1020050091834A published on Sep. 15, 2005.
English machine translation of KR1020050091833A published on Sep. 15, 2005.
English machine translation of KR1020050091830A published on Sep. 15, 2005.
English machine translation of KR1020050091829A published on Sep. 15, 2005.
Office Action dated Jul. 7, 2010, for Canadian Patent Application No. 2,675,714.
The Office Action received in connection to the corresponding US Patent Application No. 200880126486.6 dated Mar. 23, 2012.
The Office Action received in connection to the related Chinese Patent Application No. 00813438.3 dated Jul. 11, 2003.
Combined Search and Examination Report under Sections 17 & 18(3) received in connection to the corresponding GB Patent Application No. 1522195.5 dated Jun. 16, 2016.
Combined Search and Examination Report under Sections 17 & 18(3) received in connection to the corresponding GB Patent Application No. 1706875.0 dated May 25, 2017.
European Communication pursuant to Article 94(3) on European Patent Application No. 04078261.7, dated Apr. 24, 2012.
European Communication pursuant to Article 94(3) on European Patent Application No. 04078261.7, dated Feb. 26, 2010.
Cheremisinoff, Nicholas P.: "Handbook of air pollution prevention and control", Butterworth-Heinemann, ISBN 0-7506-7499-7; pp. 397-404; Copyright © 2002.
Instruction manual: Makita Cordless Cleaner, Handy Vac II, Model 4071D; Oct. 1993.
Instruction Manual: Cordless Cleaner BCL 180.
International Search Report and Written Opinion Report on International application No. PCT/CA2015/051332, dated Mar. 7, 2016.
International Preliminary Report on Patentability in International Application No. PCT/CA2015/051332 dated Jun. 29, 2017.
International Preliminary Examination Report on International application No. PCT/CA00/00873, dated Oct. 26, 2001.
International Preliminary Report on Patentability, dated Sep. 16, 2008 for International application No. PCT/CA2007/000380.
International Search Report and Written Opinion received in connection to International patent application No. PCT/CA2007/002211, dated Apr. 21, 2008.
International Search Report and Written Opinion received in connection to international patent application No. PCT/CA2015/050661, dated Oct. 19, 2015.
International Search Report and Written Opinion received in connection to International Patent Application No. PCT/CA2014/000133, dated May 26, 2014.
Euro-Pro Shark Cordless Hand Vac Owner's Manual, published in 2002.
Supplementary European Search Report, dated Jun. 16, 2009, as received on the corresponding EP application No. 07719394.4.
International Search Report and Written Opinion received in connection to International patent application No. PCT/CA2017/050436, dated Jul. 21, 2017.
International Search Report and Written Opinion received in connection to International patent application No. PCT/CA2017/050014, dated Apr. 5, 2017.

\* cited by examiner

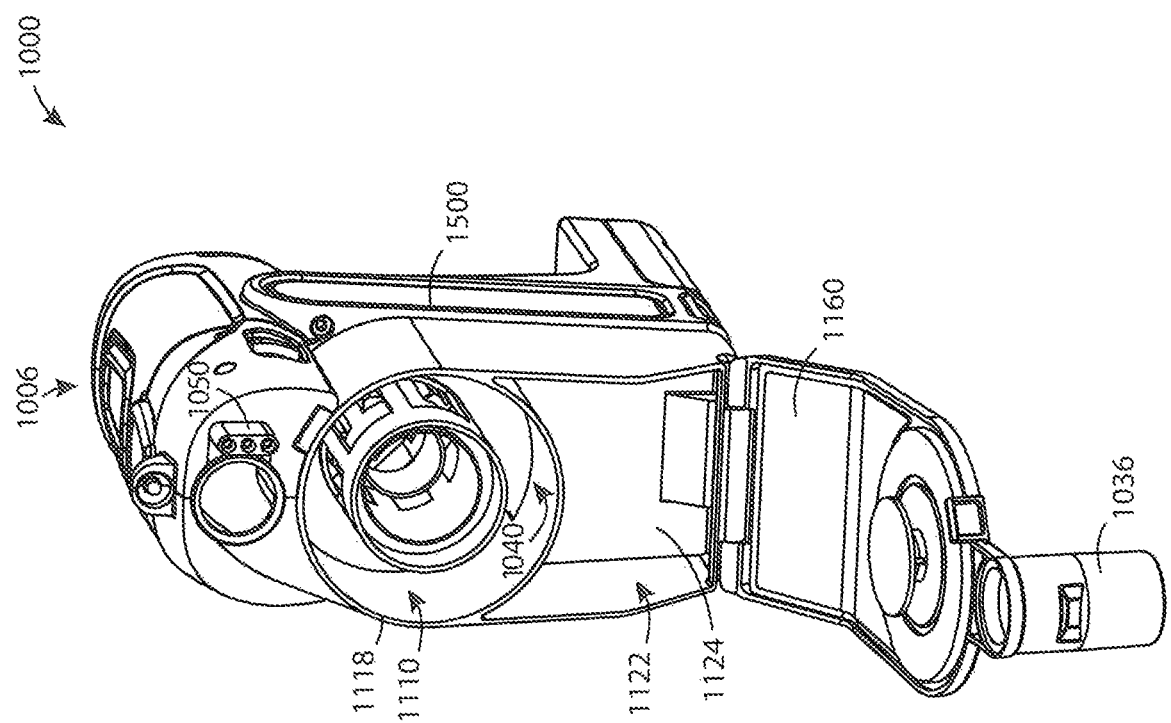

HANDHELD SURFACE CLEANING APPARATUS

FIELD

This disclosure relates generally to surface cleaning apparatus. In a preferred embodiment, the surface cleaning apparatus comprises a portable surface cleaning apparatus, such as a hand vacuum cleaner.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, and hand carriable surface cleaning apparatus such as hand vacuums. Further, various designs for cyclonic hand vacuum cleaners, including battery operated cyclonic hand vacuum cleaners are known in the art.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, which may be used alone or in combination with any other aspect, a hand vacuum cleaner may be powered by an onboard energy source, such as a battery pack or other energy storage member. The energy storage member may include a chemical battery, such as a rechargeable battery. Some chemical batteries, such as lithium-ion batteries, may produce heat while being discharged (e.g. while supplying power to an electric motor). As disclosed herein, a hand vacuum cleaner may have an airflow path in which air exiting a cyclone chamber impinges on a wall of an energy storage chamber in which one or more energy storage devices are located. By directing relatively high-velocity airflow directly against a wall of such a chamber, cooling of an energy storage member (e.g. battery) located in the chamber may be promoted, particularly during discharge of the battery.

In accordance with this broad aspect, there is provided a hand vacuum cleaner having a front end, a rear end, an upper end, a lower end, and first and second laterally spaced apart sides, and comprising:
  (a) an air flow path extending from a dirty air inlet to a clean air outlet;
  (b) a cyclone chamber positioned in the air flow path and having a cyclone air inlet, a cyclone air outlet, and a cyclone axis of rotation;
  (c) a suction motor positioned in the air flow path upstream of the clean air outlet; and,
  (d) at least one energy storage member positioned in an energy storage chamber having an energy storage chamber wall wherein the cyclone air outlet faces the energy storage chamber wall whereby air exiting the cyclone chamber impinges on the energy storage chamber wall.

In some embodiments, the cyclone axis of rotation may extend generally in a forward/rearward direction.

In some embodiments, the at least one energy storage member may comprise a plurality of energy storage members wherein at least some of the plurality of energy storage members are arranged one above another in a generally upwardly extending configuration when the upper end of the hand vacuum cleaner is positioned above the lower end of the hand vacuum cleaner.

In some embodiments, the energy storage members may be arranged one above another comprise longitudinally extending members each having a longitudinal axis which that extends laterally.

In some embodiments, the cyclone axis of rotation may intersect a volume defined by the generally upwardly extending configuration of energy storage members.

In some embodiments, the cyclone axis of rotation may extend generally in a forward/rearward direction.

In some embodiments, the at least one energy storage member may be removably receivable in the energy storage chamber.

In some embodiments, the at least one energy storage member may comprise a battery pack that is removably receivable in the energy storage chamber.

In some embodiments, the air flow path may comprise a portion that extends from the cyclone air outlet to the suction motor and is defined in part by the energy storage chamber wall.

In some embodiments, the portion of the air flow path may extend generally upwardly from the cyclone air outlet to the suction motor when the upper end of the hand vacuum cleaner is positioned above the lower end of the hand vacuum cleaner.

In some embodiments, the suction motor may be positioned above the cyclone axis of rotation when the upper end of the hand vacuum cleaner is positioned above the lower end of the hand vacuum cleaner.

In some embodiments, the portion of the air flow path may extend generally downwardly from the cyclone air outlet to the suction motor when the upper end of the hand vacuum cleaner is positioned above the lower end of the hand vacuum cleaner.

In some embodiments, the suction motor may be positioned below the cyclone axis of rotation when the upper end of the hand vacuum cleaner is positioned above the lower end of the hand vacuum cleaner.

In some embodiments, the hand vacuum cleaner may further comprise a handle having a hand grip portion that extends upwardly and forwardly when the upper end of the hand vacuum cleaner is positioned above the lower end of the hand vacuum cleaner wherein the handle is positioned rearward of the at least one energy storage member.

In some embodiments, the at least one energy storage member may comprise a plurality of energy storage members wherein at least some of the plurality of energy storage members are arranged one above another in a generally upwardly extending configuration when the upper end of the hand vacuum cleaner is positioned above the lower end of the hand vacuum cleaner.

In some embodiments, the hand vacuum cleaner may further comprise a finger gap positioned between the handle and the energy storage chamber.

In accordance with another aspect of this disclosure, which may be used alone or in combination with any other aspect, a hand vacuum cleaner may have a cyclone chamber, a suction motor, and pre-motor filter positioned downstream of the cyclone chamber and upstream of the suction motor. The pre-motor filter may be vertically spaced from the cyclone chamber, and air may travel generally rearwardly from the pre-motor filter to the suction motor. Promoting air to travel in this manner may help reduce or eliminate the need for additional bends or air flow direction changes between an air outlet of the pre-motor filter and the suction motor, thereby reducing backpressure and/or air flow losses through this portion of the hand vacuum cleaner due to a reduction in the number of bends in the air flow path.

In accordance with this broad aspect, there is provided a hand vacuum cleaner having a front end, a rear end, an upper end, a lower end, and first and second laterally spaced apart sides, and comprising:
(a) an air flow path extending from a dirty air inlet to a clean air outlet;
(b) a cyclone assembly comprising a cyclone chamber positioned in the air flow path and having a cyclone air inlet, a cyclone air outlet, and a cyclone axis of rotation, wherein the cyclone axis of rotation extends generally in a forward/rearward direction;
(c) a pre-motor filter positioned downstream of the cyclone air outlet; and,
(d) a suction motor positioned in the air flow path downstream of the pre-motor filter and upstream of the clean air outlet and having a suction motor axis of rotation;
wherein the pre-motor filter is vertically spaced from the cyclone axis of rotation when the upper end of the hand vacuum cleaner is positioned above the lower end of the hand vacuum cleaner, and
wherein air travels generally rearwardly from the pre-motor filter to the suction motor.

In some embodiments, the pre-motor filter may be vertically spaced from the cyclone chamber when the upper end of the hand vacuum cleaner is positioned above the lower end of the hand vacuum cleaner.

In some embodiments, the cyclone assembly may comprise a sidewall that extends generally parallel to the cyclone axis of rotation and the pre-motor filter may have an upstream surface that extends generally parallel to the sidewall of the cyclone assembly.

In some embodiments, the pre-motor filter may have a downstream surface that is opposed to the upstream surface, and air may exit the downstream surface in a generally vertical direction when the upper end of the hand vacuum cleaner is positioned above the lower end of the hand vacuum cleaner.

In some embodiments, the pre-motor filter may at least partially overlie the cyclone chamber.

In some embodiments, the suction motor axis of rotation may be generally parallel to the cyclone axis of rotation.

In some embodiments, the suction motor may be positioned rearward of the cyclone chamber and the suction motor axis of rotation may be generally parallel to the cyclone axis of rotation.

In some embodiments, the pre-motor filter may comprise a generally cylindrical filter having a hollow interior wherein the suction motor has an inlet end that faces towards the hollow interior.

In some embodiments, the generally cylindrical filter may have an outer upstream surface and an inner downstream surface defining the hollow interior and the suction motor axis of rotation may intersect the hollow interior.

In some embodiments, the cyclone assembly may comprise a sidewall that extends generally parallel to the cyclone axis of rotation and the upstream surface of the pre-motor filter may extend generally parallel to the sidewall of the cyclone assembly.

In some embodiments, the pre-motor filter may at least partially overlie the cyclone chamber.

In some embodiments, the hand vacuum cleaner may further comprise a handle having a hand grip portion that extends upwardly and forwardly when the upper end of the hand vacuum cleaner is positioned above the lower end of the hand vacuum cleaner wherein the suction motor is located at an upper end of the handle.

In some embodiments, the suction motor may be positioned rearward of the cyclone chamber.

In some embodiments, the suction motor may be located at an upper end of the hand grip portion.

Also in accordance with this broad aspect, there is provided a hand vacuum cleaner having a front end, a rear end, an upper end, a lower end, and first and second laterally spaced apart sides, and comprising:
(a) an air flow path extending from a dirty air inlet to a clean air outlet;
(b) a cyclone assembly comprising a cyclone chamber positioned in the air flow path and having a cyclone air inlet, a cyclone air outlet and a cyclone axis of rotation, wherein the cyclone axis of rotation extends generally in a forward/rearward direction;
(c) a generally cylindrical pre-motor filter positioned downstream of the cyclone air outlet and having a hollow interior; and,
(d) a suction motor positioned in the air flow path downstream of the pre-motor filter and upstream of the clean air outlet and having a suction motor axis of rotation that is generally parallel to the cyclone axis of rotation, wherein the suction motor has an inlet end that faces towards the hollow interior.

In some embodiments, the generally cylindrical filter may have an outer upstream surface and an inner downstream surface defining the hollow interior and the suction motor axis of rotation may intersect the hollow interior.

In some embodiments, the cyclone assembly may comprise a sidewall that extends generally parallel to the cyclone axis of rotation and the upstream surface of the pre-motor filter may extend generally parallel to the sidewall of the cyclone assembly.

In some embodiments, the pre-motor filter may at least partially overlie the cyclone chamber.

In accordance with another aspect of this disclosure, which may be used alone or in combination with any other aspect, it may be desirable for a hand vacuum cleaner to have a compact overall form, for example so it can be maneuvered around and/or between objects when being carried by a user while cleaning one or more surfaces. A compact form may also improve the ergonomics of the hand vacuum (e.g. the perceived balance or 'hand feel' when carried by a user). Typically, the suction motor and energy storage members (e.g. one or more batteries) may be among the heavier (if not the heaviest) individual components of the hand vacuum cleaner. While positioning the suction motor and energy storage members adjacent to each other may promote a compact design, such an arrangement may promote an undesirable concentration of mass relative to a handle of the hand vacuum cleaner. Positioning the suction motor at an upper end of a forwardly-inclined handle and rearward of at least some of the energy storage members, particularly when some or all of the energy storage members are forward of the handle, may help distribute the weight of the motor and batteries, and may affect the hand feel and/or perceived balance of the hand vacuum.

In accordance with this broad aspect, there is provided a hand vacuum cleaner having a front end, a rear end, an upper end, a lower end, and first and second laterally spaced apart sides, and comprising:

(a) an air flow path extending from a dirty air inlet to a clean air outlet;
(b) a handle having a hand grip portion that extends upwardly and forwardly when the upper end of the hand vacuum cleaner is positioned above the lower end of the hand vacuum cleaner;
(c) a cyclone chamber positioned in the air flow path and having a cyclone air inlet, a cyclone air outlet, and a cyclone axis of rotation;
(d) at least one energy storage member positioned in an energy storage chamber; and,
(e) a suction motor positioned in the air flow path upstream of the clean air outlet, wherein the suction motor is located at an upper end of the handle and rearward of the at least one energy storage member when the upper end of the hand vacuum cleaner is positioned above the lower end of the hand vacuum cleaner.

In some embodiments, the suction motor may be located at an upper end of the hand grip portion.

In some embodiments, the at least one energy storage member may comprise a plurality of energy storage members wherein at least some of the plurality of energy storage members may be arranged one above another in a generally upwardly extending configuration when the upper end of the hand vacuum cleaner is positioned above the lower end of the hand vacuum cleaner and the suction motor may be positioned rearward of at least some of the energy storage members when the upper end of the hand vacuum cleaner is positioned above the lower end of the hand vacuum cleaner.

In some embodiments, the cyclone axis of rotation may intersect a volume defined by the generally upwardly extending configuration of energy storage members.

In some embodiments, the cyclone axis of rotation may extend generally in a forward/rearward direction.

In some embodiments, the at least one energy storage member may comprise a plurality of energy storage members wherein at least some of the plurality of energy storage members may be arranged one above another in a generally upwardly extending configuration when the upper end of the hand vacuum cleaner is positioned above the lower end of the hand vacuum cleaner and the suction motor may be positioned rearward of an upper end of the plurality of energy storage members when the upper end of the hand vacuum cleaner is positioned above the lower end of the hand vacuum cleaner.

In some embodiments, the cyclone axis of rotation may extend generally in a forward/rearward direction.

In some embodiments, the suction motor may be positioned above the cyclone axis of rotation when the upper end of the hand vacuum cleaner is positioned above the lower end of the hand vacuum cleaner.

In some embodiments, the hand vacuum may further comprise a pre-motor filter positioned in the air flow path downstream of the cyclone chamber, the pre-motor filter comprising a generally cylindrical filter having a hollow interior wherein the suction motor has an inlet end that faces towards the hollow interior.

In some embodiments, the generally cylindrical filter may have an outer upstream surface and an inner downstream surface defining the hollow interior and the suction motor axis of rotation may intersect the hollow interior.

In some embodiments, the cyclone chamber may comprise a sidewall that extends generally parallel to the cyclone axis of rotation and the upstream surface of the pre-motor filter may extend generally parallel to the sidewall of the cyclone chamber.

In some embodiments, the pre-motor filter may at least partially overlie the cyclone chamber.

In some embodiments, the dirty air inlet may have a dirty air inlet axis that extends generally rearwardly and may be positioned above the cyclone chamber.

In some embodiments, the dirty air inlet axis may intersect a volume defined by a pre-motor filter housing.

In some embodiments, the dirty air inlet axis may intersect the suction motor.

In some embodiments, the hand vacuum may further comprise a pre-motor filter positioned in the air flow path downstream of the cyclone chamber, the pre-motor filter comprising a generally cylindrical filter having a hollow interior wherein the dirty air inlet has a dirty air inlet axis that extends generally rearwardly and intersects the hollow interior.

In some embodiments, the dirty air inlet axis may intersect the suction motor.

In accordance with another aspect of this disclosure, which may be used alone or in combination with any other aspect, a hand vacuum cleaner may have an energy storage member (e.g. a battery pack that includes one or more battery cells) that is inclined so that a portion of a dirt collection region may be located below a portion of the energy storage member. Providing at least some vertical overlap between an energy storage member and a dirt collection region may help provide a relatively larger dirt chamber capacity while helping to reduce the overall size of the hand vacuum. Also, as the energy storage members (e.g. one or more batteries) may typically be among the heavier individual components of the hand vacuum cleaner, such a configuration may help provide a compact overall design, while distributing the weight of the batteries to promote a desirable hand feel and/or perceived balance of the hand vacuum.

In accordance with this broad aspect, there is provided a hand vacuum cleaner having a front end, a rear end, an upper end, a lower end, and first and second laterally spaced apart sides, and comprising:
(a) an air flow path extending from a dirty air inlet to a clean air outlet;
(b) a cyclone assembly positioned in the air flow path and having a cyclone assembly air inlet, a cyclone assembly air outlet, a dirt collection region, and a cyclone axis of rotation;
(c) a suction motor positioned in the air flow path upstream of the clean air outlet; and,
(d) a longitudinally extending battery pack wherein the battery pack extends upwardly and forwardly when the upper end of the hand vacuum cleaner is positioned above the lower end of the hand vacuum cleaner,
wherein a portion of the dirt collection region is located below a portion of the battery pack.

In some embodiments, the dirt collection region may have an upper portion and a lower portion when the upper end of the hand vacuum cleaner is positioned above the lower end of the hand vacuum cleaner and the lower portion of the dirt collection region may be positioned rearwardly of the upper portion of the dirt collection region.

In some embodiments, a rear wall of the dirt collection chamber may be at a first angle to a vertical axis.

In some embodiments, the battery pack may be located in a battery pack chamber, the battery pack chamber having a front wall that is at a second angle to a vertical axis.

In some embodiments, the first and second angles may be about the same.

In some embodiments, the battery pack may extend generally linearly.

In some embodiments, the battery pack may be removably receivable in the hand vacuum cleaner.

In some embodiments, the battery pack may be removably receivable in the hand vacuum cleaner, a rear wall of the dirt collection chamber may be at a first angle to a vertical axis and the battery pack may have a front wall that is at a second angle to a vertical axis, wherein the first and second angles may be about the same.

In some embodiments, the dirt collection region may be at a lower end of the hand vacuum cleaner and the battery pack may be slidably insertable into the lower end of the hand vacuum cleaner.

Also in accordance with this broad aspect, there is provided a hand vacuum cleaner having a front end, a rear end, an upper end, a lower end, and first and second laterally spaced apart sides, and comprising:
(a) an air flow path extending from a dirty air inlet to a clean air outlet;
(b) a cyclone assembly positioned in the air flow path and having a cyclone assembly air inlet, a cyclone assembly air outlet, a dirt collection region, and a cyclone axis of rotation;
(c) a suction motor positioned in the air flow path upstream of the clean air outlet; and,
(d) a plurality of energy storage members arranged one above another in a generally upwardly extending configuration when the upper end of the hand vacuum cleaner is positioned above the lower end of the hand vacuum cleaner, the configuration having a forward side and a rearward side,
wherein a lower end of the forward side of the configuration of energy storage members is positioned rearward of an another portion of the forward side of the configuration when the upper end of the hand vacuum cleaner is positioned above the lower end of the hand vacuum cleaner, and,
wherein a portion of the dirt collection region is located below at least a portion of one of the energy storage members.

In some embodiments, the dirt collection region may have an upper portion and a lower portion when the upper end of the hand vacuum cleaner is positioned above the lower end of the hand vacuum cleaner and the lower portion of the dirt collection region may be positioned rearwardly of the upper portion of the dirt collection region.

In some embodiments, a rear wall of the dirt collection chamber may be at a first angle to a vertical axis.

In some embodiments, the energy storage members may be located in an energy storage member chamber, and the energy storage member chamber may have a front wall that is at a second angle to a vertical axis.

In some embodiments, the first and second angles may be about the same.

In some embodiments, the configuration of energy storage members may extend generally linearly.

In some embodiments, the energy storage members may be removably receivable in the hand vacuum cleaner.

In some embodiments, the energy storage members may be removably receivable in the hand vacuum cleaner, a rear wall of the dirt collection chamber may be at a first angle to a vertical axis and the configuration of energy storage members may have a front side that is at a second angle to a vertical axis, wherein the first and second angles may be about the same.

In some embodiments, the dirt collection region may be at a lower end of the hand vacuum cleaner and the energy storage members may be slidably insertable into the lower end of the hand vacuum cleaner.

Also in accordance with this broad aspect, there is provided a hand vacuum cleaner having a front end, a rear end, an upper end, a lower end, and first and second laterally spaced apart sides, and comprising:
(a) an air flow path extending from a dirty air inlet to a clean air outlet;
(b) a cyclone assembly positioned in the air flow path and having a cyclone assembly air inlet, a cyclone assembly air outlet, a dirt collection region, and a cyclone axis of rotation;
(c) a suction motor positioned in the air flow path upstream of the clean air outlet; and,
(d) a power pack that extends upwardly and forwardly when the upper end of the hand vacuum cleaner is positioned above the lower end of the hand vacuum cleaner,
wherein the dirt collection region has a rear wall that extends upwardly and forwardly when the upper end of the hand vacuum cleaner is positioned above the lower end of the hand vacuum cleaner whereby at least a portion of the dirt collection region is below at least a portion of the power pack.

In some embodiments, the dirt collection region may be at a lower end of the hand vacuum cleaner and the rear wall of the dirt collection chamber may be located proximate a front side of the power pack.

In accordance with another aspect of this disclosure, which may be used alone or in combination with any other aspect, a hand vacuum cleaner may have an energy storage member (e.g. a battery pack that includes one or more battery cells) that is positioned rearward of a dirt collection region and at least partially underlies at least a portion of one or both of a cyclone chamber and a pre-motor filter. Providing at least some vertical overlap between an energy storage member and a cyclone chamber and/or a pre-motor filter may help to reduce the overall size (length front to back) of the hand vacuum and may therefore reduce the torque exerted on the hand of a user as the moment arm between the front of the hand vacuum cleaner and the handle may be reduced. Also, as the energy storage member (e.g. one or more batteries) may typically be among the heavier individual components of the hand vacuum cleaner, such a configuration may help provide a compact overall design without adversely affecting the hand feel and/or perceived balance of the hand vacuum.

In accordance with this broad aspect, there is provided hand vacuum cleaner having a front end, a rear end, an upper end, a lower end, and first and second laterally spaced apart sides, and comprising:
(a) an air flow path extending from a dirty air inlet to a clean air outlet;
(b) a cyclone assembly positioned in the air flow path and having a cyclone assembly air inlet, a cyclone assembly air outlet, a cyclone chamber, a dirt collection region, and a cyclone axis of rotation;
(c) a pre-motor filter downstream of the cyclone chamber;
(d) a suction motor positioned in the air flow path upstream of the clean air outlet; and,
(e) a battery pack wherein at least a portion of the battery pack is positioned rearward of the dirt collection region and at least a portion of the battery pack underlies at least a portion of one or both of the cyclone chamber and the pre-motor filter.

In some embodiments, the cyclone axis of rotation may extend generally in a forward/rearward direction.

In some embodiments, at least a portion of, or substantially all of or the entire battery pack may underlie at least a portion of the cyclone chamber, substantially all of the cyclone chamber or the entire cyclone chamber.

In some embodiments, at least a portion of, or substantially all of or the entire battery pack may underlie at least a portion of the pre-motor filter, substantially all of the pre-motor filter or the entire pre-motor filter.

In some embodiments, the battery pack may comprise at least a plurality of energy storage members wherein the energy storage members may be arranged in at least two columns in the forward/rearward direction.

In some embodiments, the dirt collection region may be at a lower end of the hand vacuum cleaner and the battery pack may be slidably insertable into the lower end of the hand vacuum cleaner.

In some embodiments, the hand vacuum may further comprise a handle and a finger gap positioned between the handle and the battery pack.

Also in accordance with this broad aspect, there is provided a hand vacuum cleaner having a front end, a rear end, an upper end, a lower end, and first and second laterally spaced apart sides, and comprising:
 (a) an air flow path extending from a dirty air inlet to a clean air outlet;
 (b) a cyclone assembly positioned in the air flow path and having a cyclone assembly air inlet, a cyclone assembly air outlet, a cyclone chamber, a dirt collection region, and a cyclone axis of rotation;
 (c) a pre-motor filter downstream of the cyclone chamber;
 (d) a suction motor positioned in the air flow path upstream of the clean air outlet; and,
 (e) a plurality of energy storage members provided in a lower portion of the hand vacuum cleaner, wherein some of the energy storage members are arranged one above another and some are arranged one behind another and wherein at least some of the energy storage members underlie at least a portion of one or both of the cyclone chamber and the pre-motor filter.

In some embodiments, at least a portion of the energy storage members may be positioned rearward of the dirt collection region.

In some embodiments, the cyclone axis of rotation may extend generally in a forward/rearward direction.

In some embodiments, the at least a portion of, or substantially all of or all of the energy storage members may underlie at least a portion of the cyclone chamber, substantially all of the cyclone chamber or the entire cyclone chamber In some embodiments, the at least a portion of, or substantially all of or all of the energy storage members may underlie at least a portion of the pre-motor filter, substantially all of the pre-motor filter or the entire pre-motor filter.

In some embodiments, the dirt collection region is at a lower end of the hand vacuum cleaner and the energy storage members are slidably insertable into the lower end of the hand vacuum cleaner.

In some embodiments, at least a portion of the energy storage members may be positioned rearward of the dirt collection region.

In some embodiments, the hand vacuum may further comprise a handle and a finger gap positioned between the handle and the energy storage members.

In accordance with another aspect of this disclosure, which may be used alone or in combination with any other aspect, a hand vacuum cleaner may have a cyclone chamber with a cyclone axis of rotation that extends in a forward/rearward direction, and a suction motor with a suction motor axis that also extends in a forward/rearward direction, where the suction motor is located at an upper end of a handle of the vacuum cleaner and the suction motor axis is vertically displaced from the cyclone axis of rotation. Such a configuration may have one or more advantages. For example, it may facilitate the reduction of conduit bends and/or air flow direction changes between a dirty air inlet and a clean air outlet, thereby reducing backpressure and/or air flow losses through this portion of the hand vacuum cleaner due to a reduction in the number of bends in the air flow path. Additionally, or alternatively, such a configuration may help provide a compact overall design of the hand vacuum cleaner without adversely affecting the hand feel and/or perceived balance of the hand vacuum.

In accordance with this broad aspect, there is provided a hand vacuum cleaner having a front end, a rear end, an upper end, a lower end, and first and second laterally spaced apart sides, and comprising:
 (a) an air flow path extending from a dirty air inlet to a clean air outlet;
 (b) a handle having a hand grip portion that extends upwardly and forwardly when the upper end of the hand vacuum cleaner is positioned above the lower end of the hand vacuum cleaner, the handle being positioned at the rear end of the hand vacuum cleaner;
 (c) a cyclone chamber positioned in the air flow path and having a cyclone air inlet, a cyclone air outlet, and a cyclone axis of rotation that extends in a forward/rearward direction;
 (d) a pre-motor filter positioned downstream of the cyclone chamber and upstream of the suction motor; and,
 (e) a suction motor positioned in the air flow path upstream of the clean air outlet, wherein the suction motor has a suction motor axis of rotation that extends in a forward/rearward direction, wherein the suction motor is located at an upper end of the handle, and wherein the suction motor axis of rotation is vertically displaced from the cyclone axis of rotation when the upper end of the hand vacuum cleaner is positioned above the lower end of the hand vacuum cleaner.

In some embodiments, the suction motor may be located at an upper end of the hand grip portion.

In some embodiments, the cyclone axis of rotation may intersect the hand grip portion.

In some embodiments, the suction motor may be located rearward of the cyclone chamber.

In some embodiments, the suction motor may have an inlet that faces towards the pre-motor filter.

In some embodiments, the suction motor axis of rotation may intersect a volume defined by a pre-motor filter housing.

In some embodiments, the suction motor axis of rotation may extend through a central portion of a volume containing the pre-motor filter.

In some embodiments, the pre-motor filter may be positioned above the cyclone axis of rotation when the upper end of the hand vacuum cleaner is positioned above the lower end of the hand vacuum cleaner.

In some embodiments, the pre-motor filter may be positioned above the cyclone chamber when the upper end of the hand vacuum cleaner is positioned above the lower end of the hand vacuum cleaner.

In some embodiments, the cyclone axis of rotation may intersect the hand grip portion, the pre-motor filter may be positioned above the cyclone axis of rotation when the upper end of the hand vacuum cleaner is positioned above the lower end of the hand vacuum cleaner, and the suction motor axis of rotation may extend through a pre-motor filter housing.

In some embodiments, the pre-motor filter may comprise a generally cylindrical filter having a hollow interior wherein the suction motor axis of rotation intersects the hollow interior.

In some embodiments, after exiting a downstream side of the pre-motor filter, air travels generally linearly to the suction motor.

In some embodiments, the pre-motor filter may comprise a generally cylindrical filter having a hollow interior wherein the dirty air inlet has a dirty air inlet axis that extends generally rearwardly and intersects the hollow interior.

In some embodiments, the dirty air inlet axis may intersect the suction motor.

In some embodiments, the cyclone axis of rotation may intersect the hand grip portion.

In some embodiments, the hand vacuum may further comprise a plurality of energy storage members wherein at least some of the plurality of energy storage members are arranged one above another in a generally upwardly extending configuration when the upper end of the hand vacuum cleaner is positioned above the lower end of the hand vacuum cleaner, and the suction motor may be positioned rearward of at least some of the energy storage members when the upper end of the hand vacuum cleaner is positioned above the lower end of the hand vacuum cleaner.

In accordance with another aspect of this disclosure, which may be used alone or in combination with any other aspect, a surface cleaning apparatus may have a removable pre-motor filter assembly having an outlet conduit wherein a terminal end of the outlet conduit extends at a first angle to a direction of air flow through the outlet conduit. An advantage of this design is that the terminal end of the outlet conduit may be positioned substantially flush against another air conduit having a similarly angled terminal end without requiring lateral movement of the outlet conduit towards other conduit. Accordingly, a filter assembly may be removed and inserted by moving the filter assembly substantially perpendicular to the direction of airflow exiting the filter assembly. Such an arrangement may, for example, facilitate the use of a gasket or other sealing member between the ends of the conduits to provide an improved seal between the conduits. Such an arrangement may also eliminate the need for a biasing or other retaining mechanism to exert a force on the filter assembly to maintain a seal between the conduits.

In accordance with this broad aspect, there is provided a surface cleaning apparatus comprising:
 (a) an air flow path extending from a dirty air inlet to a clean air outlet;
 (b) an air treatment member positioned in the air flow path; and
 (c) a removable pre-motor filter assembly positioned downstream of the air treatment member and upstream of a suction motor, the pre-motor filter assembly comprising a pre-motor filter and a filter support member, the filter support member having an outlet conduit wherein a terminal end of the outlet conduit extends at a first angle to a direction of air flow through the outlet conduit.

In some embodiments, the pre-motor filter may comprise a generally cylindrical filter having a hollow interior positioned about a body portion of the filter support member having an internal filter conduit, wherein the outlet conduit is in air flow communication with the hollow interior via the internal filter conduit.

In some embodiments, the outlet conduit may be aligned with the hollow interior.

In some embodiments, the body portion of the filter support member may include a porous portion located in the hollow interior and positioned between a downstream surface of the pre-motor filter and the internal filter conduit.

In some embodiments, the hollow interior may comprise a longitudinally extending passage having an outlet end from which the outlet conduit extends away and an opposed end wherein the opposed end is sealed.

In some embodiments, the opposed end may be sealed by a sealing member that extends into the hollow interior, the sealing member having a solid wall extending inwardly and located between a downstream surface of the pre-motor filter and the passage.

In some embodiments, the filter support member may have a body portion having an internal filter conduit that may extend into a hollow interior of the pre-motor filter, the body portion may have a solid wall extending inwardly and located between a downstream surface of the pre-motor filter and the internal filter conduit.

In some embodiments, the body portion of the filter support member may include a porous portion located in the hollow interior and positioned between a downstream surface of the pre-motor filter and the internal filter conduit and is upstream of the outlet conduit.

In some embodiments, the internal filter conduit may comprise a longitudinally extending passage having an outlet end from which the outlet conduit extends away and a second end, wherein the second end is sealed.

In some embodiments, the second end may be sealed by a sealing member that extends into the hollow interior, the sealing member having a solid wall extending inwardly and located between a downstream surface of the pre-motor filter and the internal filter conduit.

In some embodiments, the sealing member and the body portion define a continuous member extending through the hollow interior.

In some embodiments, the surface cleaning apparatus may further comprise a treated air conduit extending from the outlet conduit towards the suction motor, wherein an inlet end of the treated air conduit may also extend at about the first angle to a direction of air flow through the outlet conduit.

In some embodiments, the surface cleaning apparatus may further comprise a treated air conduit extending from the outlet conduit towards the suction motor, wherein an inlet end of the treated air conduit may also extend at a second angle to a direction of air flow through the outlet conduit and the terminal end of the outlet conduit may abut the inlet end of the treated air conduit when the filter assembly is positioned in the air flow path.

In some embodiments, the first and second angles may be about the same.

In some embodiments, the surface cleaning apparatus may further comprise a gasket provided at an interface of the terminal end of the outlet conduit and the inlet end of the treated air conduit.

In some embodiments, the filter assembly may be removable in a filter assembly removal direction that is at an angle to the direction of air flow through the outlet conduit.

In some embodiments, the filter assembly may be removable through an openable door and a side of the terminal end that is closest to the openable door may extend further in the direction of air flow though the outlet conduit than an opposed side of the terminal end that is further from the openable door.

In some embodiments, a side of the inlet end of the treated air conduit that is furthest from the openable door may extend further in the direction of air flow though the outlet conduit than an opposed side of the inlet end that is closest to the openable door.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 50 is a perspective view of the hand vacuum cleaner of FIG. 46, with a front door or lid in an open position;

Figure 1:
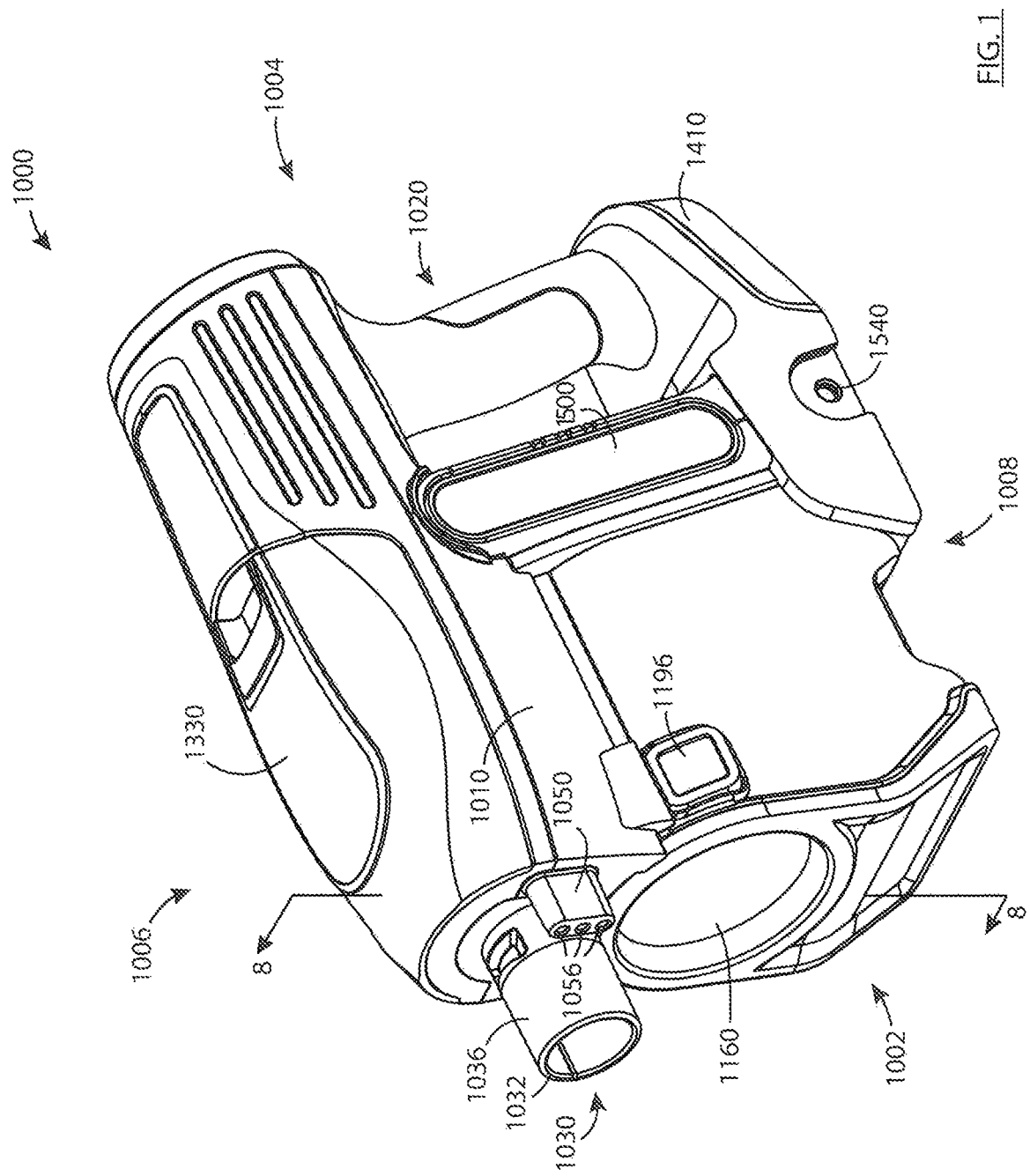
FIG. 1 is a top perspective view of a hand vacuum cleaner in accordance with one embodiment.
Figure 2:
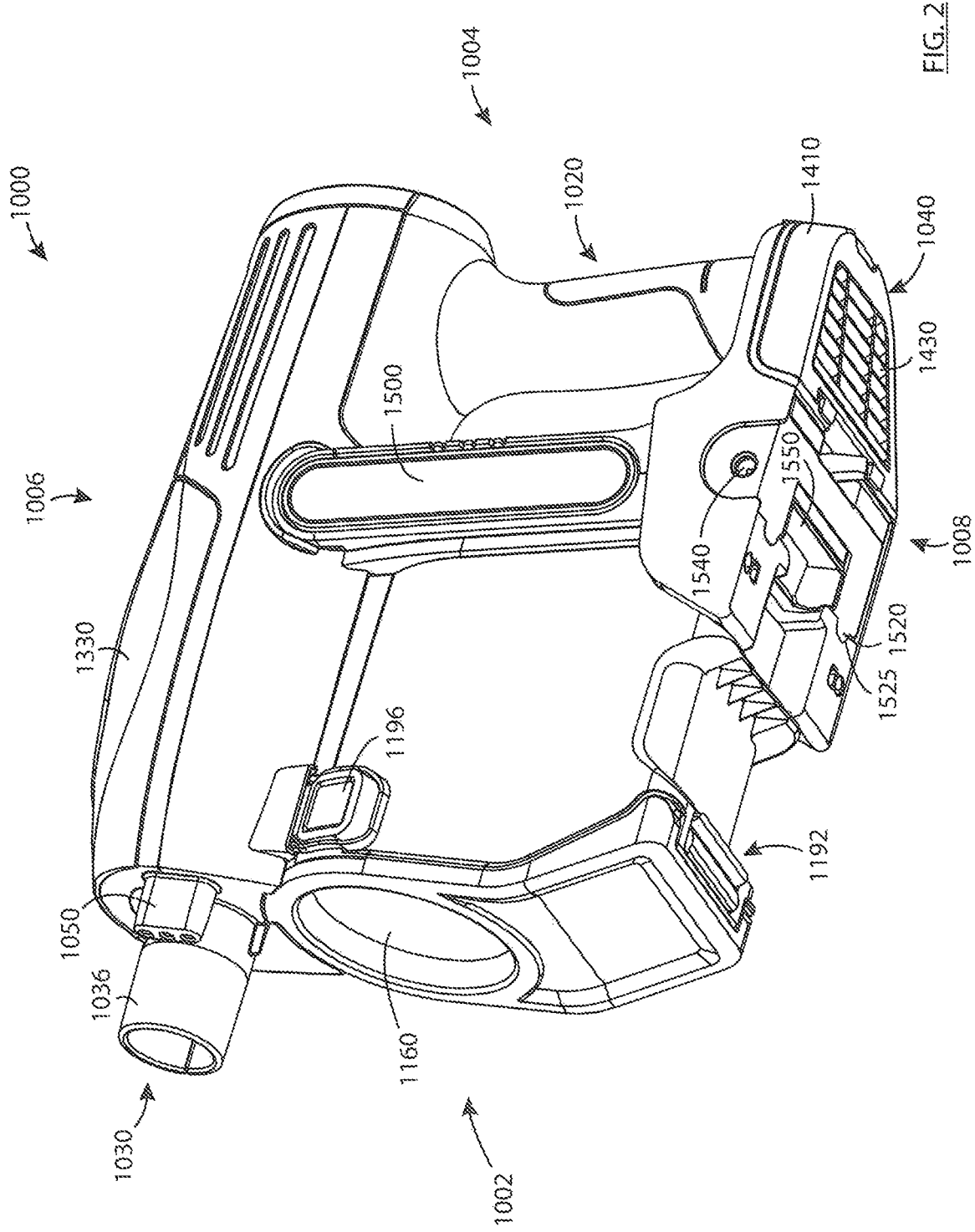
FIG. 2 is a bottom perspective view of the hand vacuum cleaner of FIG. 1.
Figure 3:
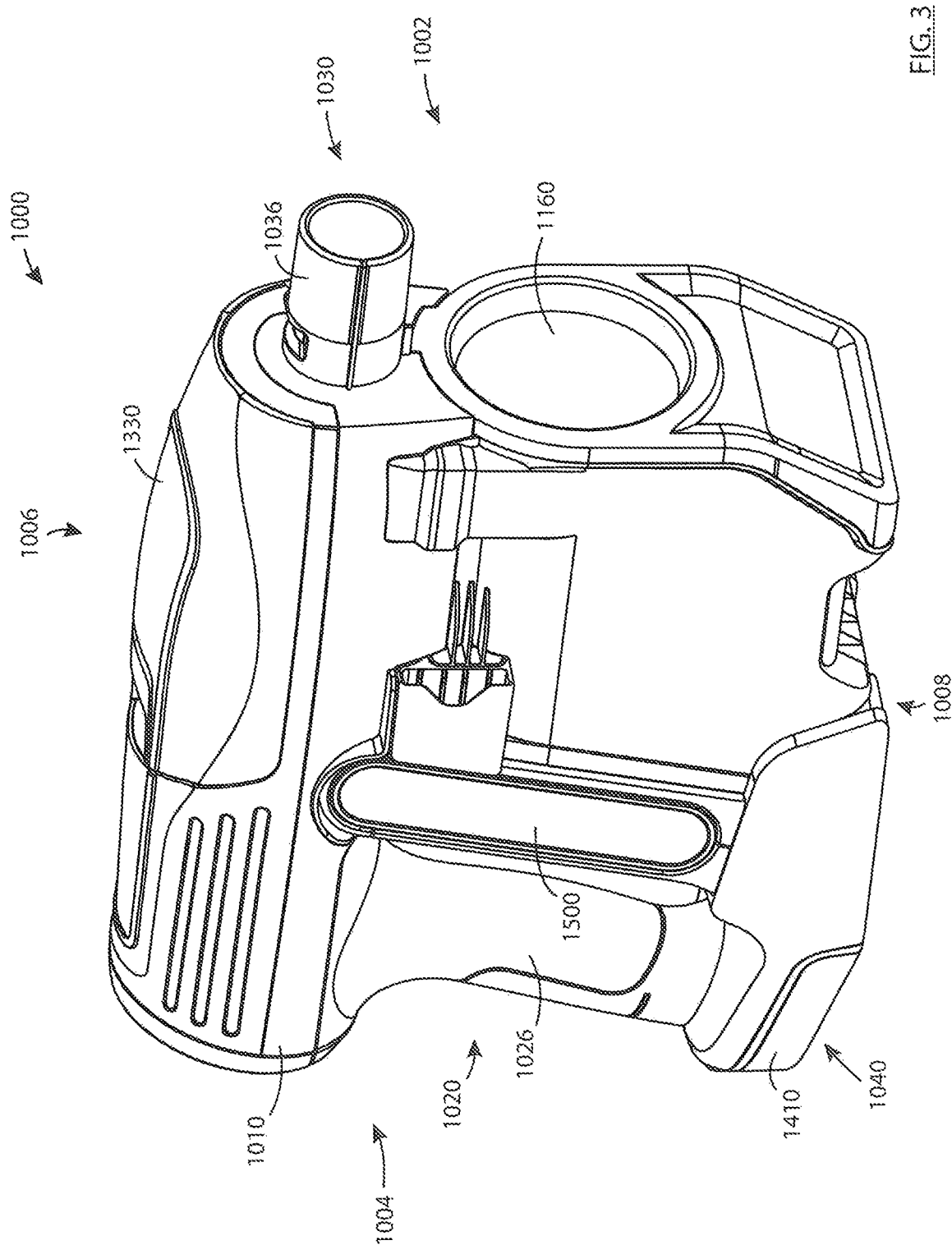
FIG. 3 is a side perspective view of the hand vacuum cleaner of FIG. 1.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

General Description of a Hand Vacuum Cleaner

Referring to FIGS. 1 to 34, an exemplary embodiment of a surface cleaning apparatus is shown generally as 1000. The following is a general discussion of this embodiment which provides a basis for understanding several of the features which are discussed herein. As discussed subsequently, each of the features may be used individually or in any particular combination or sub-combination in this or in other embodiments disclosed herein.

In the illustrated embodiment, the surface cleaning apparatus is a hand vacuum cleaner, which may also be referred to also as a "handvac" or "hand-held vacuum cleaner". As used herein, a hand vacuum cleaner is a vacuum cleaner that can be operated to clean a surface generally one-handedly. That is, the entire weight of the vacuum may be held by the same one hand used to direct a dirty air inlet of the vacuum cleaner with respect to a surface to be cleaned. For example, the handle and a clean air inlet may be rigidly coupled to each other (directly or indirectly) so as to move as one while maintaining a constant orientation relative to each other. This is to be contrasted with canister and upright vacuum cleaners, whose weight is typically supported by a surface (e.g. a floor) during use.

As exemplified in FIGS. 1 to 7, surface cleaning apparatus 1000 includes a main body 1010 having a housing 1011 and a handle 1020, an air treatment member 1100 connected to the main body 1010, a dirty air inlet 1030, a clean air outlet 1040, and an air flow path extending between the dirty air inlet and the clean air outlet.

Surface cleaning apparatus 1000 has a front end 1002, a rear end 1004, an upper end or top 1006, and a lower end or bottom 1008. In the embodiment shown, dirty air inlet 1030 is at an upper portion of the front end 1102 and clean air outlet 1040 is at rearward portion of the lower end 1008. It will be appreciated that the dirty air inlet 1030 and the clean air outlet 1040 may be provided in different locations.

A suction motor 1200 (see e.g. FIG. 10) is provided to generate vacuum suction through the air flow path, and is positioned within a motor housing 1210. In the illustrated embodiment, the suction motor is positioned downstream from the air treatment member, although it may be positioned upstream of the air treatment member (e.g., a dirty air motor) in alternative embodiments.

Air treatment member 1100 is configured to remove particles of dirt and other debris from the air flow and/or otherwise treat the air flow. In the illustrated example, air treatment member 1100 includes a cyclone assembly having a single cyclonic cleaning stage with a single cyclone chamber 1110 and a dirt collection region 1122 external to the cyclone chamber. The cyclone chamber 1110 and dirt collection region 1122 may be of any configuration suitable for separating dirt from an air stream and collecting the separated dirt, respectively.

The cyclone chamber 1110 may be oriented in any direction. For example, when surface cleaning apparatus 1000 is oriented with the upper end 1106 above the lower end 1108, e.g. positioned generally parallel to a horizontal surface, a central axis or axis of rotation 1115 of the cyclone chamber 1110 may be oriented horizontally, as exemplified in FIG.

10. In alternative embodiments, the cyclone chamber may be oriented vertically, or at any angle between horizontal and vertical.

In alternative embodiments, the cyclone assembly may include two or more cyclonic cleaning stages arranged in series with each other. Each cyclonic cleaning stage may include one or more cyclone chambers (arranged in parallel or series with each other) and one or more dirt collection chambers, of any suitable configuration. The dirt collection chamber or chambers may be external to the cyclone chambers, or may be internal the cyclone chamber and configured as a dirt collection area or region within the cyclone chamber. For example, in the embodiments exemplified in FIGS. 42 to 45 and 46 to 50, a second cyclonic cleaning stage is provided in series in what may be characterized as a 'nested' configuration. As exemplified in FIG. 43, after traveling generally axially though the cyclone chamber 1110 from the front end wall 1160 toward the rear end wall 1170, air exits cyclone chamber 1110 and enters a secondary cyclone chamber. A secondary dirt collection chamber 1121 is positioned exterior to the secondary cyclone chamber and is in communication with a dirt outlet 1141 to receive dirt and debris dis-entrained from a dirty air flow by the secondary cyclone chamber. In the embodiment exemplified in FIGS. 42 to 45, air exiting the secondary cyclone chamber travels generally rearwardly and enters a pre-motor chamber 1318 via air inlet 1234. In the embodiment exemplified in FIGS. 46 to 50, the secondary cyclone air outlet faces a rear wall 1236 of the upflow duct or conduit 1230 that directs air upwardly towards a pre-motor filter 1320. Alternatively, the air treatment member need not include a cyclonic cleaning stage, and can incorporate a bag, a porous physical filter media (such as foam or felt), or other air treating means.

Figure 10:
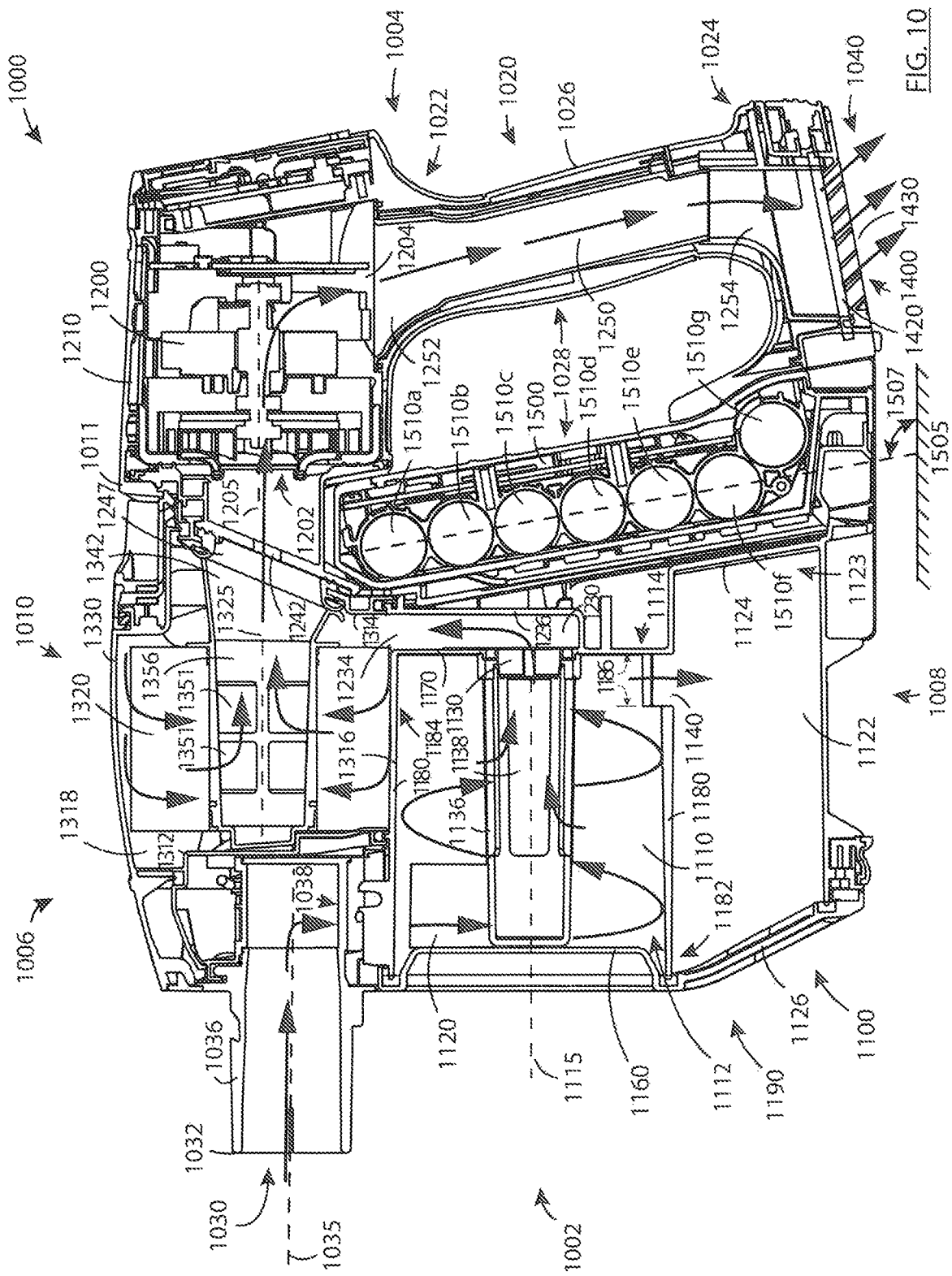
FIG. 10 is a cross-section view of the hand vacuum cleaner of FIG. 1, taken along line 9-9 in FIG. 5.
Figure 11:
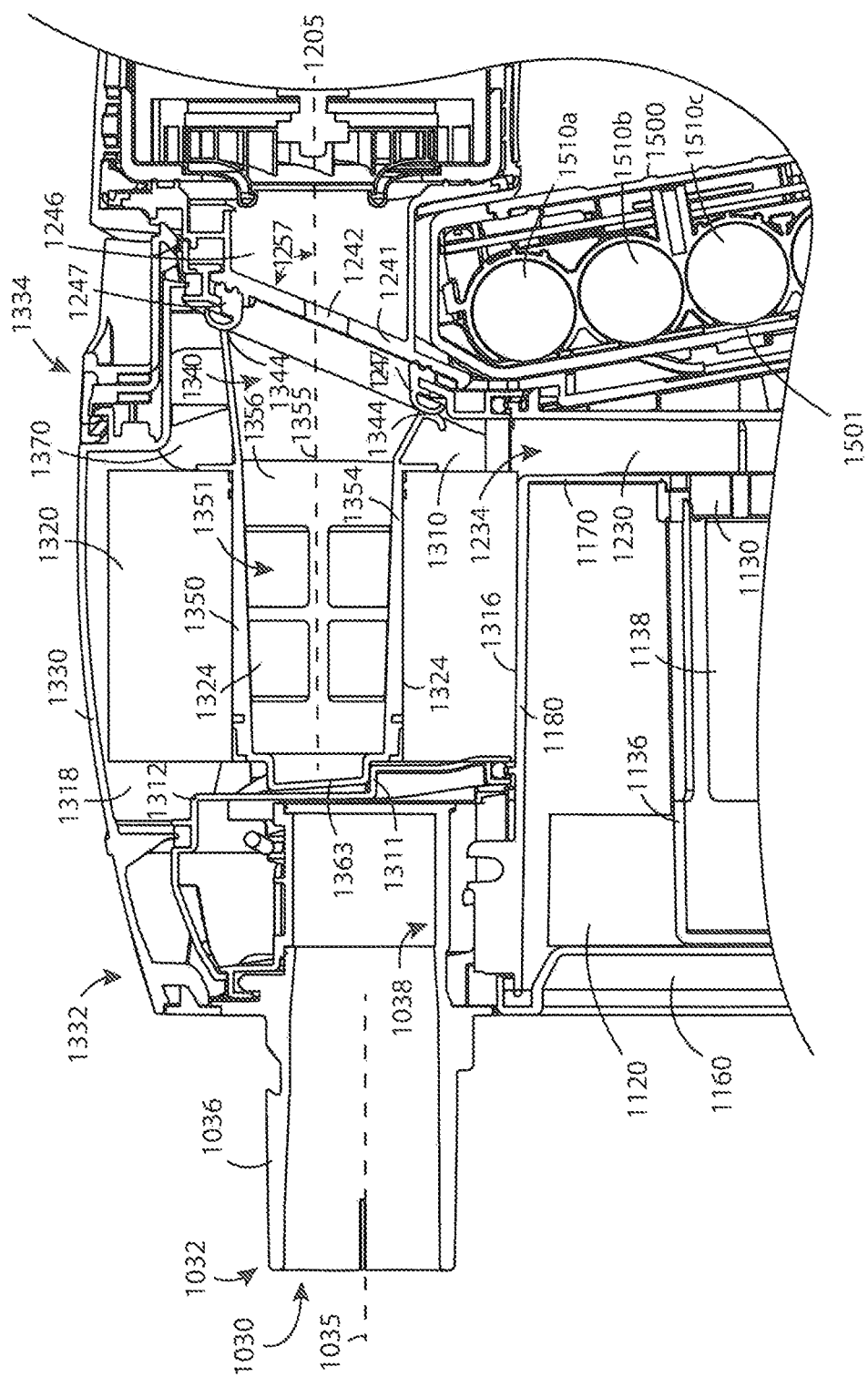
FIG. 11 is an enlarged view of the upper left portion of FIG. 10.
Figure 12:
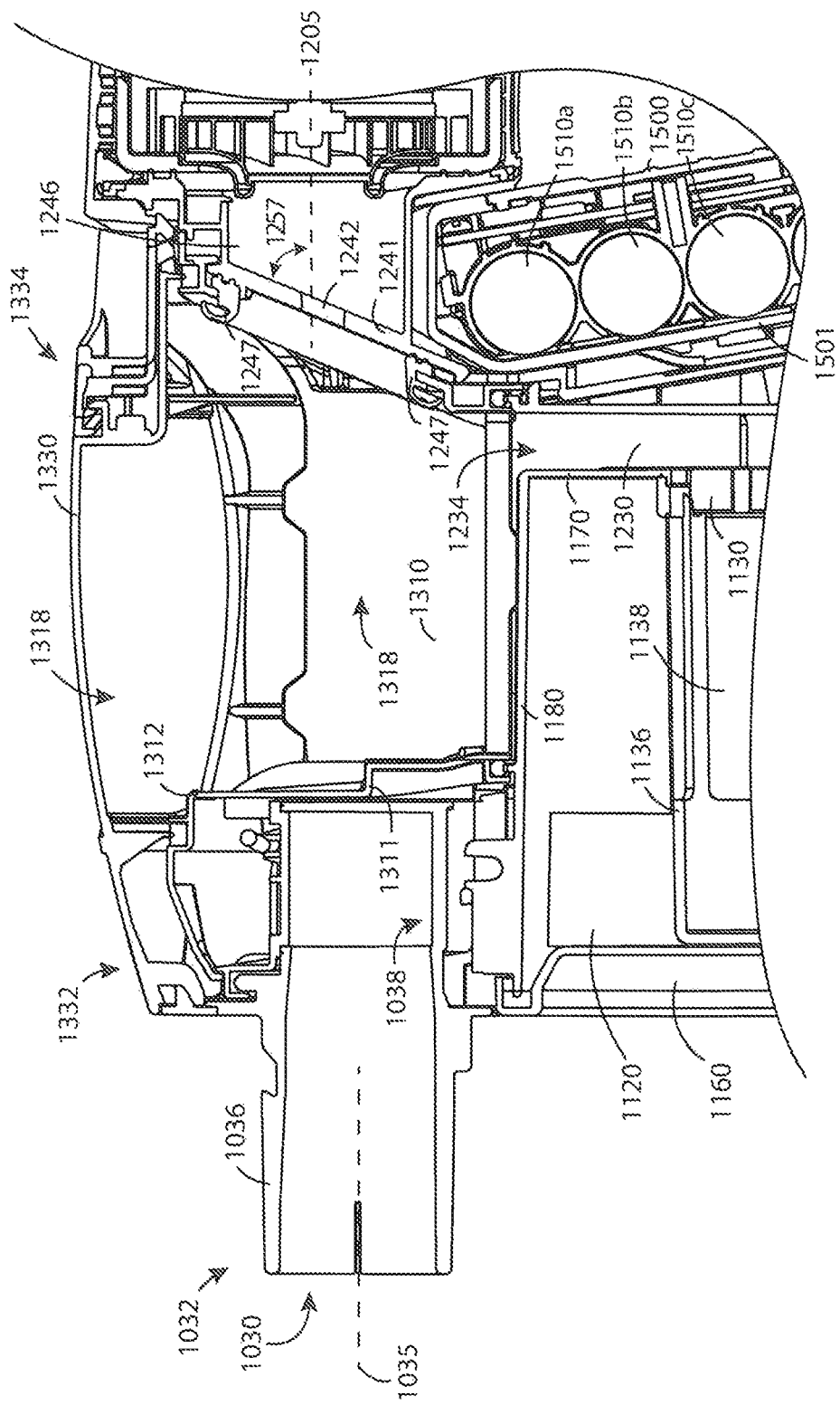
FIG. 12 is an enlarged view of the upper left portion of FIG. 10, with a pre-motor filter assembly removed.
Figure 13:
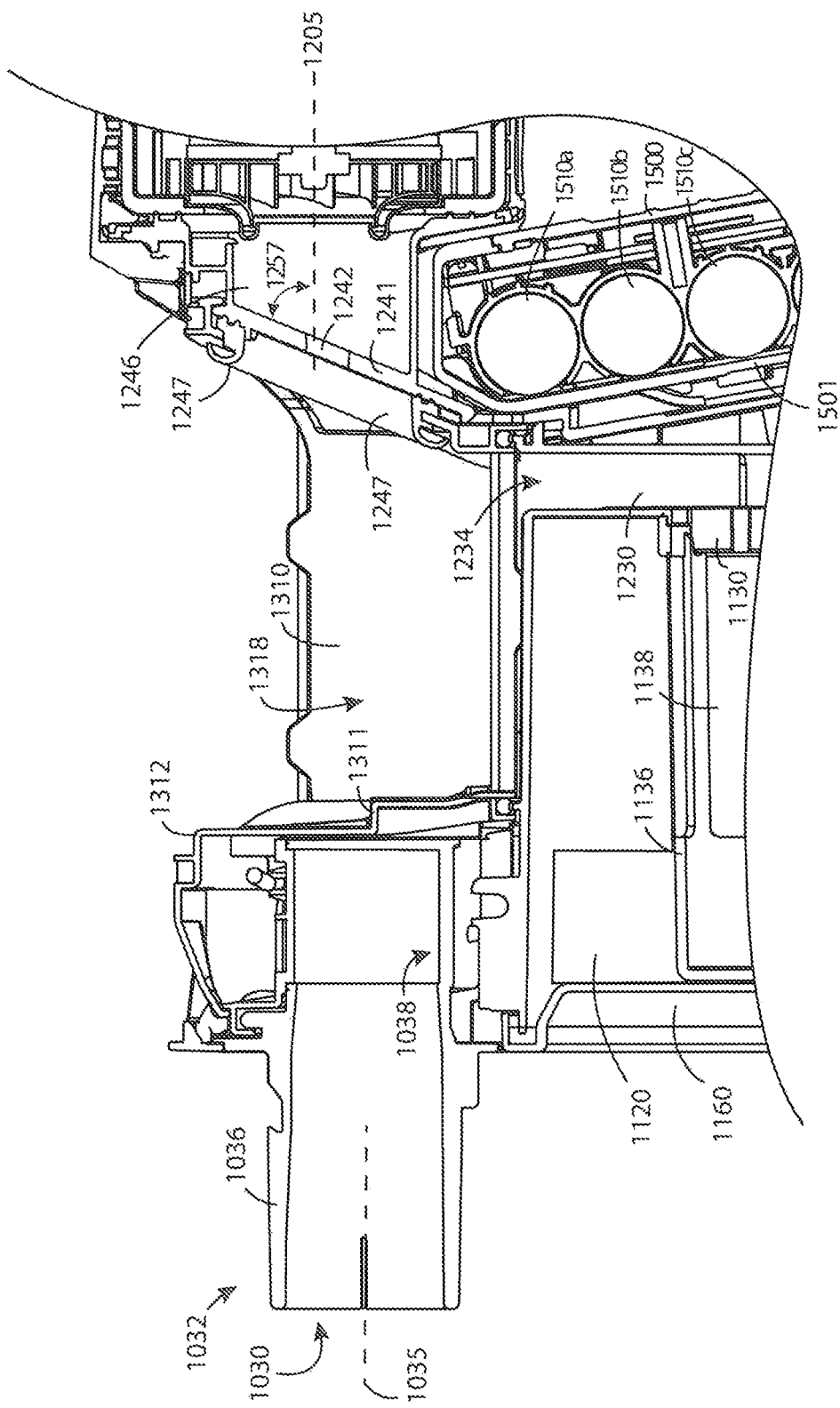
FIG. 13 is an enlarged view of the upper left portion of FIG. 10, with a pre-motor filter assembly and an openable door removed.
Figure 14:
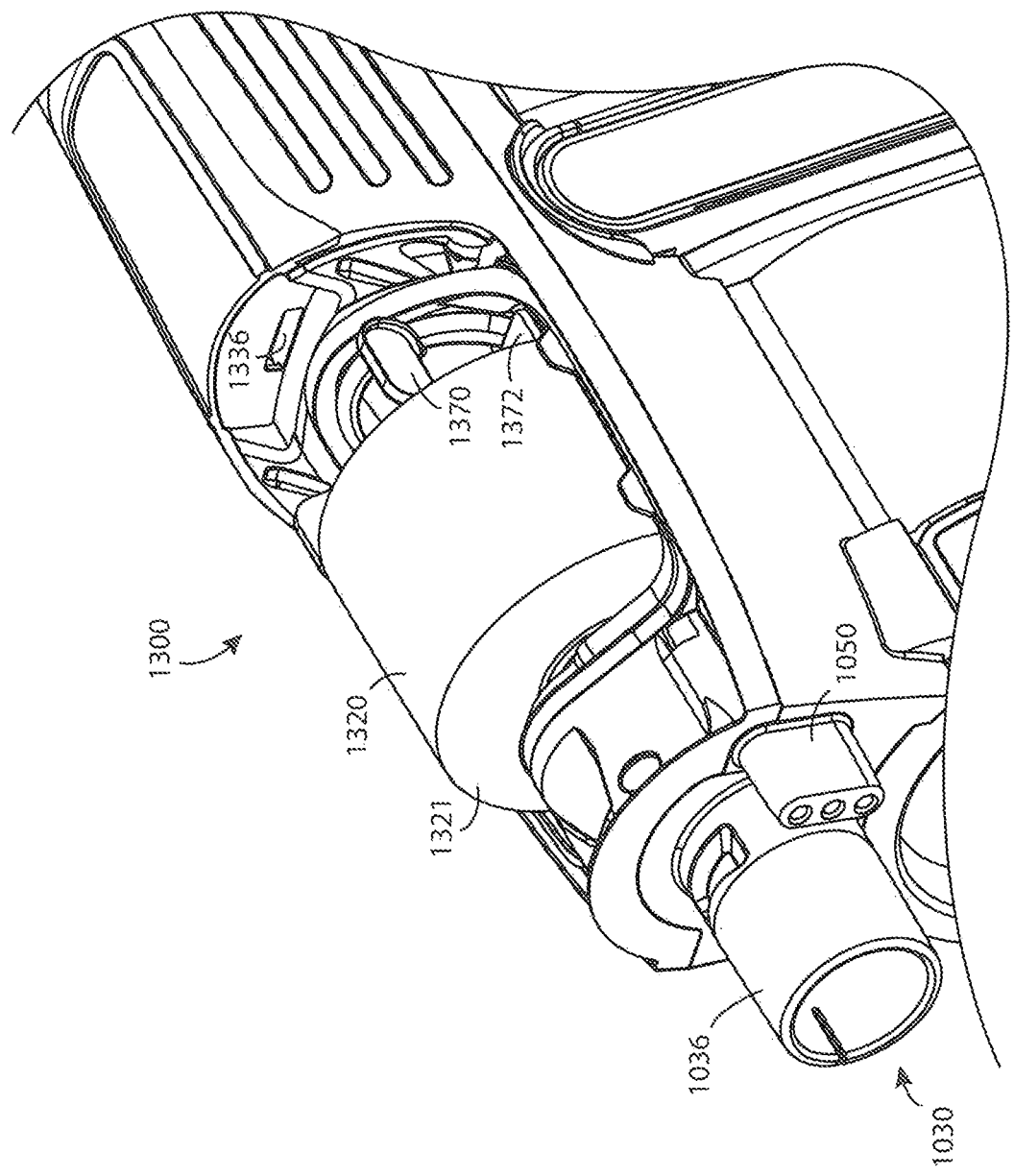
FIG. 14 is a top perspective view of the upper front portion of the hand vacuum cleaner of FIG. 1, with an openable door removed to expose a pre-motor filter assembly.

As exemplified in FIG. 10, hand vacuum cleaner 1000 may include a pre-motor filter housing 1310 provided in the air flow path downstream of the air treatment member 1100 and upstream of the suction motor 1200. Pre-motor filter housing 1310 may be of any suitable construction, including any of those exemplified herein. A pre-motor filter 1320 is positioned within the pre-motor filter housing 1310. Pre-motor filter 1320 may be formed from any suitable physical, porous filter media and having any suitable shape, including the examples disclosed herein with respect to a removable pre-motor filter assembly. For example, the pre-motor filter may be one or more of a foam filter, felt filter, HEPA filter, other physical filter media, electrostatic filter, and the like.

Optionally, the pre-motor filter housing 1310 may be openable (as described herein), and at least a portion of the sidewall 1316 (e.g. removable or otherwise openable door 1330) and/or one of the end walls 1312 or 1314 may be removable, openable, or otherwise re-configurable to provide access to the interior of the pre-motor filter housing 1310.

Positioning the pre-motor filter housing 1310 toward the top 1006 of the main body 1010 may help facilitate access to the pre-motor filter 1320 while the hand vacuum is resting on its base. For example, if the hand vacuum cleaner 1000 is rested upon a table or other such surface, an openable door 1330 of the pre-motor filter housing 1310 is provided at the upper end of the housing and is accessible to a user. A user could then open the pre-motor filter housing 1310 by removing or otherwise opening door 1330 while the hand vacuum 1000 rests on the table, to inspect or replace the pre-motor filter 1320, without having to use one hand to grasp the handle 1020 or otherwise support the hand vacuum.

As exemplified, hand vacuum cleaner 1000 may also include a post-motor filter 1420 provided in the air flow path downstream of the suction motor 1200 and upstream of the clean air outlet 1040. Post-motor filter 1420 may be formed from any suitable physical, porous filter media and having any suitable shape, including the examples disclosed herein. In alternative embodiments, the post-motor filter may be any suitable type of filter such as one or more of a foam filter, felt filter, HEPA filter, other physical filter media, electrostatic filter, and the like.

In the illustrated embodiment, the dirty air inlet 1030 of the hand vacuum cleaner 1000 is the inlet end 1032 of an inlet conduit 1036. Optionally, inlet end 1032 of the conduit 1036 can be used as a nozzle to directly clean a surface. The air inlet conduit 1036 is, in this example, a generally linear hollow member that extends along an inlet conduit axis 1035 that is oriented in a longitudinal forward/backward direction and is generally horizontal when hand vacuum cleaner 1000 is oriented with the upper end 1006 above the lower end 1008. Alternatively, or in addition to functioning as a nozzle, inlet conduit 1036 may be connected or directly connected to the downstream end of any suitable accessory tool such as a rigid air flow conduit (e.g., an above floor cleaning wand), a crevice tool, a mini brush, and the like. As shown, dirty air inlet 1030 is positioned forward of the air treatment member 1100, although this need not be the case. As exemplified, the dirty air inlet 1030 is positioned above the cyclone chamber. Optionally, the dirty air inlet 1030 may be provided at an alternate location, such as in the front end wall 1160.

As exemplified in FIGS. 1, 2, 5, 6, and 7, an optional accessory power coupler 1050 may be provided adjacent to the inlet conduit 1036. Accessory power coupler 1050 includes a set of electrical connectors 1056 that can inter-engage with compatible electrical connectors on an accessory tool in order to provide an electrical connection between e.g. a power source of the hand vacuum and a motor or other electrical device of an accessory tool (e.g. a powered brush roller, a light source, and the like). While the illustrated accessory power coupler 1050 is a male connector (i.e. projecting outwardly from the main body 1010 of the hand vacuum cleaner 1000), in alternative embodiments it may be a female connector (i.e. recessed inwardly) or any other shape suitable for cooperatively engaging with corresponding connectors on an accessory tool or other attachment. As exemplified, the accessory power coupler 1050 may be positioned laterally to one side of the inlet conduit 1036. In other examples, the accessory power coupler 1050 may be located above or below the inlet conduit 1036.

As exemplified, power may be supplied to the suction motor and other electrical components of the hand vacuum cleaner from an onboard energy storage member which may include, for example, one or more batteries or other energy storage device. In the illustrated embodiment, the hand vacuum cleaner 1000 includes a removable battery pack 1500 provided between the handle 1020 and the air treatment member 1100. Battery pack 1500 is described in further detail herein. In alternative embodiments, a battery pack may not be provided and power may be supplied to the hand vacuum cleaner by an electrical cord connected to the hand vacuum cleaner (not shown) that can be connected to a standard wall electrical outlet.

Optionally, a forward surface of the handle 1020 and a rearward surface of the battery pack 1500 may cooperatively define a finger gap 1028 therebetween (see e.g. FIG. 10). An advantage of this design is that the absence of an intervening portion of main housing 1010 between the handle and the energy storage member may facilitate a more compact overall size of hand vacuum 1000.

Figure 4:
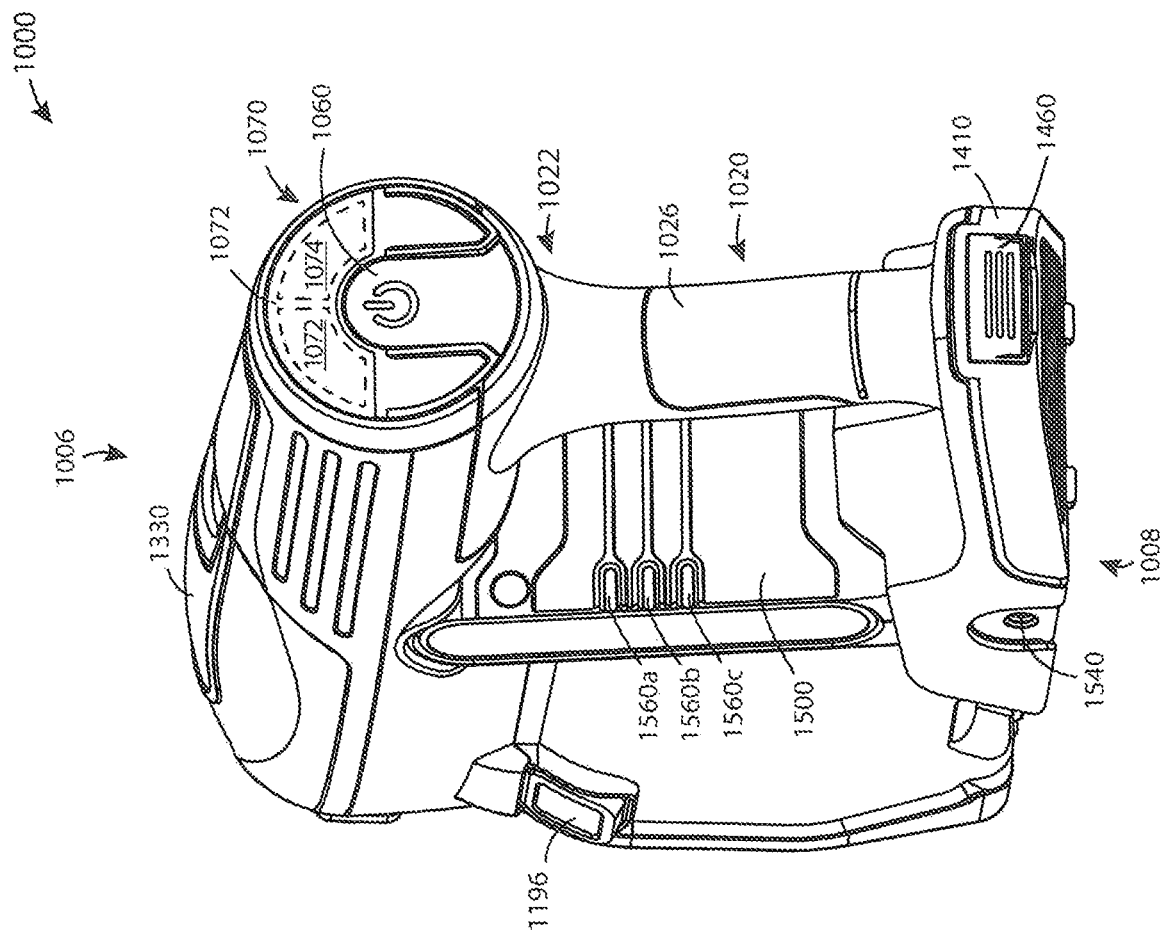
FIG. 4 is a rear perspective view of the hand vacuum cleaner of FIG. 1.
Figure 5:
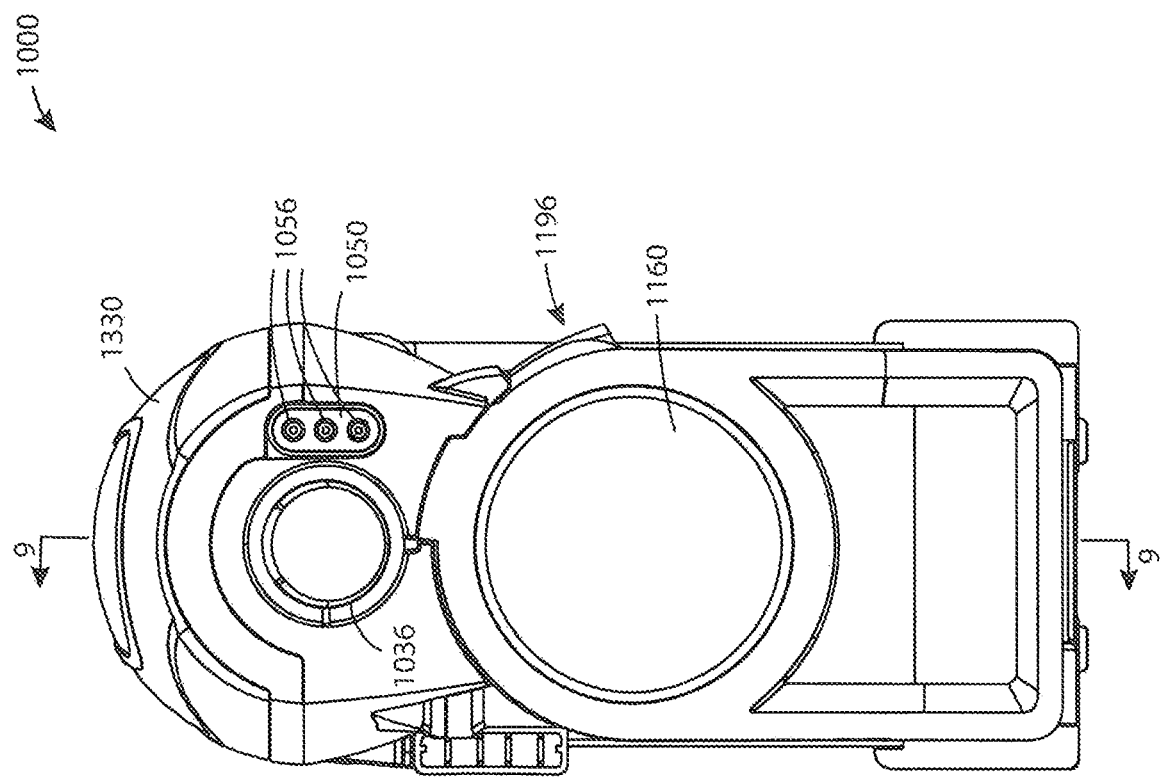
FIG. 5 is a front end view of the hand vacuum cleaner of FIG. 1.

As exemplified, a power switch 1060 may be provided to selectively control the operation of the suction motor (e.g. either on/off or variable power levels or both), for example by establishing a power connection between the batteries and the suction motor. The power switch may be provided in any suitable configuration and location, including a button, rotary switch, sliding switch, trigger-type actuator and the like. As illustrated in FIG. 4, power switch 1060 is in the form of a button located toward upper end of the rear end 1004 of the hand vacuum cleaner, above a hand grip portion 1026 of the handle 1020. In this position, a user may be able to access the button 1060 while holding the hand vacuum via the hand grip, e.g. with the thumb of the hand holding the handle, and/or with a digit of their other hand.

The power switch or an alternate controller may also be configured to control other aspects of the hand vacuum (brush motor on/off, etc.). Optionally, instead of being provided at an upper end of the handle, the power switch may be provided on the main body (such as on the motor housing or other suitable location).

As exemplified in FIG. 4, an optional information display device 1070 may be provided to display one or more visual indications to a user. For example, the display device 1070 may provide a visual indication of: when suction motor is on; the current power level of the suction motor (if applicable); the current battery charge level; an estimated time until the battery charge will be depleted, and/or similar information. The display device 1070 may include one or more light sources (e.g. light emitting diodes (LEDs)), display screens (e.g. a liquid crystal, an LED screen, an organic light emitting diode (OLED) screen, and the like. The screen, and associated electronics, may be used to display status information of one or more electrical components of the hand vacuum cleaner.

In the illustrated embodiment, the information display device is in the form of a display screen 1070 that is provided at the upper end 1022 of the handle 1020. A first display portion 1072 is configured to display an indication of whether the hand vacuum cleaner is in a floor cleaning mode or in a carpet cleaning mode (e.g. where power is being supplied to a brush roller of an accessory tool via electrical connectors 1056), and a second portion 1074 is configured to display an indication of a power mode of the suction motor (e.g. a regular power mode, a higher power mode, and/or a higher power 'burst' mode).

Air Flow Path Through a Hand Vacuum Cleaner

The following is a description of different features of an air flow path through a hand vacuum cleaner. These features may be used by themselves in any surface cleaning apparatus or in any combination or sub-combination with any other feature or features described herein. For example, any of the airflow configurations described herein may be used with any of the pre-motor filter assemblies, relative positioning of the suction motor and energy storage members, inclined battery packs, battery pack configurations, airflow cooling configurations, and other features described herein.

Figure 9:
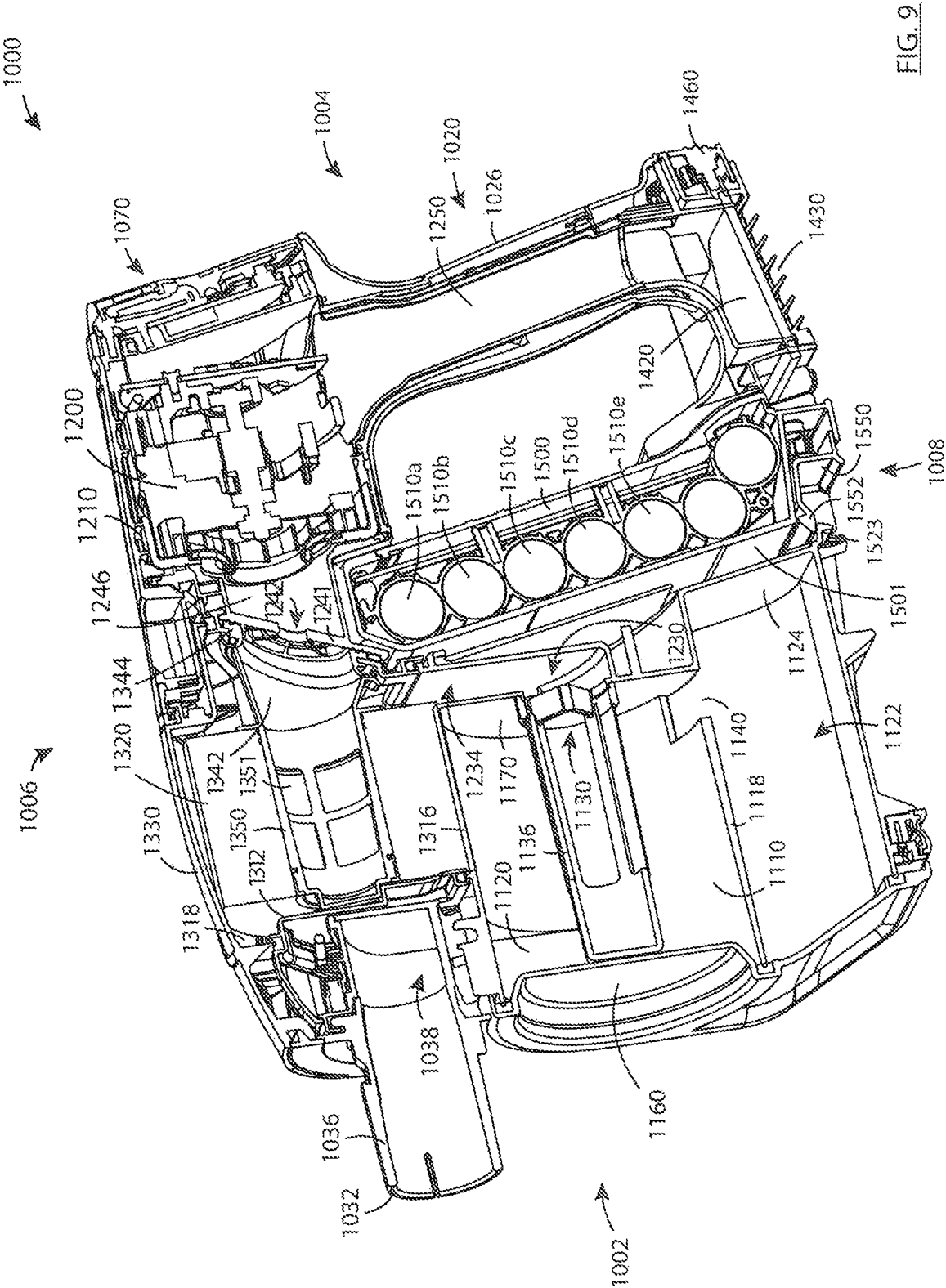
FIG. 9 is a perspective sectional view of the hand vacuum cleaner of FIG. 1, taken along line 9-9 in FIG. 5.

As exemplified, the air treatment member 1100 of the hand vacuum cleaner 1000 may optionally be a single cyclonic cleaning stage with unidirectional air flow or a 'uniflow' cyclone chamber 1110 (i.e. where the cyclone air inlet and cyclone air outlet are at opposite ends of the cyclone chamber). Referring primarily to FIGS. 9 and 10, hand vacuum cleaner 1000 includes a single cyclonic cleaning stage with a cyclone chamber 1110 that has a cyclone air inlet 1120 in fluid communication with the inlet conduit 1036, a cyclone air outlet 1130, and a dirt outlet 1140 that is in communication with a dirt collection chamber 1122.

Optionally, the cyclone chamber 1110 may be generally horizontally oriented so that the cyclone air inlet 1120 is located toward the front end 1002 of the hand vacuum cleaner 1000, and the cyclone air outlet 1130 is spaced rearwardly behind the cyclone air inlet 1120, at a rear end 1114 of the cyclone chamber 1110. From the cyclone air outlet 1130, an upflow duct or conduit 1230 directs the airflow upwards to a pre-motor filter chamber 1310 that is vertically spaced from the cyclone chamber 1110. After passing through the pre-motor filter 1320, air may travel generally rearwardly from the pre-motor filter 1320 to an inlet end 1202 of the suction motor 1200. An advantage of this arrangement is that, by promoting air to travel in this manner, the need for air flow direction changes between an air outlet of the pre-motor filter and the suction motor may be reduced or eliminated, thereby reducing backpressure and/or air flow losses through this portion of the hand vacuum cleaner. An additional, or alternative, advantage of providing a pre-motor filter chamber 1310 that is vertically spaced from the cyclone chamber 1110 is that the need for air flow direction changes between a cyclone air outlet and the suction motor may be reduced, thereby reducing backpressure and/or air flow losses through this portion of the hand vacuum cleaner. For example, any airflow in a forward direction may take place within the pre-motor filter chamber or header 1310, as opposed to taking place in a (typically narrower) conduit that directs airflow in a direction opposite to the airflow through the dirty air inlet. An additional, or alternative, advantage of providing a pre-motor filter chamber 1310 that is vertically spaced from the cyclone chamber 1110, and optionally above the cyclone chamber 1110, is that the length (front to back) of the hand vacuum cleaner may be reduced, providing a more compact configuration.

FIGS. 1 to 34 exemplify one embodiment of a hand vacuum cleaner 1000 having a cyclone unit that includes a uniflow cyclone chamber 1110 and a dirt collection chamber 1122 that is positioned exterior to the cyclone chamber 1110 and is in communication with the dirt outlet 1140 to receive dirt and debris dis-entrained from a dirty air flow by the cyclone chamber 1110. In the illustrated example, the cyclone air inlet 1120 and dirt outlet 1140 are positioned toward opposing ends of the cyclone chamber 1110, and the cyclone air outlet 1130 is provided toward the same end as the dirt outlet 1140 (the rear end as illustrated). In this configuration, dirty air can enter at the front end of the cyclone chamber, while cleaner air and the separated dirt particles both exit the cyclone chamber at the opposing rear end.

In this embodiment, the cyclone chamber 1110 has a front end wall 1160 and an opposing rear end wall 1170 that is spaced apart from the front end wall along the cyclone axis 1115 about which air circulates within the cyclone chamber 1110 during operation of the hand vacuum cleaner. A cyclone chamber sidewall 1180 extends between the front and rear end walls 1160, 1170. In the illustrated example, when the hand vacuum is oriented with the upper end above the lower end, the cyclone axis 1115 is generally horizontal, and is closer to horizontal than vertical, e.g., ±20°, ±15°, ±10°, or ±5° from the horizontal. As exemplified, the cyclone axis 1115 is substantially parallel to, e.g. within ±20°, ±15°, ±10°, or ±5°, and vertically offset below the conduit axis 1035 of the air inlet conduit 1036, and the cyclone chamber 1110 and dirt collection chamber 1122 are both below the inlet conduit axis 1035. As illustrated in FIG. 10, when the hand vacuum 1000 is horizontal (as illustrated), the pre-motor filter 1320 is vertically spaced from (e.g. above) the cyclone axis 1115, and the suction motor

1200 is positioned rearward of the pre-motor filter 1320, so that air travels generally rearwardly from the pre-motor filter to the suction motor.

In this embodiment, the cyclone air inlet 1120 is a tangential air inlet that, as exemplified, terminates at an aperture or port that is formed in cyclone sidewall 1180, optionally an upper portion 1182 of the cyclone sidewall 1180, adjacent the front end wall 1160. Optionally, the cyclone air inlet 1120 may be provided at an alternate location, such as in the front end wall 1160.

The cyclone air inlet 1120 is fluidly connected with the outlet end of the conduit 1036 via a corresponding air outlet aperture or port 1038 that may be provided in a lower portion of the air inlet conduit 1036. The cyclone air inlet 1120 may have any suitable arrangement and/or configuration, and in the illustrated example is configured as a tangential air inlet that is directly connected to the air outlet aperture 1038. Connecting the air inlet 1120 to the air outlet aperture 1038 in this manner may help reduce the need for additional conduits to fluidly connect the dirty air inlet 1030 to the cyclone chamber 1110, and may reduce or eliminate the need for additional bends or air flow direction changes between the dirty air inlet 1030 and the cyclone chamber 1110. Reducing the conduit length and number of bends may help reduce the backpressure and air flow losses within the air flow path.

Positioning the cyclone air inlet 1120 toward the front of the cyclone chamber 1110 may help facilitate a desired air flow configuration within the cyclone chamber 1110. For example, in this configuration the cyclone chamber 1110 itself functions as part of the air flow path that conveys air rearwardly from the front 1002 of the hand vacuum 1000, without the need for a separate fluid conduit.

In the illustrated example, cyclone air inlet 1120 is directly adjacent the front wall 1160. Alternatively, cyclone air inlet 1120 may be axially spaced from the front end wall 1160, and may be located at another location along the length of the cyclone chamber 1110. Preferably, cyclone air inlet 1120 is provided in the front half of the cyclone chamber 1110 (i.e. forward of the axial mid-point of the cyclone chamber sidewall 1080) in order to help reduce the distance between the dirty air inlet 1030 and the cyclone air inlet 1120.

As shown in FIG. 10, the cyclone air outlet 1130 is provided in the rear end wall 1170 of the cyclone chamber 1110, and an axially extending vortex finder conduit 1136 extends from the rear end wall 1170 and is aligned with the cyclone air outlet 1130. Optionally, a mesh screen (not shown) may be positioned over some or all of the inlet apertures 1138 of the vortex finder conduit 1136 to help inhibit lint, hair, and other such debris from entering the vortex finder conduit 1136. Positioning the air outlet 1130 toward the rear end (and optionally in the rear end wall 1170) may help facilitate the desired air flow through the cyclone chamber 1110, such that air, while swirling, travels generally axially though the cyclone chamber 1110 from the front end wall 1160 toward the rear end wall 1170.

Positioning the air outlet 1130 in the rear end wall 1170 of the cyclone chamber 1110 may also help facilitate the air flow connection between the cyclone chamber 1110 and other downstream components in the hand vacuum, such as the pre-motor filter housing 1310 and suction motor housing 1210 described herein. In the illustrated embodiment the air outlet 1130 is provided in the rear end wall 1170 and is connected to the pre-motor filter housing 1310 through an upflow duct or conduit 1230. This may help simplify the air flow path and construction of the hand vacuum. Alternatively, the air flow path may include one or more additional conduits connected downstream from the cyclone air outlet.

In this arrangement, air travelling through the hand vacuum 1000 will travel generally rearwardly along the air inlet conduit 1036 (i.e. parallel to the conduit axis 1035 and then enter a tangential air inlet which essentially changes the direction of the air to travel generally downwardly through the cyclone air inlet 1120 (i.e. generally orthogonal to the cyclone axis 1115). The air can then circulate within the cyclone chamber 1110, and travel generally rearwardly toward the cyclone air outlet 1130, and ultimately exit the cyclone chamber 1110 via the cyclone air outlet 1130 while travelling through the vortex finder conduit 1136 in a rearward direction (i.e. generally parallel to the cyclone axis 1115). In this configuration, the air flow changes direction only once (and by only approximately 90° which may be accomplished by a tangential air inlet), between entering the dirty air inlet 1030 and exiting the cyclone air outlet 1130.

The cyclone dirt outlet 1140 may be of any suitable configuration, and in the illustrated embodiment is a slot 1140 that is provided in the cyclone chamber side wall 1180, toward the rear end wall 1170. The slot 1140 may extend around at least a portion of the perimeter of the cyclone side wall 1180, and may have any suitable length 1186 in the axial direction (see e.g. FIG. 10). As exemplified, the slot may be provided only in a lower portion of the sidewall. Accordingly, when dirty air inlet 1030 faces downwardly during use, dirt will exit into an upper end of an external dirt collection chamber. Positioning the dirt collection chamber below the cyclone chamber, and not surrounding the cyclone chamber, reduces the width of the hand vacuum. While shown directly adjacent the rear end wall 1170, such that the slot 1140 is partially bounded by the cyclone side wall 1180 and the rear end wall 1170, the slot 1140 may be located at another location along the length of the cyclone side wall 1180, and need not be directly adjacent the rear end wall 1170. Alternatively, the dirt outlet 1140 may be provided toward the mid-point of the cyclone chamber sidewall 1180, or may be provided toward the front end wall 1160. While illustrated with a single dirt outlet 1140, the cyclone chamber 1110 may include two or more dirt outlets that are in communication with the same dirt collection chamber, or optionally with different dirt collection chambers.

Preferably, at least a portion of the air treatment member may be openable for emptying. For example, at least one end, and optionally both ends of the dirt collection chamber 1122 may be openable for emptying. Optionally, at least one end, and optionally both ends of the cyclone chamber 1110 may also be openable for emptying.

Referring primarily to FIGS. 9 and 10, the front end wall 1160 of the cyclone chamber 1110 and the front end wall 1126 of the dirt collection chamber 1122 are both provided by portions of an openable front door 1190 that covers the front end of the cyclone assembly. In this arrangement, opening the front door 1190 will concurrently open the front end walls 1160 and 1126 of the cyclone and dirt collection chambers 1110, 1122. In the illustrated example, a user may hold the hand vacuum 1000 via the handle 1020 with one hand and open the front door 1190 with the other hand. The front end wall 1160 of the cyclone chamber 1110 and the front end wall 1126 of the dirt collection chamber 1122 may be concurrently openable and may cover all of a substantial portion of the front end of the cyclone chamber and the dirt collection chamber. For example, the front end wall 1160 of the cyclone chamber 1110 and the front end wall 1126 of the dirt collection chamber 1122 may be a one piece assembly (i.e. they may be integrally formed).

Figure 6:
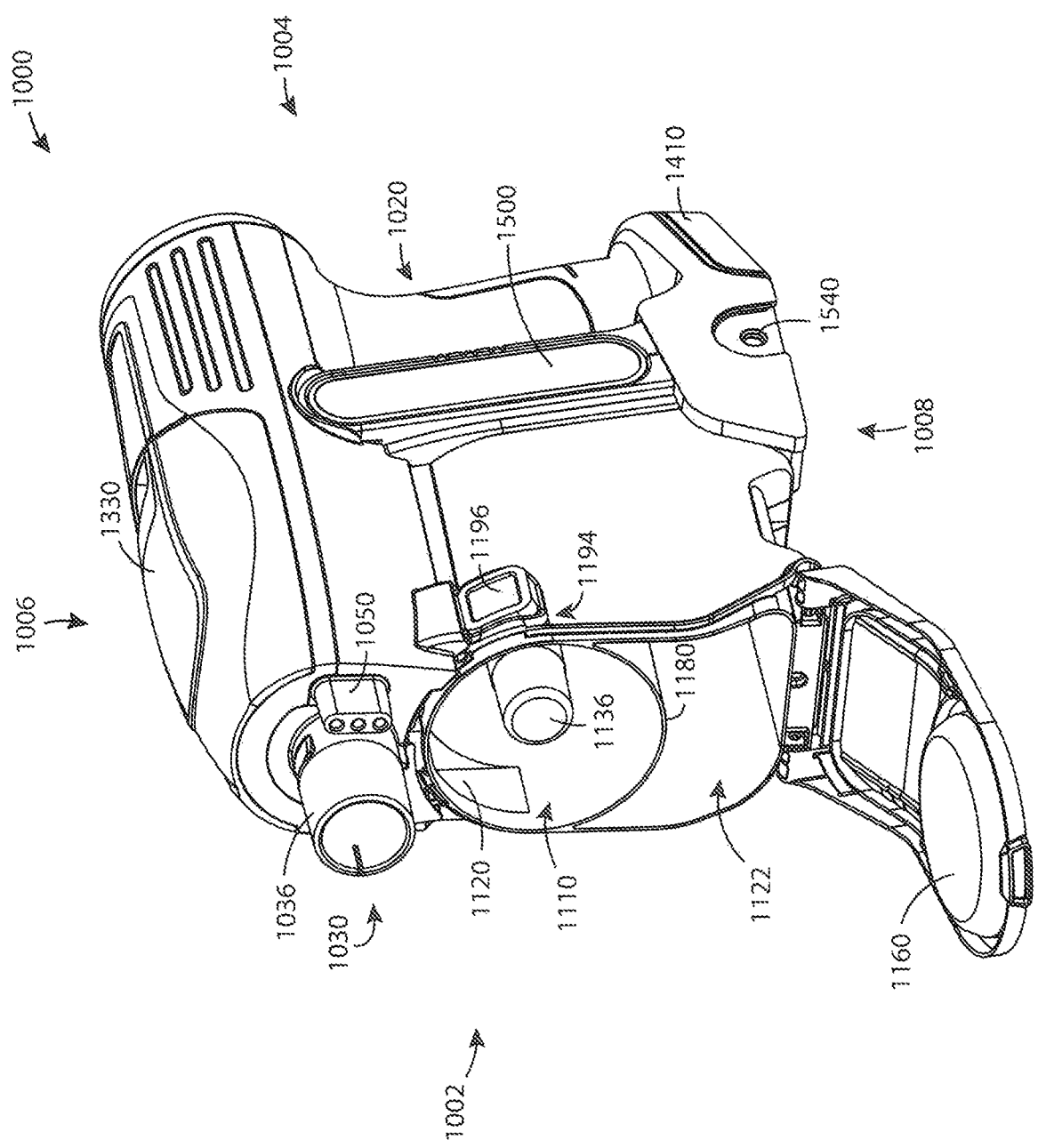
FIG. 6 is a perspective view of the hand vacuum cleaner of FIG. 1, with a front door or lid in an open position.
Figure 7:
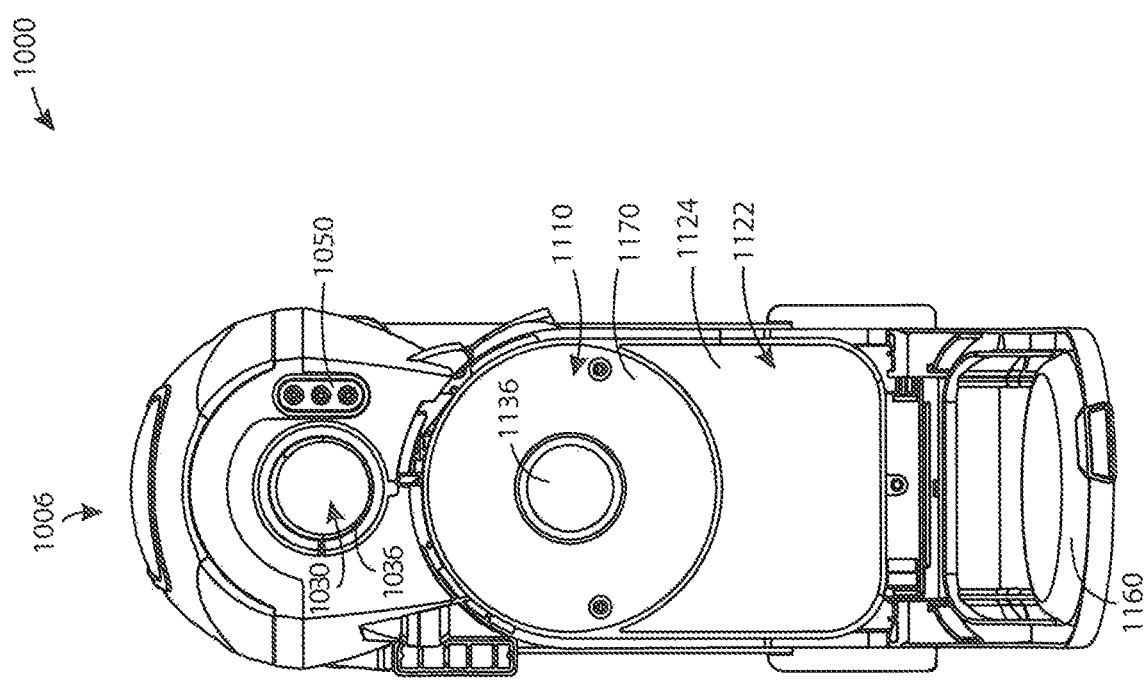
FIG. 7 is a front end view of the hand vacuum cleaner of FIG. 1, with a front door or lid in an open position.
Figure 8:
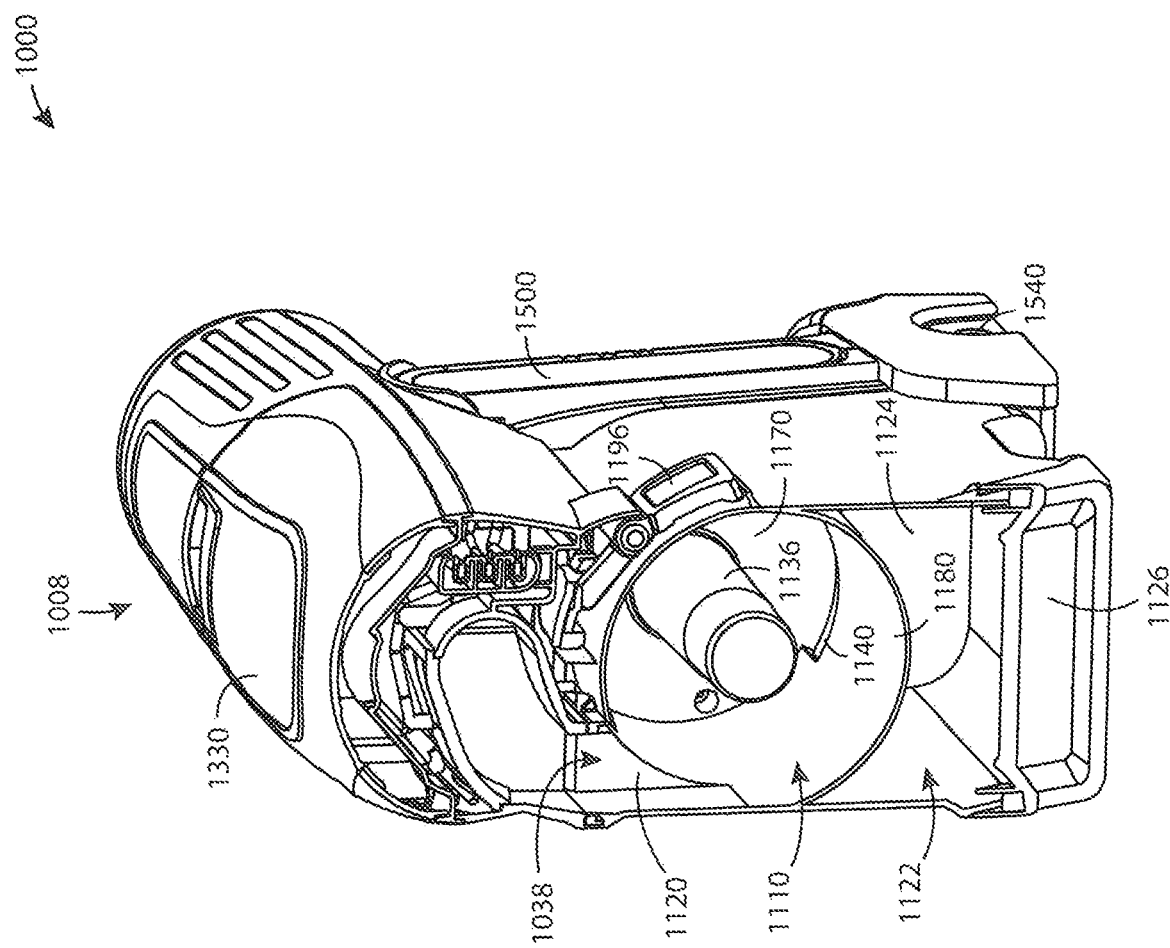
FIG. 8 is a perspective sectional view of the hand vacuum cleaner of FIG. 1, taken along line 8-8 in FIG. 1.

The front door 1190 may be openably connected (e.g., pivotally openable or removably mounted) to the rest of the cyclone assembly using any suitable mechanism, including a hinge or other suitable device. Optionally, the front door 1190 may be secured in the closed position using any suitable type of locking mechanism, including a latch mechanism that may be released by a user. In the embodiment of FIGS. 1 to 34, the front door 1190 may be opened by pivoting it about a hinge assembly 1192 from a closed position (e.g. as shown in FIG. 1) to an open position (e.g. as shown in FIG. 6). The front door 1190 may be secured in the closed position by a friction fit when connected as illustrated in FIG. 1, and/or by an assembly door lock 1194 or other suitable locking mechanism. Preferably, the assembly door lock may include at least one release actuator 1196 so that a user may unlock the assembly door lock, e.g. by depressing the actuator. The actuator for opening/releasing the openable portion of the cyclone assembly may be provided on the cyclone assembly 1100 or on any other portion of the hand vacuum 1000 (such as the handle 1020).

In the embodiments described herein, the surface cleaning apparatus includes a pre-motor filter housing 1310 positioned in the air flow path between the cyclone chamber and the suction motor. It will be appreciated that in some embodiments, the pre-motor filter may be of any configuration and the direction of air flow through the pre-motor filter 1320 may be any particular direction.

Referring primarily to FIGS. 9 and 10, as exemplified, in some embodiments, the main body 1010 may be configured such that the suction motor housing 1210 is located rearward of the pre-motor filter housing 1310 and, preferably, axially aligned with the pre-motor filter housing 1310 such that air exiting the pre-motor filter may travel generally linearly to the suction motor. It will be appreciated that suction motor housing 1210 and pre-motor filter housing 1310 may be of any configuration As exemplified herein, the pre-motor filter 1320 may be configured as a generally cylindrical foam filter with a hollow, open interior and is preferably part of a removable pre-motor filter assembly, as discussed elsewhere herein. The pre-motor filter 1320, which may be a foam filter, extends longitudinally along a filter axis 1325, which may be generally parallel with the suction motor axis of rotation and accordingly is exemplified as being generally horizontal in the illustrated embodiment. The interior, downstream surface of filter 1320 is in communication with the air outlet 1242 via an outlet conduit 1340 of the pre-motor filter assembly. An advantage of a cylindrical filter is that a relatively large upstream surface area may be provided in a small space. A further advantage of this configuration is that, if the suction motor housing 1210 is located rearward of, and generally axially aligned with, the pre-motor filter housing 1310, air exiting the pre-motor filter may travel rearwardly through the hollow interior and then travel rearwardly to the suction motor.

In the illustrated example, the pre-motor filter housing 1310 is positioned such that the pre-motor filter 1320 is vertically spaced from and mostly, and optionally entirely, located above the cyclone axis 1115 and also above the cyclone chamber. Put another way, pre-motor filter 1320 mostly, and optionally entirely, overlies the cyclone chamber. In other embodiments, only a portion of the pre-motor filter may be above the cyclone axis 1115 and optionally also above the cyclone chamber.

Referring to FIG. 10, in the illustrated example the pre-motor filter housing 1310 has forward and rear end walls 1312 and 1314, and a chamber sidewall 1316 defining a pre-motor filter chamber or plenum 1318. Optionally, the pre-motor filter is removable, such as proving a removable or otherwise openable door 1330. Door 1330 may extend between forward and rear end walls 1312 and 1314. The housing 1310 also has an air inlet 1234 that is connected downstream from the cyclone air outlet 1130 via upflow duct 1230, and an air outlet 1242 positioned in the rear end wall 1314. In the illustrated example, the housing air inlet 1234 is located toward the rear end of the housing 1310. To travel from the air inlet 1234 to the air outlet 1242, air passes through the pre-motor filter 1320 positioned within the chamber 1318.

As the pre-motor filter 1320 is positioned above the cyclone air outlet, air travels upwardly to the pre-motor filter chamber 1318. As exemplified herein, the pre-motor filter may be in the shape of a hollow cylinder which has a central axis that is generally parallel with the suction motor axis of rotation. An advantage of this configuration is that, after the air travels upwardly to the pre-motor filter chamber 1318, in order to try to balance the forces in the pre-motor filter chamber 1318, the air will tend to spread across the chamber. Therefore, without using a 90□ bend to direct the air to the front part of the pre-motor filter, a plenum is used to distribute the air across the upstream surface of the pre-motor filter. In accordance with this configuration, air travels to the filter housing 1310 in a generally upward direction, where it disperses in the pre-motor filter chamber 1318 and circulates around and through the outer, upstream surface of filter 1320, and exits the housing air outlet 1242 in a generally rearward direction into the suction motor housing inlet end 1212.

In the illustrated example, the suction motor 1200 is generally horizontally oriented, such that the suction motor axis of rotation 1205 is generally horizontal (e.g., ±20°, ±15°, ±10°, or ±5° from horizontal) when the hand vacuum cleaner is positioned with the upper end above the lower end (as illustrated in FIG. 10). In this arrangement, the suction motor axis 1205 is generally parallel to the cyclone axis 1115 and the pre-motor filter axis 1325.

In the example configuration illustrated in FIG. 10, an inlet end 1202 of the suction motor 1200 faces towards a hollow interior of the pre-motor filter. In such a configuration, air may travel generally linearly from the pre-motor filter 1320 to the suction motor 1200. An absence of air flow direction changes between an air outlet of the pre-motor filter and the suction motor may reduce backpressure and/or air flow losses through this portion of the hand vacuum cleaner.

Also, positioning the suction motor at an upper end of a handle of the vacuum cleaner with the suction motor axis vertically displaced from the cyclone axis of rotation may facilitate the reduction of air flow conduit bends and/or air flow direction changes between a dirty air inlet and a clean air outlet, thereby reducing backpressure and/or air flow losses through the hand vacuum cleaner. Additionally, or alternatively, such a configuration may help provide a compact overall design of the hand vacuum cleaner without adversely affecting the hand feel and/or perceived balance of the hand vacuum.

It will be appreciated that the air may exit the hand vacuum cleaner via a grill located in an upper portion of the main body (e.g., via an air outlet provided in the rear end of the main body or a sidewall adjacent the rear end). Alternately, air may exit through a lower portion of the main body. This may be achieved by conveying the air downwardly through the handle of the hand vacuum cleaner. Accordingly, as exemplified, at least a portion of the air flow path between the dirty air inlet 1030 and the clean air outlet 1040 may flow through the handle 1020. This may help facilitate a variety of different air flow path configurations and clean air outlet 1040 locations. This may also allow at least some of the air being exhausted by the suction motor 1200 to flow over, and optionally help cool, operating components that are located in the handle. Examples of such components may include controllers, circuit boards, other internal electronics and the like. One example of such electronics can include a printed circuit board (PCB) provided to control optional information display device 1070 and/or power switch 1060.

In the illustrated embodiment, a handle air flow passage 1250 has an inlet end 1252 that is located toward the top 1022 of the handle downstream from the suction motor 1200, and an outlet end 1254 that is located toward the bottom 1024 of the handle. This may help channel the air through substantially the entire length of the hand grip portion 1026 of the handle 1020.

As exemplified, the air exhausted from the suction motor 1200 is routed through the handle, and the clean air outlet 1040 is provided in the form of a plurality of slots 1430 that are formed in the lower end 1024 of the handle. Air entering the inlet end 1252 is directed through the handle 1020 and exits via the slots 1430. In this example, the slots or grill 1430 are oriented such that air exiting the clear air outlet 1040 travels generally downwardly and rearwardly from the lower end 1024 of the handle 1020. It will be appreciated that the clean air outlet may be of any design and may be located anywhere in the lower portion of the hand vacuum cleaner.

Optionally, one or more post-motor filters may be placed in the air flow path between the suction motor 1200 and the clean air outlet 1040. The post-motor filter may be provided at the clean air outlet 1040. The post motor filter may be in an openable housing. For example, as exemplified, the clean air outlet 1040 may be an openable grill. Further, the openable access panel may support the post-motor filter. For example, in the embodiment of FIGS. 1 to 34, a post-motor filter 1420 is supported by a removable tray 1410 that covers the lower end of the post-motor filter housing 1400 and provides the clean air outlet 1040 in the form of a grill. The illustrated post-motor filter 1420 is a physical foam media filter, but optionally the post-motor filters may be any suitable type of filter and may include one or more of foam filters, felt filters, HEPA filters, other physical filter media, electrostatic filters, and the like.

With references to FIGS. 23-27, removable tray 1410 includes a pair of rigid engaging projections 1440 provided on a front end 1412, and a pair of movable engaging projections 1450 extending upwardly from a rear end 1414 and resiliently biased towards the rear end. To separate the tray from the main body 1010, actuating (e.g. depressing) button 1460 results in forward movement of the movable engaging projections 1450, resulting in their disengagement from corresponding recesses 1455 in the main body, allowing the rearward end 1414 of tray 1410 to be pivoted downwardly from handle 1020. Once tray 1410 has been so pivoted, it may be translated rearwardly to remove engaging projections 1440 from corresponding recesses 1445 in the main body. To connect the tray 1410 to the main body 1010, the process may be generally reversed. That is, projections 1440 may be inserted into recesses 1445, and tray 1410 subsequently pivoted upwardly until engaging projections 1450 are secured in recesses 1455. It will be appreciated that any other constructions may be used to removably secure tray 1410 in position on the main body.

While the figures exemplify positioning the pre-motor filter and suction motor vertically spaced above the cyclone axis, it will be appreciated that the pre-motor filter and suction motor vertically spaced below the cyclone axis.

Removable Pre-Motor Filter Assembly

The following is a description of different features of a removable pre-motor filter assembly for a surface cleaning apparatus. These features may be used by themselves in any surface cleaning apparatus or in any combination or sub-combination with any other feature or features described herein. For example, any of the pre-motor filter configurations described herein may be used with any of the air flow paths, relative positioning of the suction motor and energy storage members, inclined battery packs, battery pack configurations, airflow cooling configurations, and other features described herein.

In accordance with this feature, the outlet conduit of the filter assembly may be inclined at an angle to the removal direction of the pre-motor filter assembly with the upper (or outermost portion of the outlet conduit in the removal direction) extending further in the downstream direction than the lower (or innermost portion of the outlet conduit in the removal direction). The mating downstream conduit may be similarly oriented. An advantage of this configuration is that the downstream face of the pre-motor filter assembly (which may have a sealing gasket) may be placed on the upstream face of the downstream conduit (which may have a sealing gasket) instead of one face sliding across the other, which could damage one or both gaskets.

In accordance with this feature, as exemplified, the pre-motor filter 1320 of the hand vacuum cleaner 1000 is optionally part of a removable pre-motor filter assembly 1300. FIGS. 19 to 22 exemplify one embodiment of a removable pre-motor filter assembly 1300 that includes a generally cylindrical filter 1320 supported by a filter support member 1340. Filter support member 1340 has an outlet conduit 1342 for directing an air flow after it has passed through the filter 1320. In use, air flows from an outer or upstream side 1322 of the filter 1320, through the filter media and to an inner or downstream side 1324 of the filter 1320, and to the outlet conduit 1342.

Optionally, the outlet conduit 1342 generally faces an inlet end 1202 of suction motor 1200. Therefore, as exemplified, the filter support member 1340 may be generally horizontally oriented so that the pre-motor filter axis 1325 extends in a generally forwards/rearwards direction (from front end 1321 to rear end 1323 of the pre-motor filter assembly) when the hand vacuum cleaner 1000 is oriented with the upper end above the lower end, and the outlet conduit 1342 faces generally rearwardly, and optionally directly faces an inlet end 1202 of suction motor 1200. From the outlet conduit 1342, a treated air conduit 1246 directs the airflow rearwards to an inlet end 1202 of suction motor 1200 that is horizontally spaced from the pre-motor filter 1320.

As illustrated in FIGS. 19 to 22, filter support member 1340 has a main body portion 1350 that is located in a hollow interior of the generally cylindrical filter 1320. In the illustrated embodiment, an outer surface of main body portion 1350 is flush with a downstream or inner surface 1324 of filter 1320, and the downstream surface 1324 is in air flow communication with an internal filter conduit 1356. More specifically, in the illustrated example a plurality of apertures 1351 define a porous portion of the filter support member 1340 between a first end 1352 and a second end 1354 of the main body portion 1350. It will be appreciated that more or fewer apertures may be provided in alternative embodiments. Accordingly, if filter 1320 is sealed to or seats securely on body portion 1350, air will be inhibited from travelling between the outer surface of main body portion 1350 and the inner surface 1324 of filter 1320 to thereby bypass the filter media.

The outlet conduit 1342 extends from the second end 1354 of the main body portion 1350. The second or opposed end 1352 of the main body portion 1350 may be sealed to or may seat securely on the second end 1354 of the main body portion 1350 to inhibit and preferably prevent air from exiting the internal filter conduit 1356 from the second end, so that substantially and preferably all of the air that exits the downstream side 1324 of the pre-motor filter 1320 is directed through outlet conduit 1342.

In order to inhibit or prevent air exiting through the front end of the internal filter conduit 1356, the front end of the main body portion 1350 may be closed. As exemplified, an end wall 1362 is provided to cap the opposed end 1352 of the main body portion 1350. Optionally, end wall 1362 has an outwardly projecting portion 1363 to facilitate positioning the pre-motor filter assembly 1300 in a surface cleaning apparatus, as discussed further below.

Optionally, flanges or other sealing members may be provided at one or both ends of the main body portion 1350 to inhibit or prevent airflow from flowing between pre-motor filter 1320 and filter support member 1340 and to the internal filter conduit 1356, e.g. effectively bypassing the pre-motor filter. In the illustrated example, a circumferential bypass flange 1358 is provided at the second end 1354 of the main body portion 1350.

The pre-motor filter assembly may be seated in position in the pre-motor filter housing by any means known in the art. As exemplified, one or more alignment or seating members may be provided on one or both of the front and rear ends 1321, 1323 of the pre-motor filter assembly.

Figure 18:
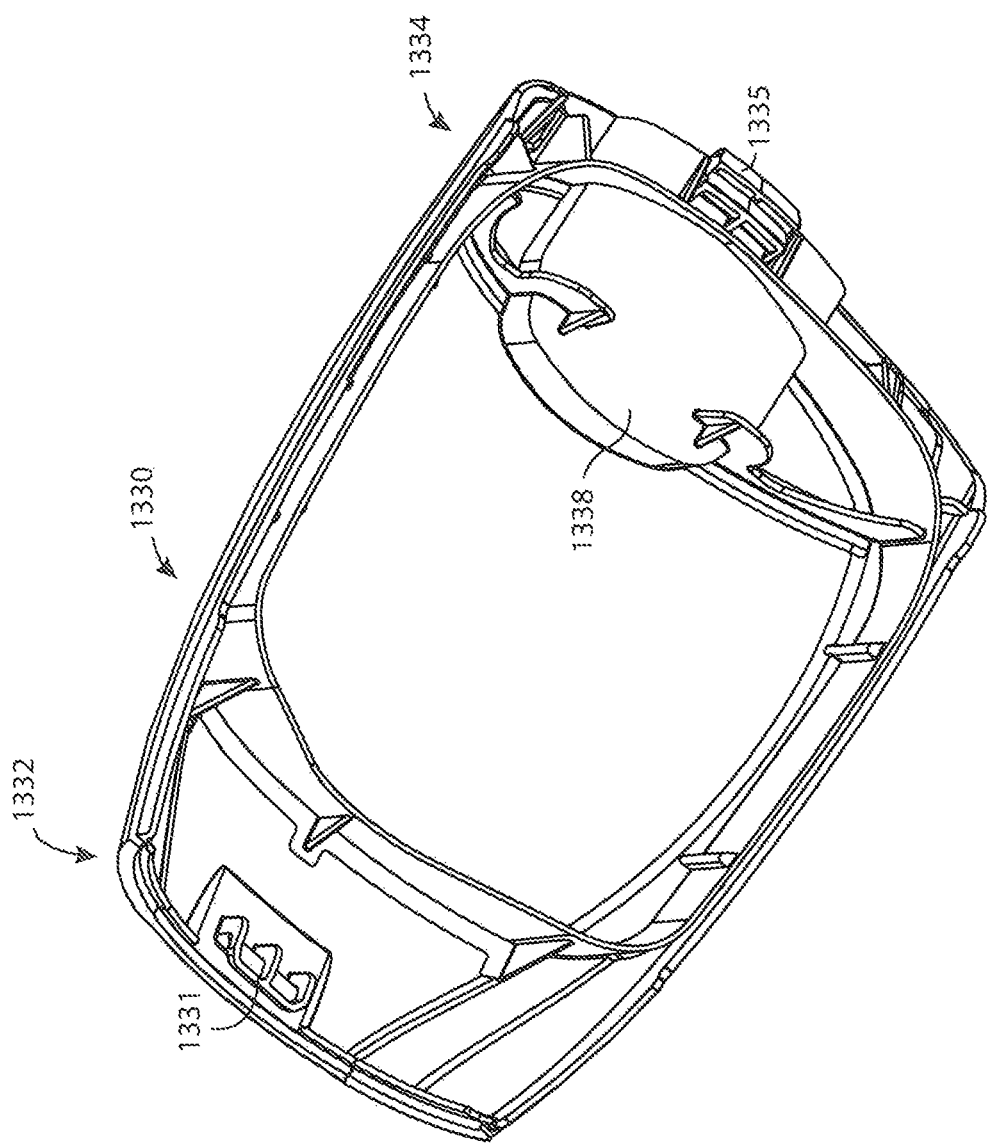
FIG. 18 is a bottom perspective view of an openable door of a pre-motor filter chamber of the hand vacuum cleaner of FIG. 1.
Figure 19:
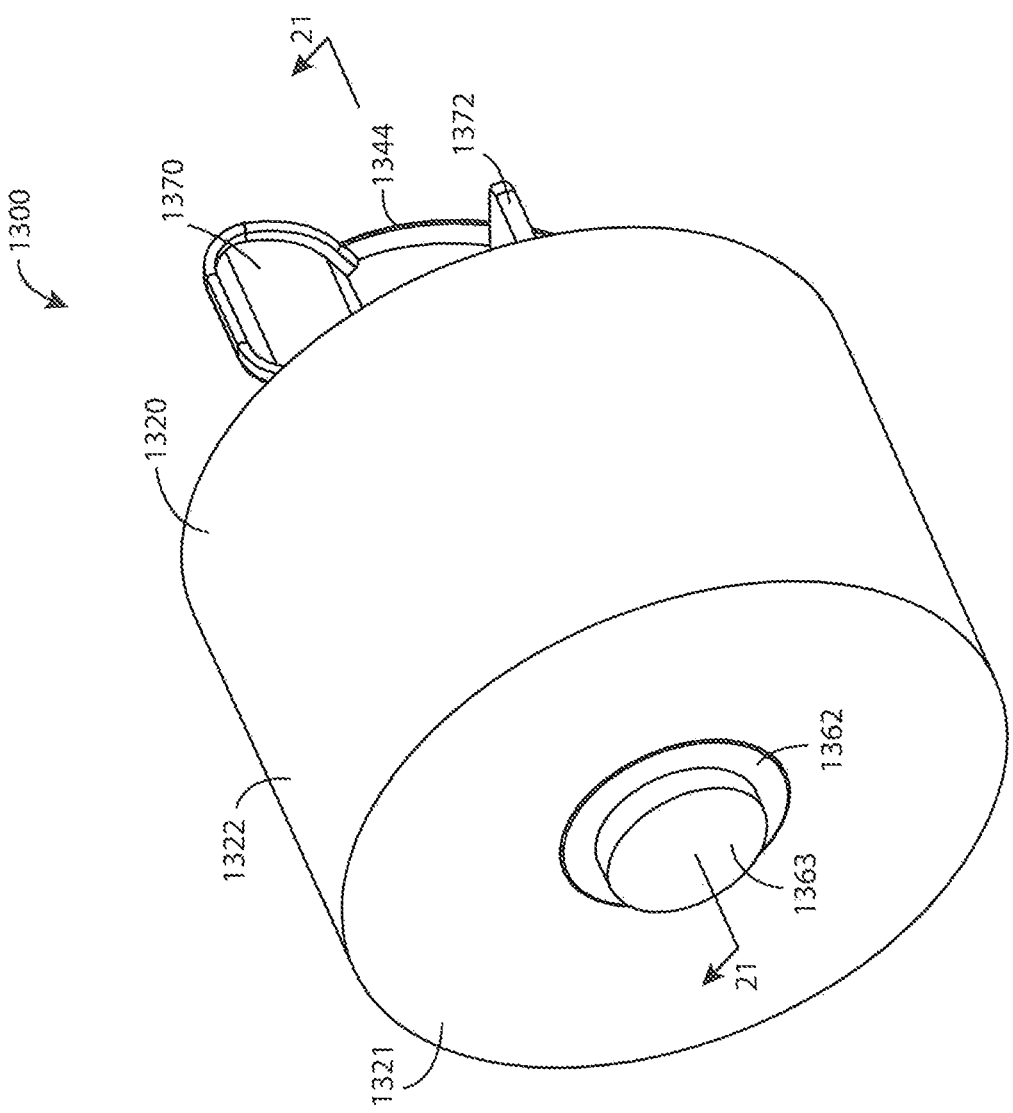
FIG. 19 is a perspective view of a removable pre-motor filter assembly of the hand vacuum cleaner of FIG. 1.
Figure 20:
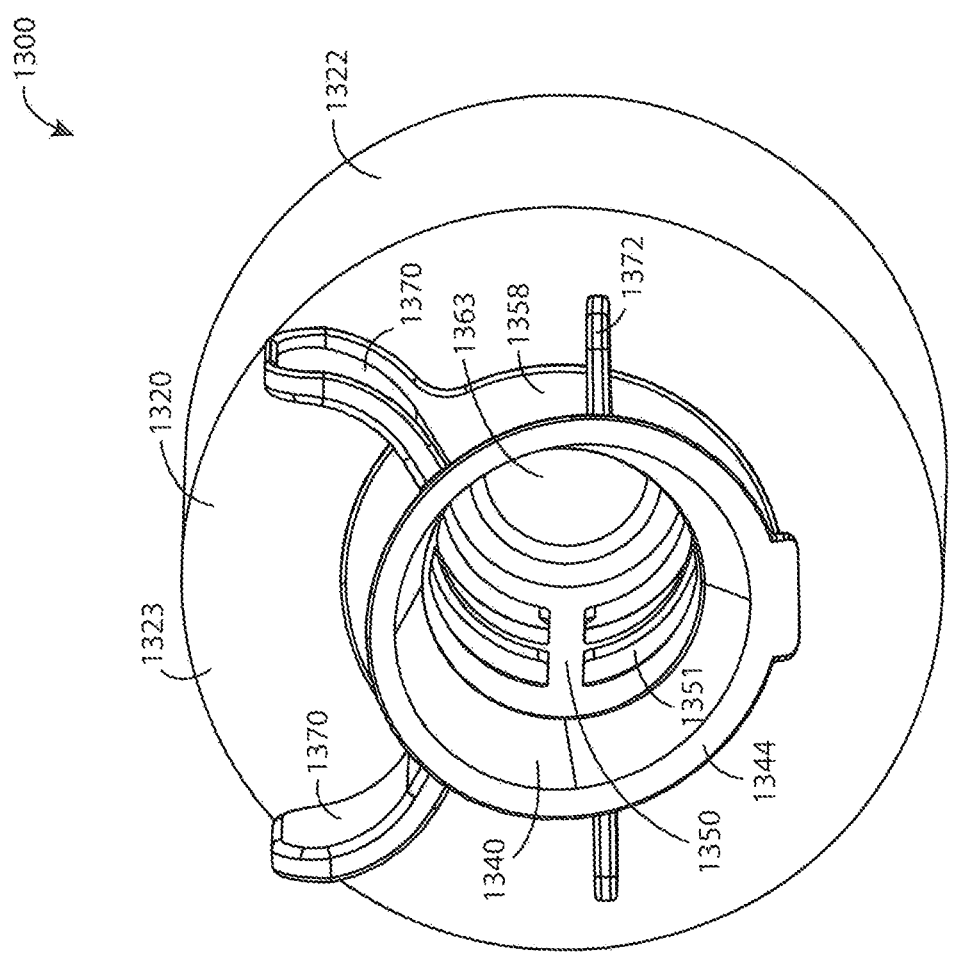
FIG. 20 is an end perspective view from the outlet end of the removable pre-motor filter assembly of the hand vacuum cleaner of FIG. 19.
Figure 21:
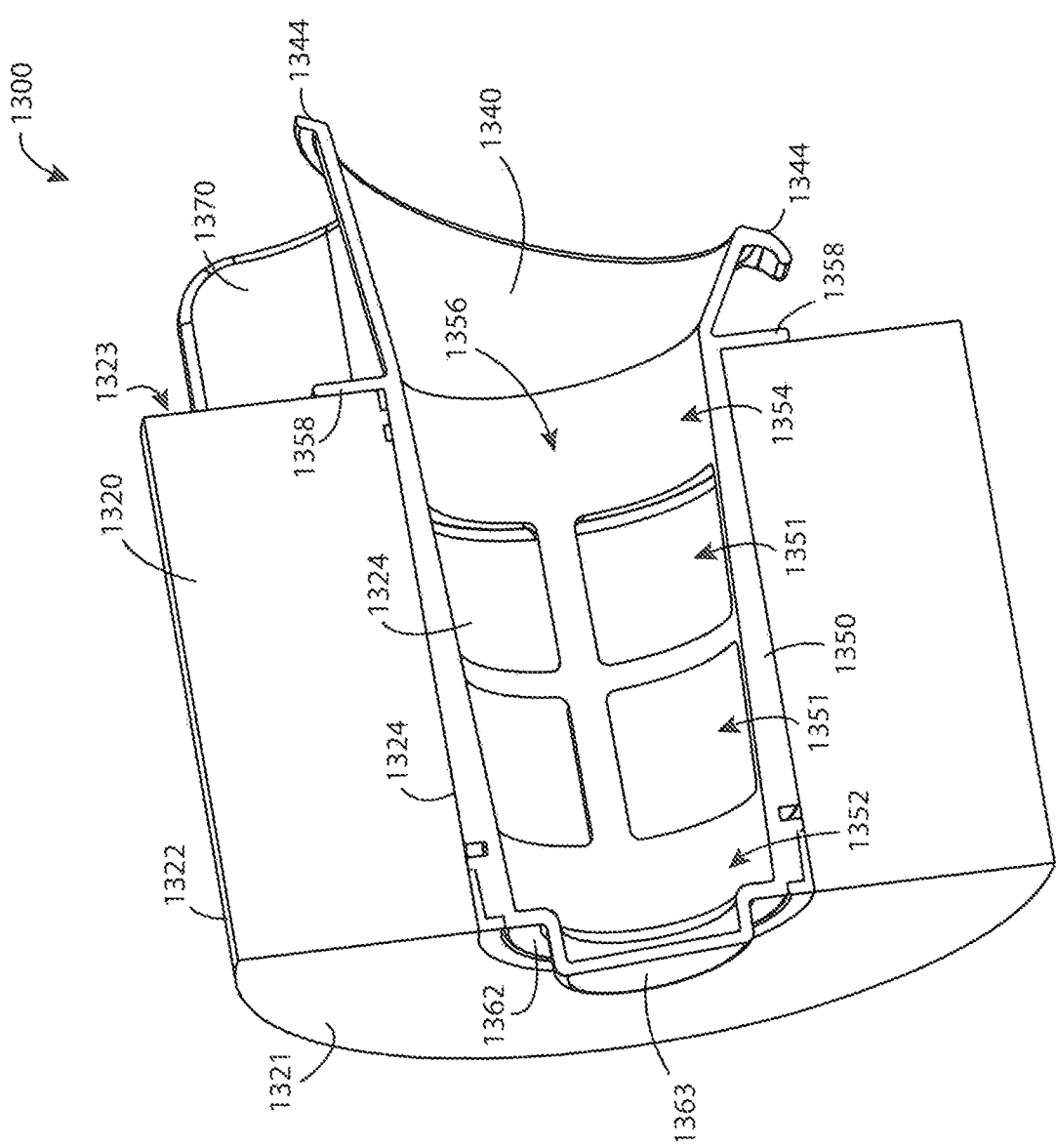
FIG. 21 is a perspective section view of the removable pre-motor filter assembly of the hand vacuum cleaner of FIG. 19, taken along line 21-21 in FIG. 19.

In the illustrated example, a pair of alignment flanges 1370 extend from an axially longer (outermost) side of outlet conduit 1342. Flanges 1370 may facilitate in the seating and/or alignment of pre-motor filter assembly 1300 within a pre-motor filter chamber. For example, in the illustrated example the flanges 1370 may be configured to act as camming surfaces with one or more projections from an internal surface of the openable door 1330 of the pre-motor filter chamber. As shown in FIG. 18, openable door 1330 has an inwardly extending projection 1338 that has a width approximately equal to a radial distance between flanges 1370. In this arrangement, as openable door 1330 is closed, projection 1338 is configured to come into contact with both flanges 1370, thereby promoting a predetermined orientation of pre-motor filter assembly 1300 relative to the pre-motor filter housing 1310 as well as locating the outlet conduit to be aligned with the downstream air flow conduit.

Additionally, or alternatively, flanges 1370 may allow a user to grip and/or manipulate pre-motor filter assembly 1300 without having to come into contact with pre-motor filter 1320, which may become dirty during use.

Figure 15:
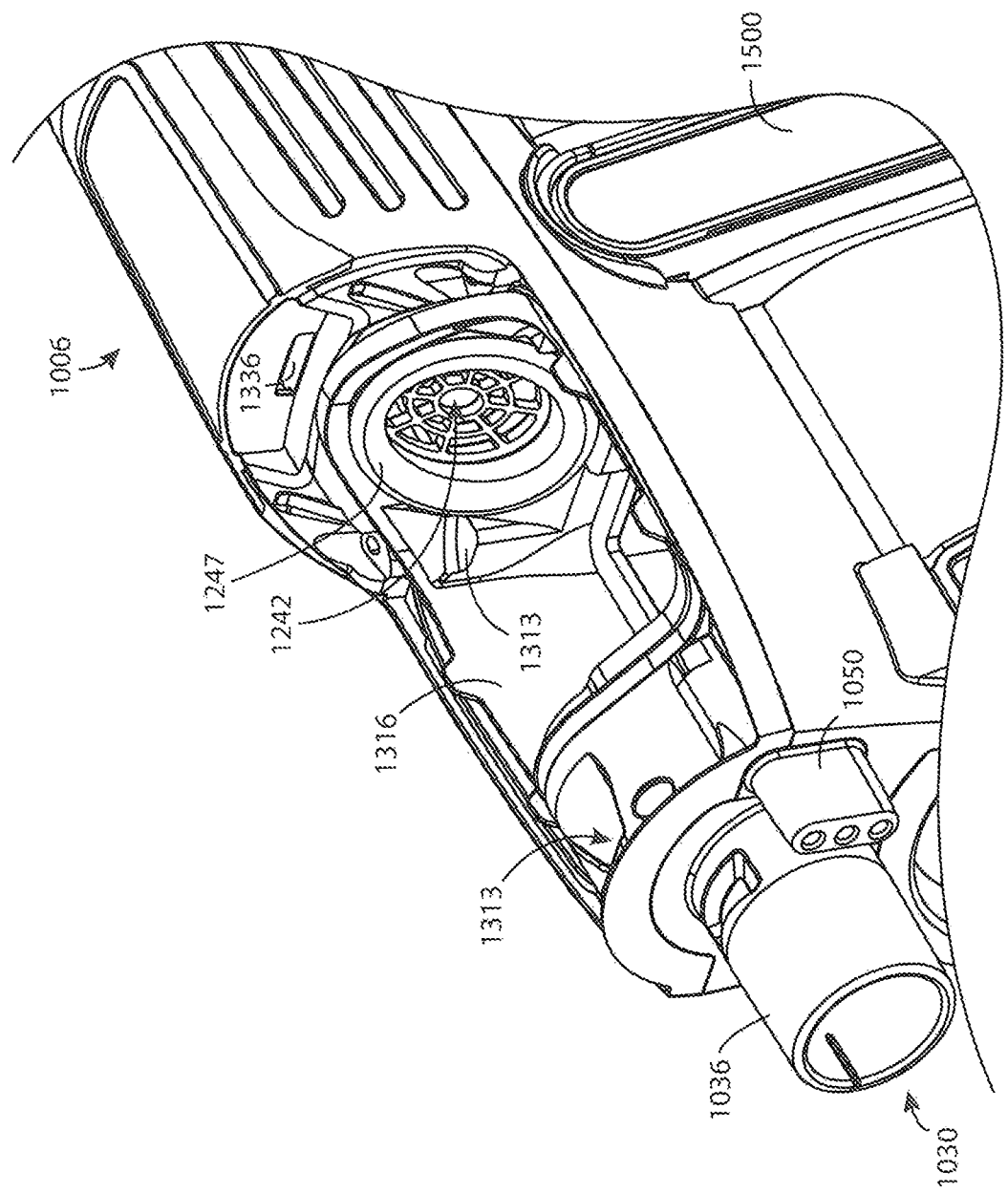
FIG. 15 is a top perspective view of the upper front portion of the hand vacuum cleaner of FIG. 1, with a pre-motor filter assembly and an openable door removed.
Figure 16:
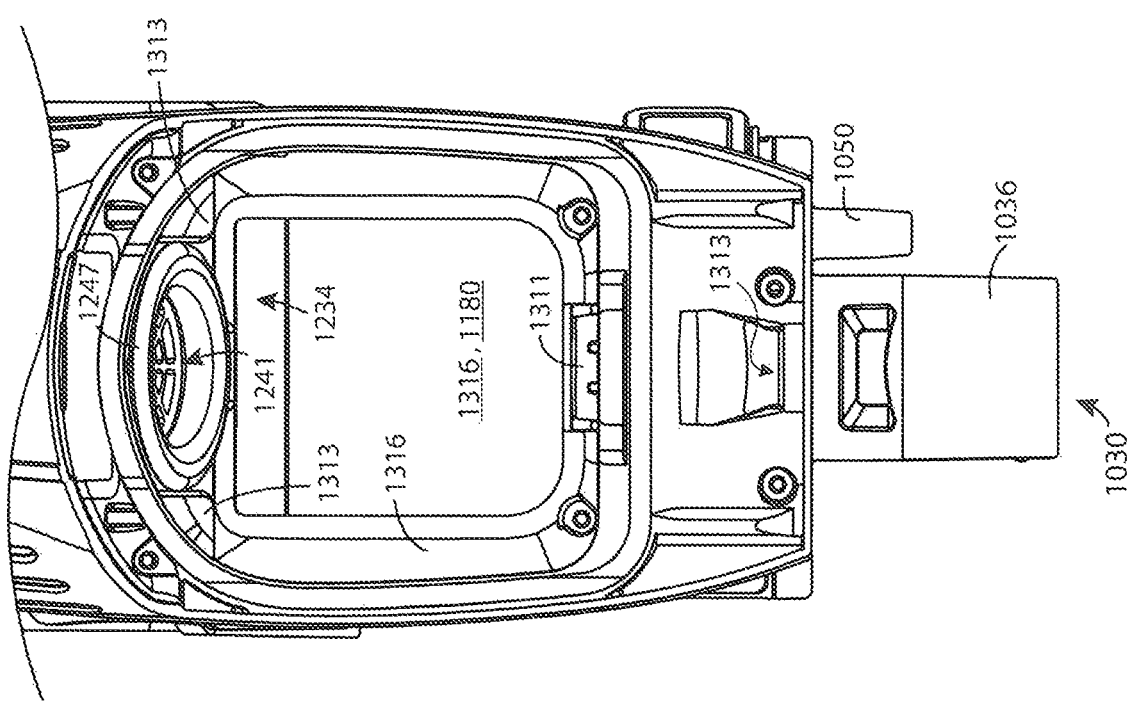
FIG. 16 is a top plan view of the upper front portion of the hand vacuum cleaner of FIG. 1, with a pre-motor filter assembly and an openable door removed.
Figure 17:
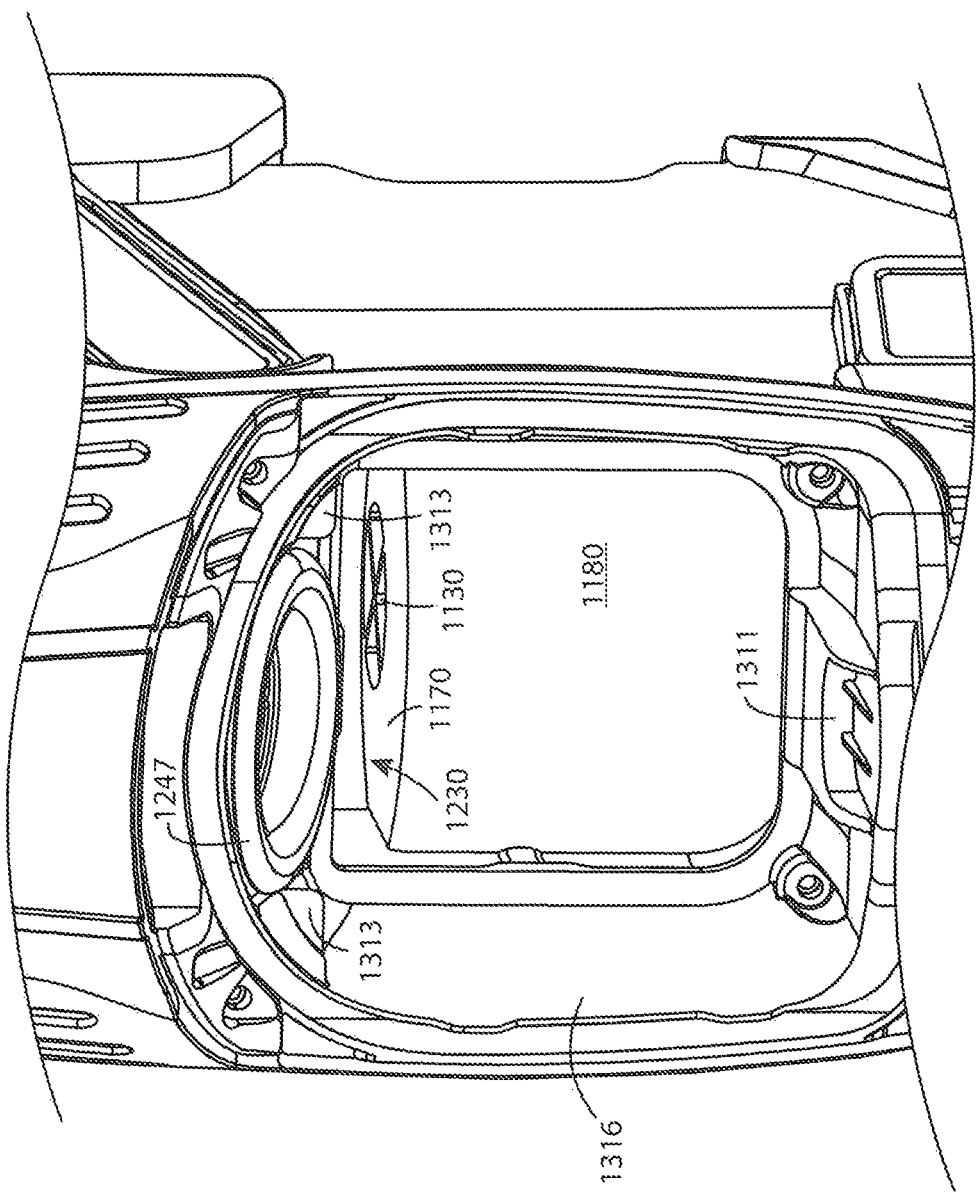
FIG. 17 is a top perspective view of the upper portion of the hand vacuum cleaner of FIG. 1, with a pre-motor filter assembly and an openable door removed.

Optionally, one or more support projections may be provided on one or both ends of pre-motor filter assembly 1300. In the illustrated example, a pair of support flanges 1372 extend from opposite lateral sides of outlet conduit 1342. Flanges 1372 may facilitate the support and/or alignment of pre-motor filter assembly 1300 within a pre-motor filter chamber. For example, in the illustrated example the flanges 1372 may be configured to rest on corresponding support surfaces provided at the rearward end of the pre-motor filter chamber. As shown in FIGS. 15-17, surfaces 1313 are formed in end wall 1344 of the pre-motor filter chamber 1310. Also, a surface 1311 is formed in the opposing end wall 1312. In this arrangement, as pre-motor filter assembly 1300 is lowered into the pre-motor filter chamber 1310, surfaces 1313 are configured to come into contact with and support flanges 1372, and surface 1311 is configured to come into contact with and support outwardly projecting portion 1363 of filter support member 1340, thereby promoting a predetermined vertical position and/or angle of pre-motor filter assembly 1300 relative to the pre-motor filter housing 1310.

In the illustrated embodiment, filter support member 1340 (including outlet conduit 1342, main body portion 1350, and end wall 1362) is a one piece assembly (e.g. integrally formed). In alternative embodiments, filter support member 1340 may be constructed from two or more parts.

While in the illustrated example the pre-motor filter 1320 and the filter support member 1340 are co-axial, this may not be the case in alternative embodiments.

Figure 22:
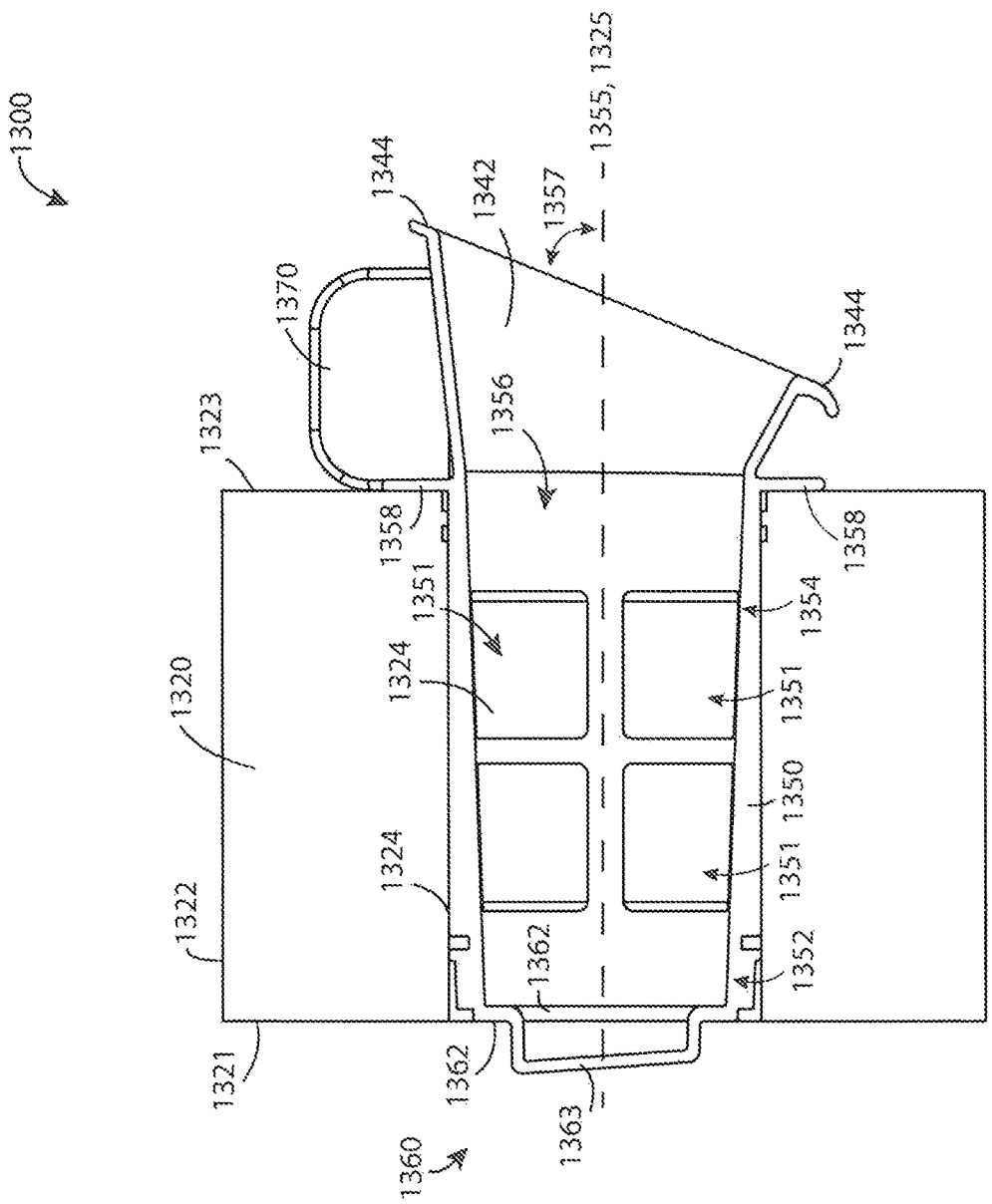
FIG. 22 is a cross section view of the removable pre-motor filter assembly of the hand vacuum cleaner of FIG. 19, taken along line 21-21 in FIG. 19.
Figure 23:
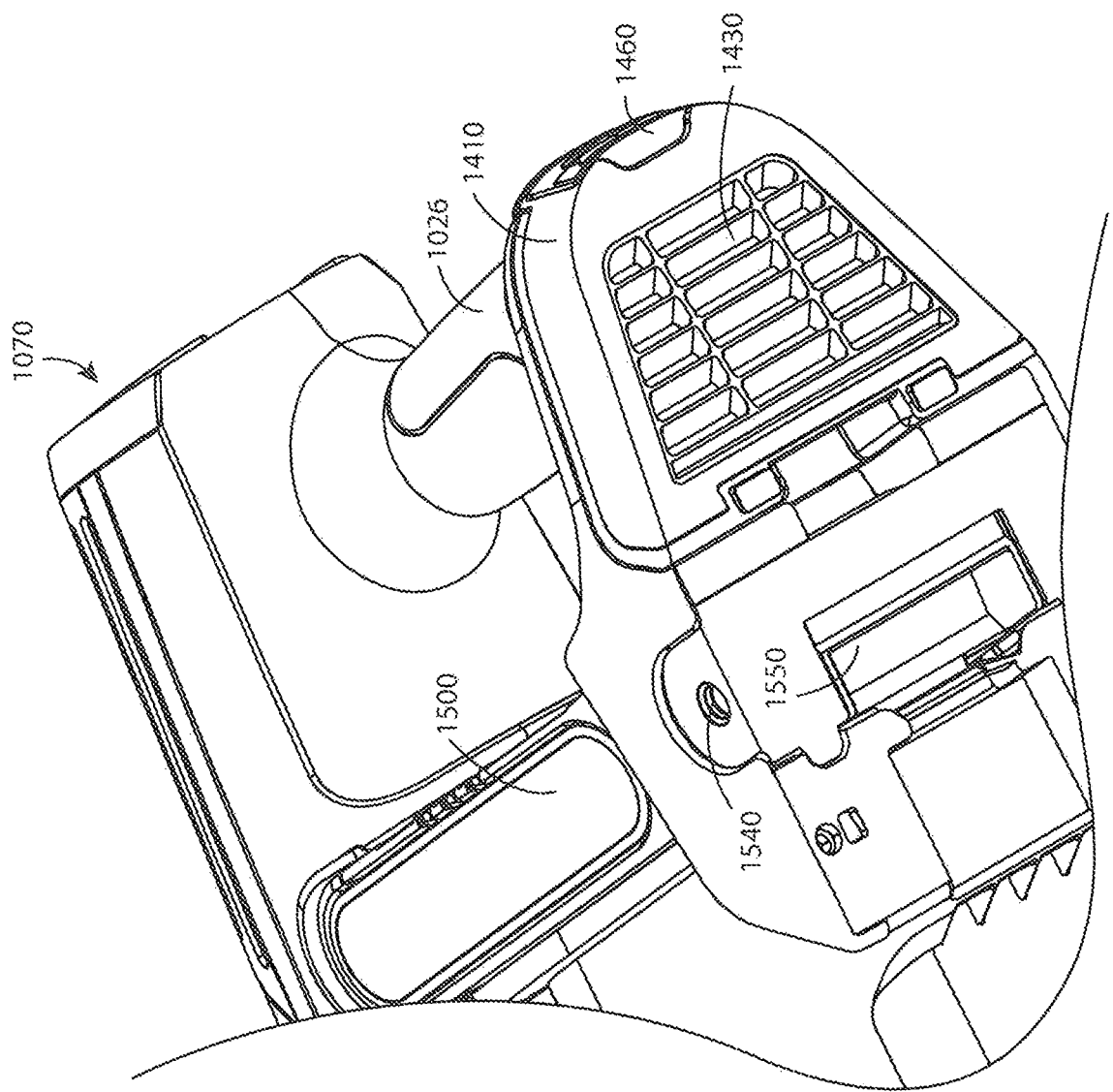
FIG. 23 is a bottom perspective view of the lower rear portion of the hand vacuum cleaner of FIG. 1.
Figure 24:
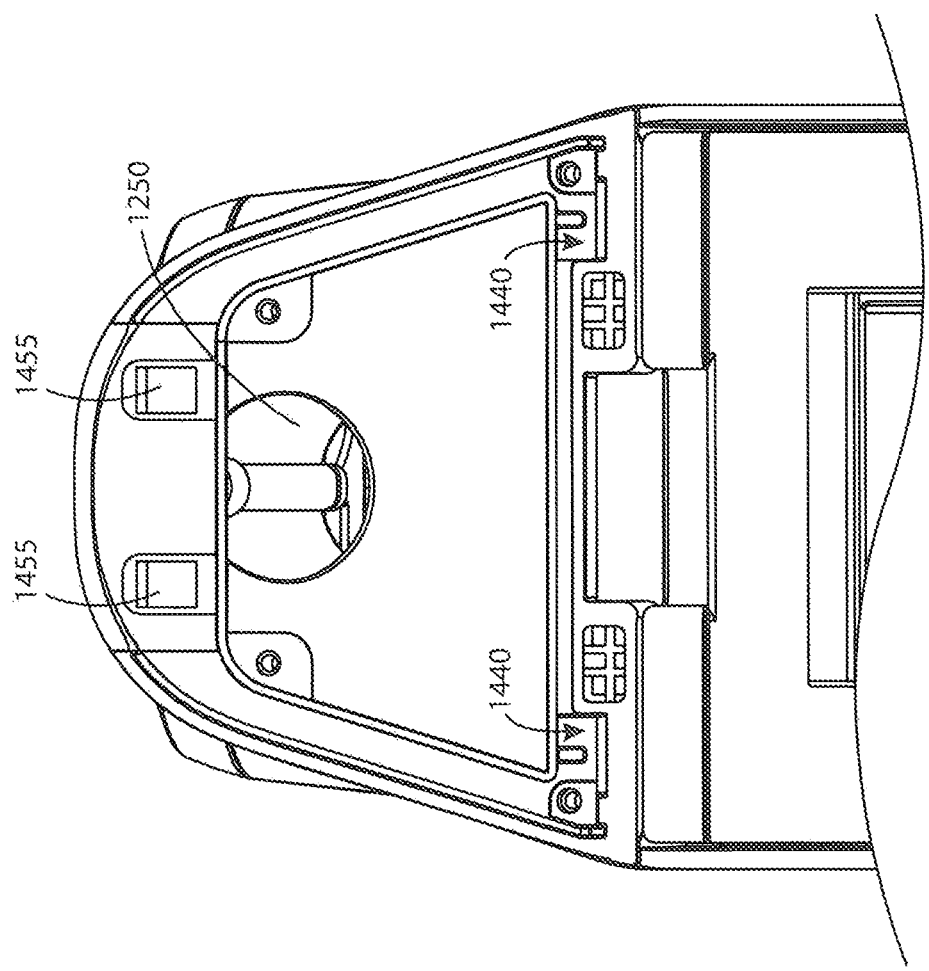
FIG. 24 is a bottom perspective view of the lower rear portion of the hand vacuum cleaner of FIG. 1, with a post-motor filter and a post-motor filter support removed.
Figure 25:
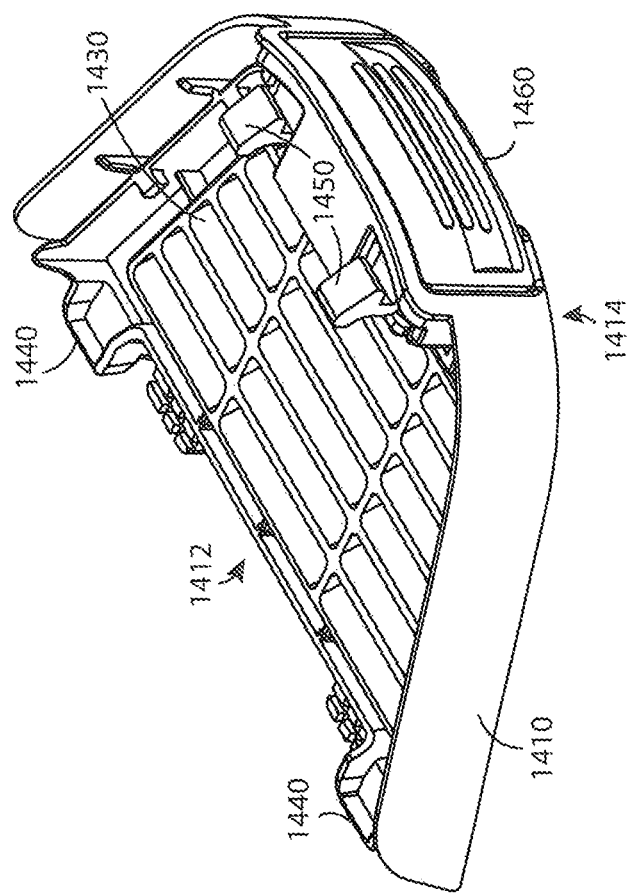
FIG. 25 is a rear perspective view of a post-motor filter support of the hand vacuum cleaner of FIG. 1.
Figure 26:
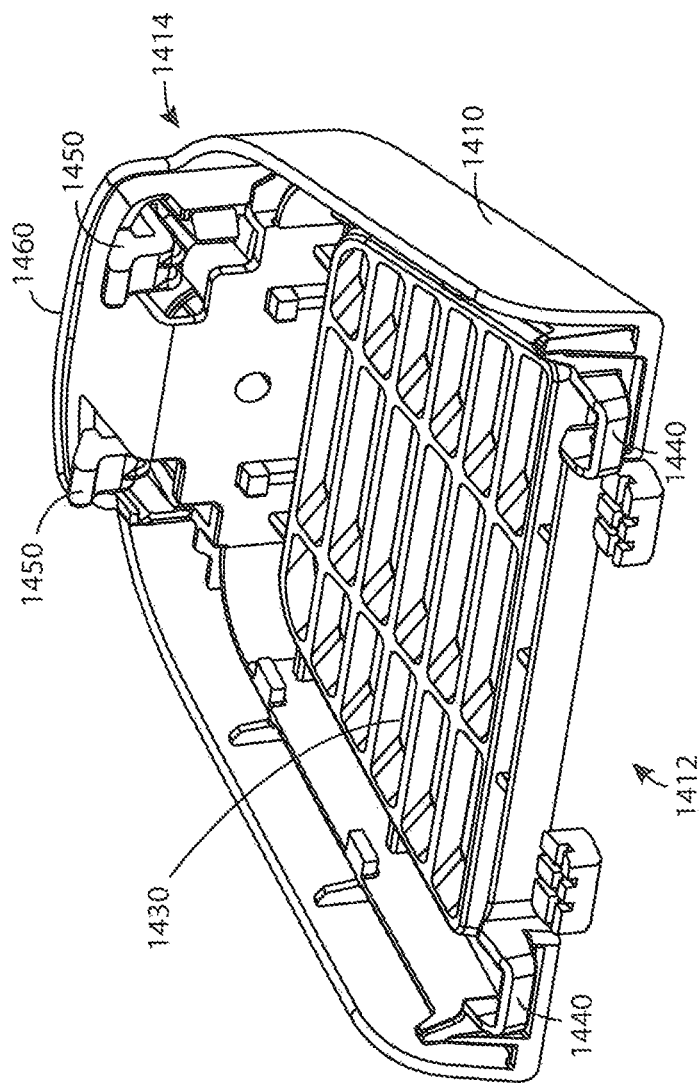
FIG. 26 is a front perspective view of the post-motor filter support of FIG. 25.
Figure 27:
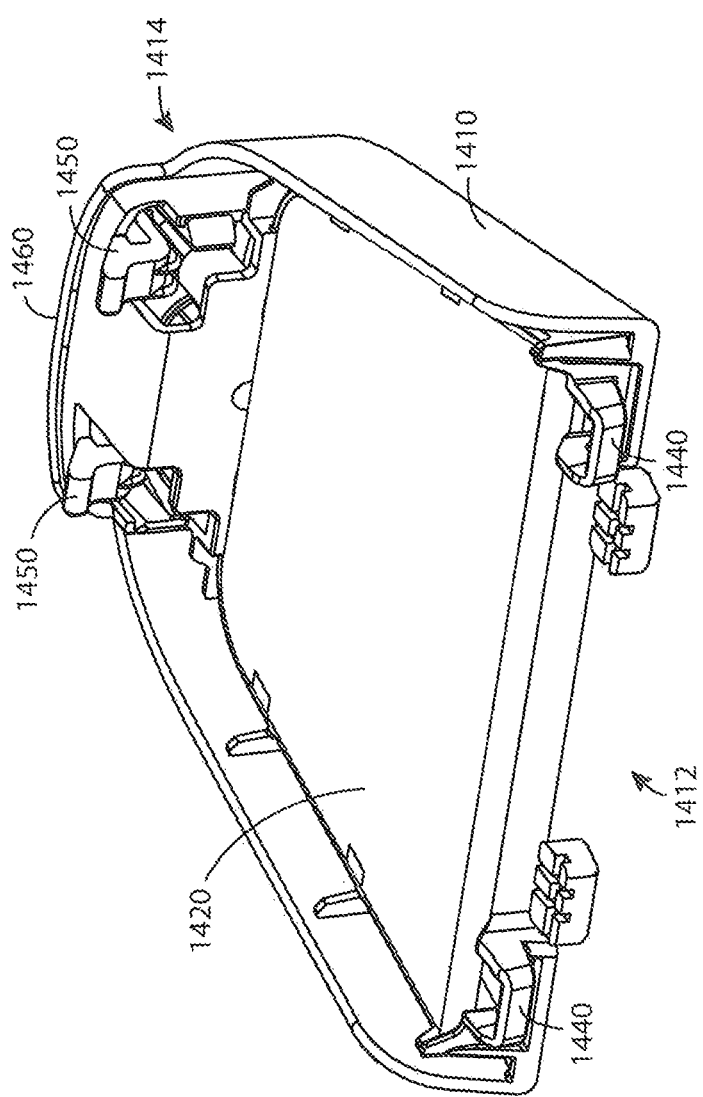
FIG. 27 is a front perspective view of the post-motor filter support of FIG. 26 and a post-motor filter.

As illustrated in FIG. 22, a downstream or terminal end 1344 of the outlet conduit 1342 is at an angle 1357 to a direction of air flow through the outlet conduit (e.g. generally parallel to a central pre-motor filter axis 1325 and/or a central filter support member axis 1355). Outlet conduit 1342 mates with air conduit 1246, which provides the air outlet 1242 from pre-motor filter chamber 1310. As discussed subsequently, the inlet end of outlet conduit 1342 may be similarly angled.

An advantage of the terminal end of the outlet conduit being at an angle of to a direction through the outlet conduit is that the removable filter assembly may be positioned substantially flush against a downstream air conduit (e.g. a conduit that leads to a suction motor) having a similarly angled terminal end without requiring lateral movement of the outlet conduit towards other conduit. For example, the filter assembly may be moved in a direction substantially perpendicular to the direction of airflow (e.g., vertically upwardly in the orientation of FIG. 11). Such an arrangement may, for example, facilitate the use of a gasket or other sealing member between the ends of the conduits to provide an improved seal between the conduits. For example, if the terminal end of the outlet conduit were perpendicular to a direction of airflow through the conduit, moving the filter assembly in a direction substantially perpendicular to the direction of airflow may shear or otherwise damage a flexible or otherwise deformable gasket (e.g. an elastomeric gasket or the like) provided at the end of the conduit to which the outlet conduit is to be aligned.

Alternatively, or additionally, such an arrangement may eliminate the need for a biasing or other retaining mechanism to exert a force on the filter assembly to maintain a seal between the conduits. For example, if the terminal end of the outlet conduit were perpendicular to a direction of airflow through the conduit, to avoid damaging a gasket or other sealing member between the conduit ends, at least the final motion to align the conduit ends may be in a direction parallel to a direction of airflow through the conduit. In such a situation, it may be necessary to maintain the application of an axial force to the pre-motor filter assembly in order to maintain an adequate seal.

As illustrated in FIGS. 11 to 17, a terminal end 1241 of the treated air conduit 1246 may also be optionally provided at an angle 1257 (see FIG. 11) to a direction of air flow through the treated air conduit 1246 that leads to the suction motor 1200. In the illustrated example, the angle 1257 is about the same as the angle 1357 between the direction of air flow through the outlet conduit 1342 of the pre-motor filter assembly and the terminal end 1344 of the outlet conduit 1342. This arrangement allows the outlet conduit 1342 and the treated air conduit 1246 to cooperatively define a generally linear air flow passage despite the angled terminal ends of the respective conduits.

Optionally, a gasket 1247 or other sealing member may be provided to help provide a substantially air tight seal between the terminal end 1344 of the outlet conduit 1342 and the terminal end 1241 of the treated air conduit 1246. In the illustrated example, the gasket 1247 has a generally consistent axial length about its perimeter, e.g. to facilitate a seal between the ends 1344, 1241 that are generally parallel to each other due to angles 1357, 1257 being about the same. Alternatively, gasket 1247 may have a variable axial length about its perimeter, e.g. to facilitate a seal where angles 1357, 1257 are different from each other (e.g. where ends 1344, 1241 are not parallel.

Another advantage of the terminal end of the outlet conduit and the inlet end of conduit 1246 being at an angle to a direction through the outlet conduit is that the outlet face of the pre-motor filter assembly may be placed onto the inlet or upstream face of conduit 1246 during insertion of the pre-motor filter assembly. Further, when door 1330 is placed in the closed position, the engagement of inwardly extending projection 1338 and flanges 1370 may apply sufficient pressure to seal the end face and inhibit leakage out of the air flow conduits.

Another advantage of the terminal end of the outlet conduit being at an angle of to a direction through the outlet conduit is that the removable filter assembly may only be positionable within the surface cleaning apparatus in a single pre-determined orientation. In other words, a user may only be able to mount to the pre-motor filter assembly in a single orientation relative to the surface cleaning apparatus. This may prevent, for example, the pre-motor filter from being installed e.g. upside-down from its designed orientation, or otherwise mis-aligned. Accordingly, an asymmetric pre-motor filter media may be provided without the risk of a user improperly positioning the filter within a surface cleaning apparatus.

It will be appreciated that some of the embodiments disclosed herein may not use any of the features of the pre-motor filter assembly disclosed herein and that, in those embodiments, a pre-motor filter of any kind known in the art may be used, or a pre-motor filter may not be provided.

Inclined Battery Pack

The following is a description of different features of a hand vacuum cleaner with an inclined battery pack. These features may be used by themselves in any surface cleaning apparatus or in any combination or sub-combination with any other feature or features described herein. For example, any of the battery pack configurations described herein may be used with any of the air flow paths, pre-motor filter assemblies, relative positioning of the suction motor and energy storage members, battery pack configurations, airflow cooling configurations, and other features described herein.

In accordance with this feature, an upper end of the battery pack may be inclined in a forward direction. Accordingly, the lower end of the battery pack may extend further rearwardly. If the dirt collection region is located adjacent a forward face of the battery pack, then the dirt collection region may extend further rearwardly, thereby enabling a larger dirt collection region to be provided.

It will be appreciated that, in many embodiments, power may be supplied to the hand vacuum cleaner 1000 by an electrical cord connected to the hand vacuum (not shown) that can be connected to a standard wall electrical outlet. In such embodiments, the suction motor 1200 and other electronics may run on AC power supplied from a wall socket. In accordance with this feature, alternatively, or in addition to being powered by an electrical cord, the hand vacuum cleaner may include one or more onboard power sources. The power sources may be any suitable device, including, for example one or more batteries. Optionally, the batteries and battery packs may be rechargeable or may be replaceable, non-rechargeable batteries.

Battery pack 1500 may include any suitable number of cells 1510, and may include, for example, lithium ion battery cells. Any number of cells may be used to create a power source having a desired voltage and current, and any type of battery may be used, including NiMH, alkaline, and the like. Battery pack 1500 may be of any known design and may be electrically connected to the hand vacuum cleaner by any means known in the art.

Figure 32:
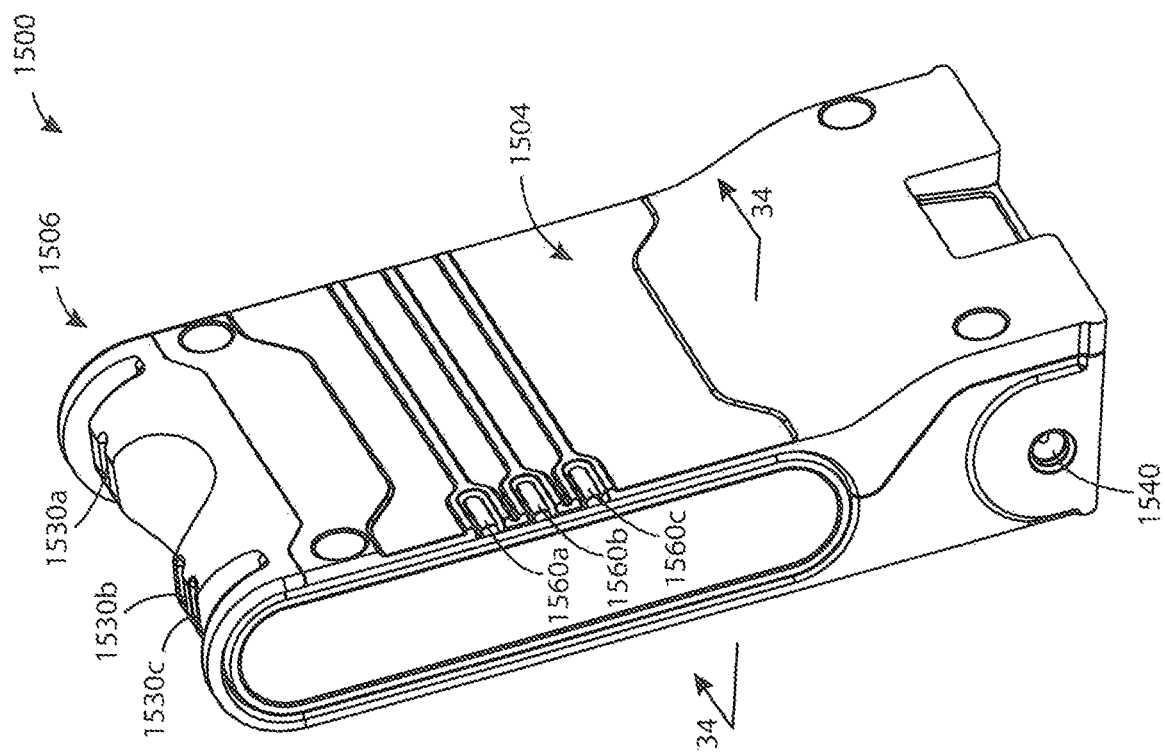
FIG. 32 is a perspective view of an energy storage member of the hand vacuum cleaner of FIG. 1.
Figure 33:
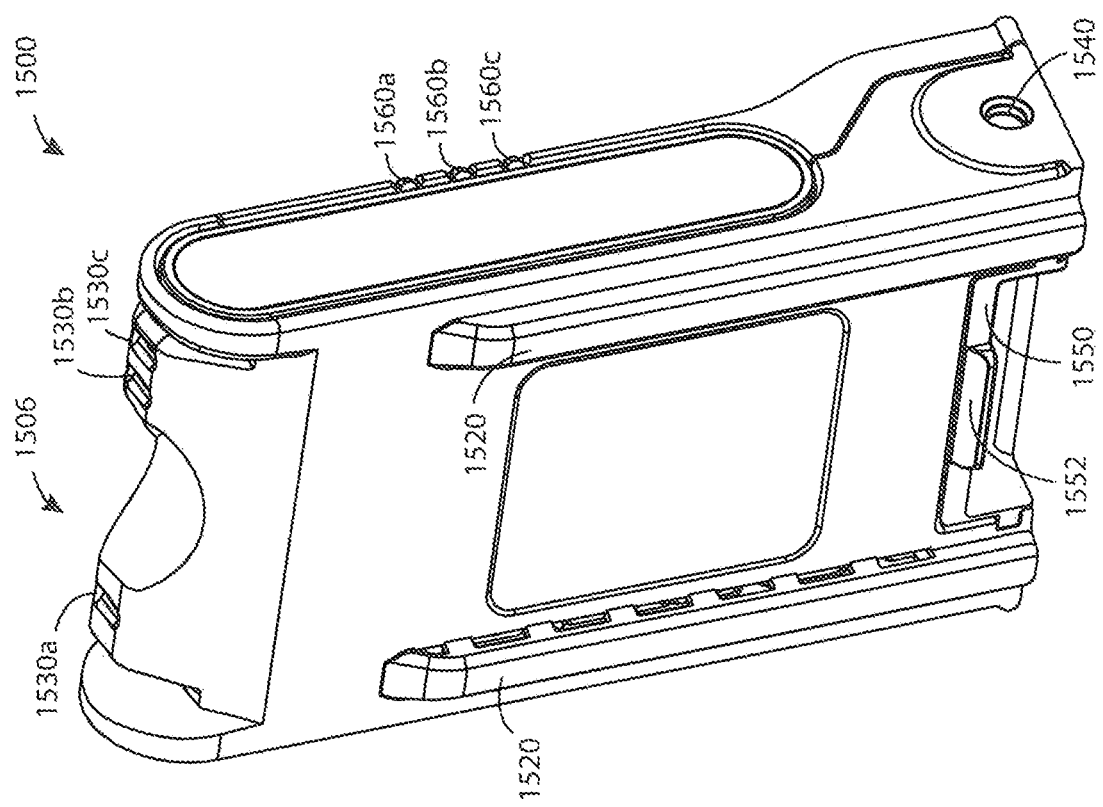
FIG. 33 is a front perspective view of the energy storage member of FIG. 32.
Figure 34:
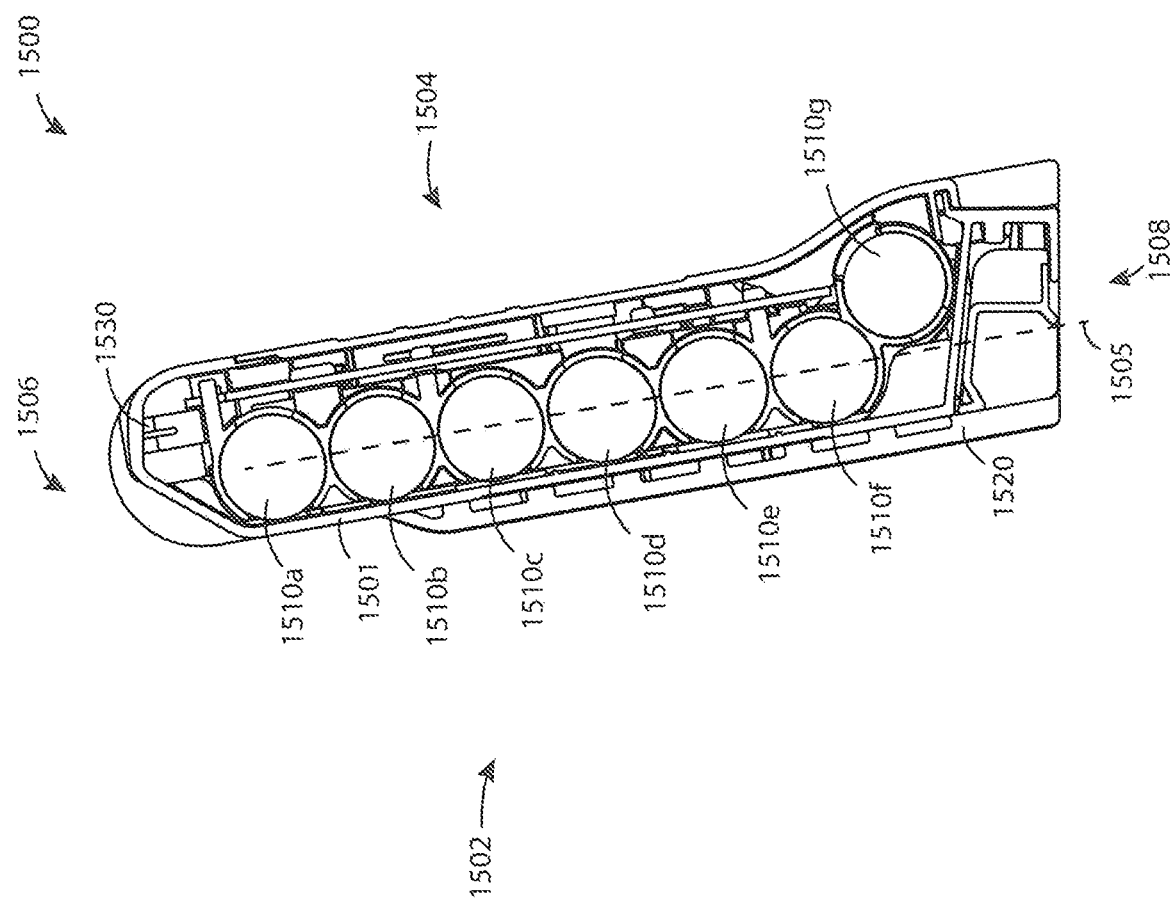
FIG. 34 is a cross-section view of the energy storage member of FIG. 32, taken along line 34-34 in FIG. 32.
Figure 35:
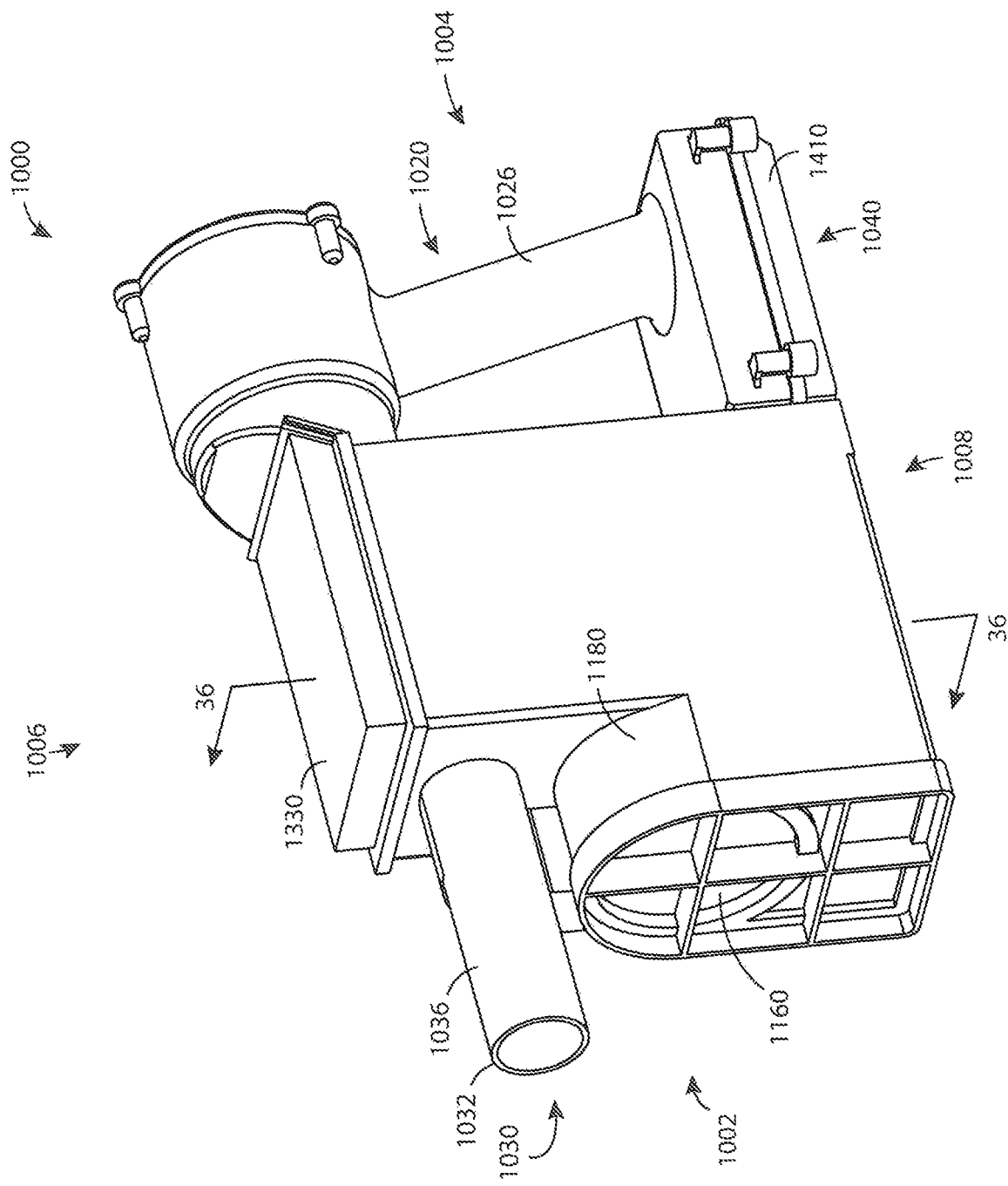
FIG. 35 is a perspective view of a hand vacuum cleaner in accordance with another embodiment.

FIGS. 32 to 34 exemplify a battery pack 1500. As exemplified, battery pack 1500 has an upper end 1506, a lower end 1508, a front face 1502, and a rear face 1504. In the illustrated example, battery pack 1500 is generally rectangular, but alternative embodiments may have any suitable shape.

In the illustrated examples, battery pack 1500 has a power coupling 1540 for supplying power (e.g. charging) the cells 1510. Any suitable power coupling may be used, for example, a female coupling configured to receive a male coupling of an electrical cord that is connectable to a source of AC or DC power, such as a household power socket. Optionally, power coupling 1540 is accessible when the battery pack 1500 is electrically connected to hand vacuum cleaner 1000. An advantage of such a configuration is that the battery pack may be charged without removing it from the hand vacuum cleaner 1000. Another advantage is that it may allow for corded operation of hand vacuum cleaner 1000 when the power cells 1510 are substantially or completely discharged, as power may be supplied to the suction motor via power coupling 1540 instead of (or while) charging the cells 1510.

Figure 28:
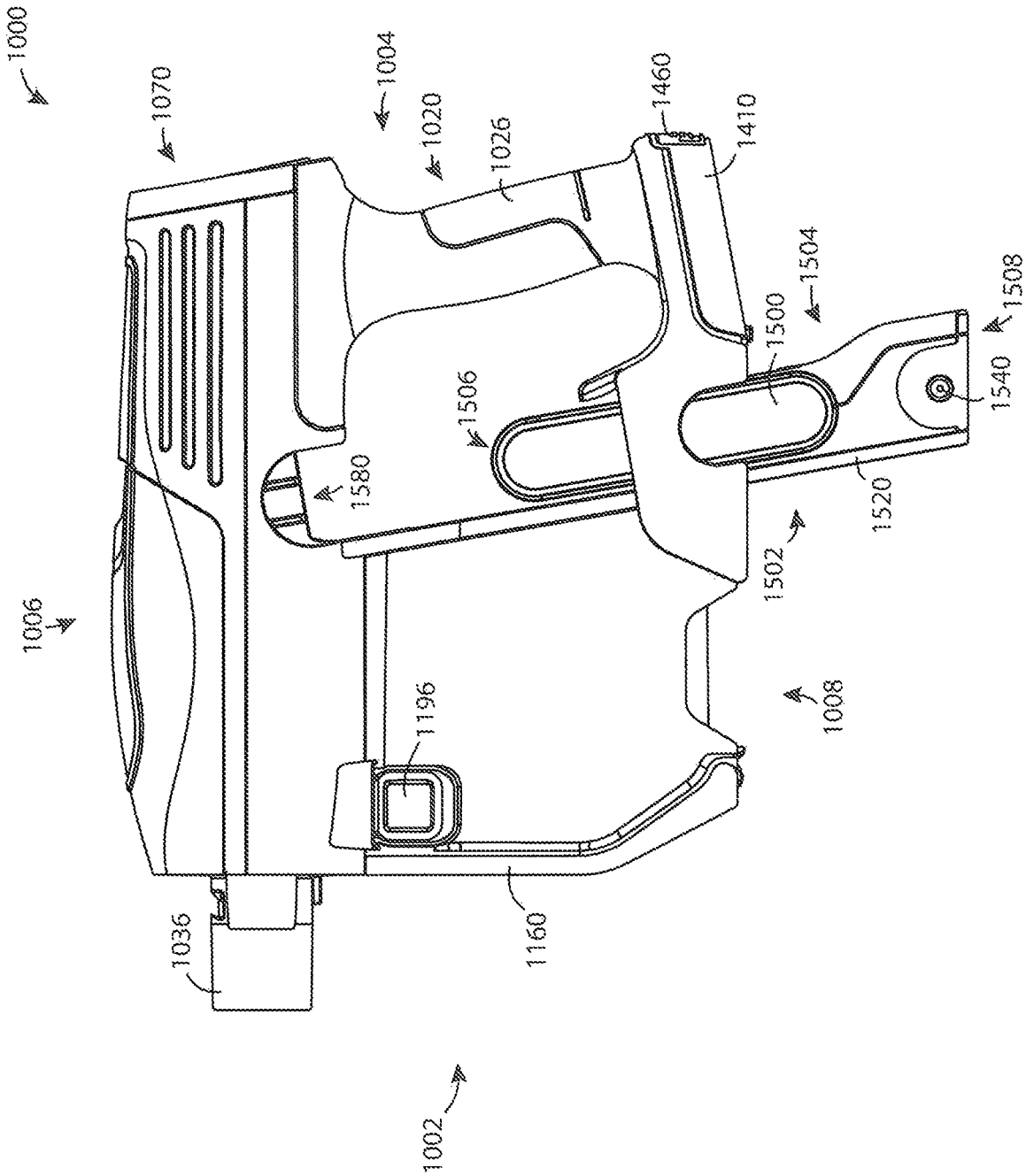
FIG. 28 is a side view of the hand vacuum cleaner of FIG. 1, with an energy storage member partially removed.
Figure 29:
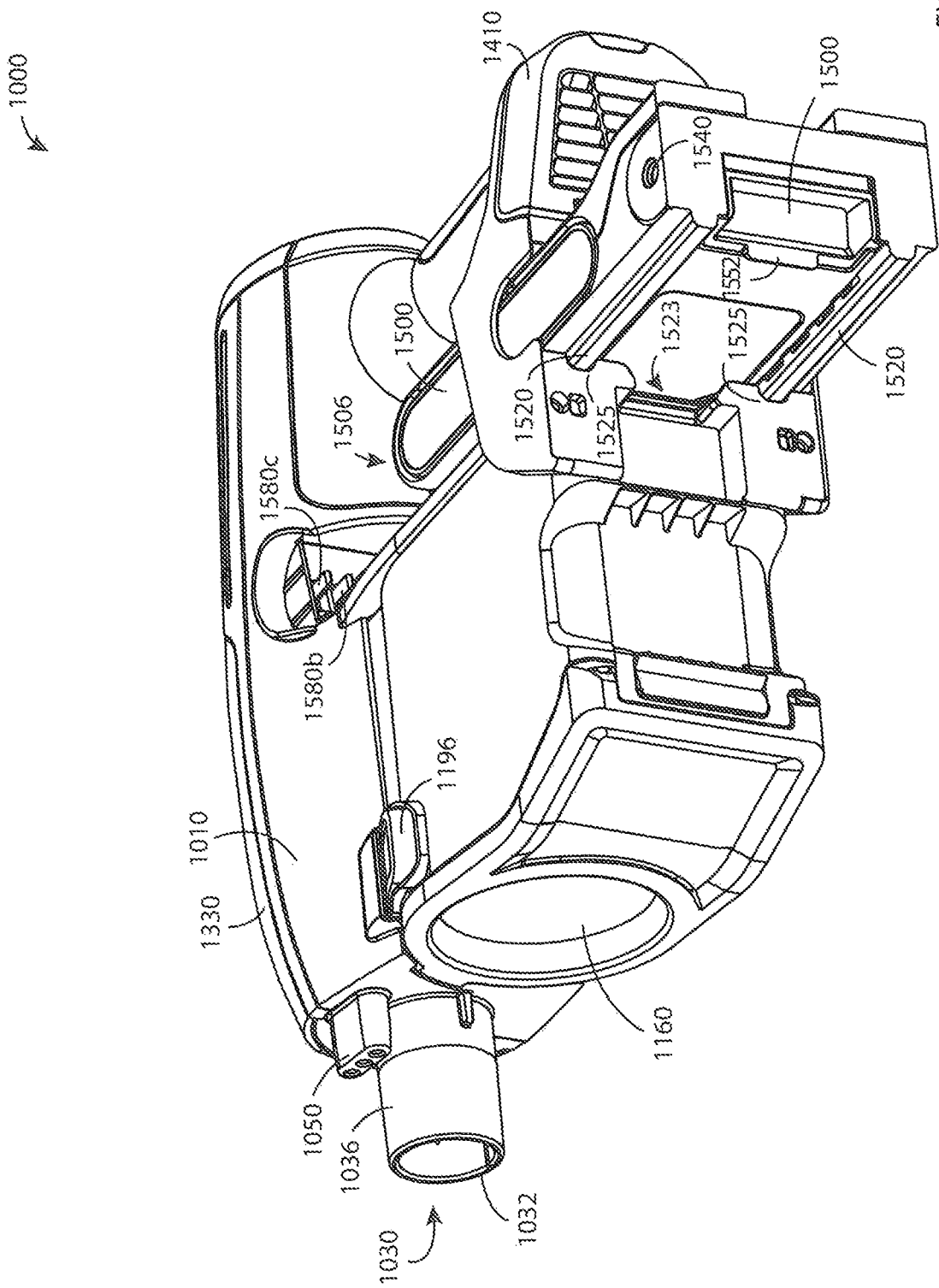
FIG. 29 is a bottom perspective view of the hand vacuum cleaner of FIG. 1, with an energy storage member partially removed.
Figure 30:
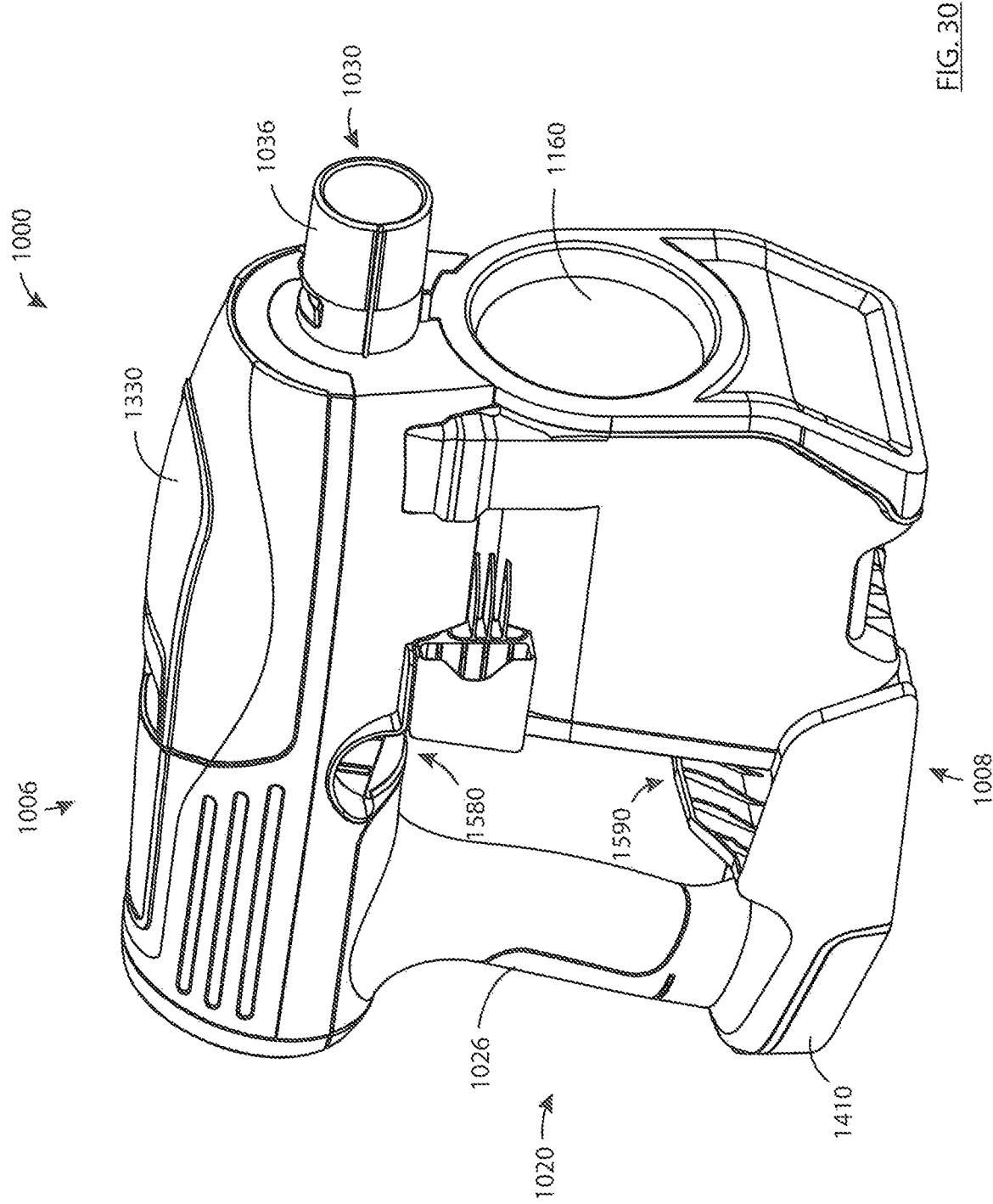
FIG. 30 is a side view of the hand vacuum cleaner of FIG. 1, with an energy storage member removed.
Figure 31:
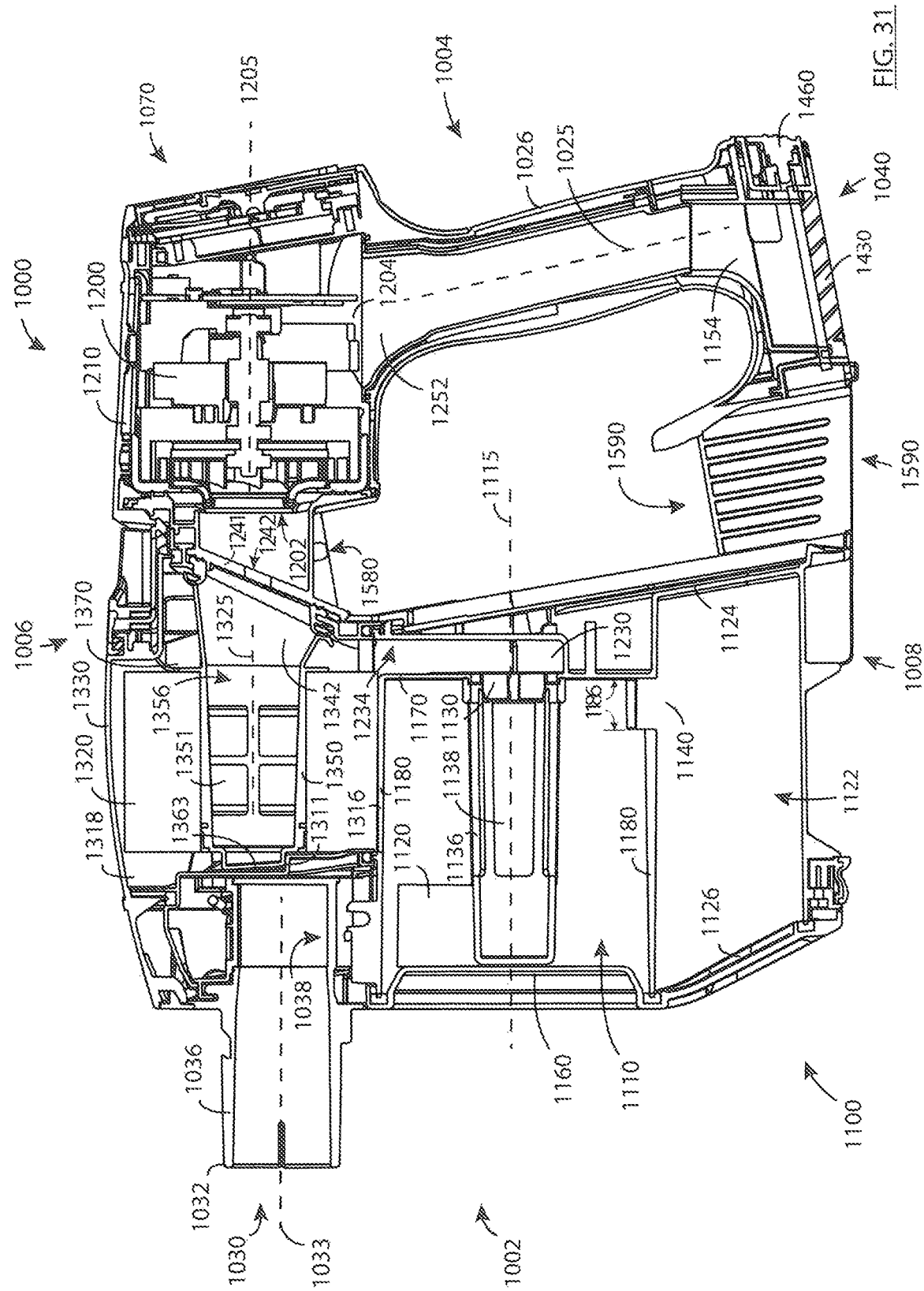
FIG. 31 is a cross-section view of the hand vacuum cleaner of FIG. 1, taken along line 9-9 in FIG. 5, with an energy storage member removed.

Optionally, the battery pack 1500 may be removable from the rest of the hand vacuum using any mechanism known in the art. Referring to FIGS. 28 and 29, the illustrated example battery pack 1500 is configured to be removable by sliding the battery pack downward through an aperture 1590 (see FIG. 31) provided in the lower end 1008 of hand vacuum 1000. Optionally, one or more guiding features may be provided on one or both of the hand vacuum 1000 and the battery pack 1500. As illustrated in FIG. 33, a pair of longitudinal ridges 1520 is provided on the front face 1502 of battery pack 1500. Ridges 1520 are configured to be slidably received in corresponding grooves 1525 on an inner face of aperture 1590 (see FIG. 29). Ridges 1520 and grooves 1525 thus cooperatively assist in aligning the battery pack as is it moved upwardly into and/or downwardly out of aperture 1590.

In the illustrated embodiment, the upper end 1506 of the battery pack 1500 is provided with a plurality of electrical connectors 1530 that can inter-engage with compatible electrical connectors 1580 on the main body 1010 (see e.g. FIG. 29). Engagement between the electrical connectors 1530 and 1580 can provide an electrical connection between the batteries 1510 and the suction motor 1200, and optionally other electronics, such as display device 1070. In this arrangement, removing the battery pack 1500 interrupts the supply of power to the suction motor 1200, and the suction motor 1200 is not operable when the battery pack 1500 is detached. It will be appreciated that electrical connectors 1530 may be located elsewhere on the battery pack.

The battery pack 1500 can be secured to the rest of the main body 1010 using any suitable attachment mechanism, including mechanical latches, retention catches, or any other mechanism attachment structure capable of being released to disengage and remove the battery pack. Optionally, one or more actuators for releasing the attachment mechanism may be provided on the main body 1010 (and remain with the main body when the battery pack is removed), or alternatively may be provided on the battery pack 1500 such that the actuator is removable with the battery.

Referring to FIGS. 9 and 33, in the illustrated example battery pack 1500 is configured to be releasably secured to hand vacuum 1000 using a single latch at the lower end 1506. The latch can be released by pressing the release actuator that is provided in the form of button 1550. Pressing rearwardly on the button 1550 results in a disengagement of a tab 1552 from a corresponding retaining surface 1523 provided proximate to and facing towards aperture 1590. The button 1550 is mounted to the lower end 1506 of battery pack 1500, and is removable with the battery pack.

Alternatively, a release actuator may be provided on the main body 1010 of the hand vacuum cleaner, and a corresponding retaining surface may be provided on the battery pack 1500. For example, in the example illustrated in FIG. 36, a retaining surface 1523 is provided on a rear face 1504 of battery pack 1500, and is removable with the battery pack. A release actuator that is provided in the form of button 1550 is positioned on the main body 1010 of hand vacuum 1000. Pressing forwardly on the button 1550 results in a pivoting and disengagement of a tab 1552 from retaining surface 1523.

Optionally, the battery pack 1500 may be configured so that it can be connected to one or more other devices/apparatuses, in addition to the hand vacuum 1000. For example, the same battery pack 1500 that is used with the hand vacuum could be connectable to another vacuum, power tool, cleaning device (such as a mop, steam cleaner, carpet extractor, etc.) or any other suitable device to power the other device(s) that the battery pack can be connected to.

Optionally, the battery pack 1500 may have one or more output devices to e.g. provide an indication of a status of the battery pack and/or of one or more of the individual battery cells 1510. For example, one or more visual indicators such as LEDs and/or an audio output device such as a speaker may be provided. In the example illustrated in FIG. 32, a number of LEDs 1560 are provided along an edge between a rear face 1504 and a side face of the battery pack 1500. An advantage of positioning the output devices along an edge of the battery pack is that the indicators may be visible from a greater range of relative orientations than if they were positioned on a single face of the battery pack.

As illustrated in FIG. 4, another advantage of positioning the LEDs 1560a-1560c proximate a side edge of a rear face 1504 is that they may be more readily visible to a user holding the hand vacuum cleaner 1000 in front of them. Accordingly, a user may be able to see the LEDs 1560a-1560c while using the hand vacuum without having to re-orient the hand vacuum cleaner from a typical in-use position.

As discussed above, battery pack 1500 may include any suitable number of individual battery cells 1510. In example illustrated in FIG. 34, battery pack 1500 contains 7 cells 1510a-1510g. Each cell 1510 is generally cylindrical, and the cells are arranged in a generally linear configuration (in a column) along the height of battery pack 1500. More specifically, cells 1510a to 1510f are arranged with their central longitudinal axes positioned along a battery pack axis 1505 that in the illustrated example is parallel to a front wall 1501 of the battery pack 1500, and cell 1510g is positioned with its central longitudinal axis offset rearwardly from axis 1505.

As shown in FIG. 10, in the illustrated example battery pack 1500 extends upwardly and forwardly when the upper end of the hand vacuum cleaner is positioned above the lower end of the hand vacuum cleaner. For example, battery pack axis 1505 is at an angle 1507 to the horizontal when the inlet conduit axis 1035, cyclone axis 1115, filter axis 1325, and/or suction motor axis 1205 is generally horizontally oriented. For example, battery pack axis 1505 may be generally parallel to a handle axis 1025 (see FIG. 31).

Also, in the configuration shown in FIG. 10, a portion 1123 of the dirt collection chamber 1122 adjacent the rear end wall 1124 of the chamber 1122 is located below a portion of the battery pack 1500. An advantage of this design (i.e. providing at least some vertical overlap between an energy storage member and a dirt collection region) is that it may help provide a relatively larger dirt chamber capacity while helping to reduce the overall size of the hand vacuum 1000.

In the illustrated example, the rear end wall 1124 of the dirt collection chamber 1122 is at an angle to the vertical. As shown, rear end wall 1124 is generally parallel to the front wall 1501 of the battery pack 1500 and to the battery pack axis 1505, although in alternative embodiments they may not be parallel.

Also, when the inlet conduit axis 1035, cyclone axis 1115, filter axis 1325, and/or suction motor axis 1205 is generally horizontally oriented, a lower end of the front face 1502 is positioned rearward of an upper portion of the front face 1502.

It will be appreciated that the dirt collection region may be of various shapes which occupies some or all of the additional volume created by orienting the battery pack 1500 such that the lower end extends further rearwardly.

It will be appreciated that some of the embodiments disclosed herein may not use the inclined energy storage members as disclosed herein and that, in those embodiments, any suitable positioning of the energy storage members, if provided, may be used.

Positioning of Suction Motor and Energy Storage Member

The following is a description of different features of a hand vacuum cleaner with a suction motor positioned an upper end of a forwardly-inclined handle and rearward of at least some of the energy storage members. These features may be used by themselves in any surface cleaning apparatus or in any combination or sub-combination with any other feature or features described herein. For example, any of the relative positioning of the suction motor and energy storage members described herein may be used with any of the air flow paths, pre-motor filter assemblies, inclined battery packs, battery pack configurations, airflow cooling configurations, and other features described herein.

In accordance with this feature, the batteries and the suction motor may be positioned so as to reduce the torque experienced by a user operating the hand vacuum cleaner. For example, by positioning a suction motor positioned at or rearward of an upper end of a forwardly-inclined handle and rearward of at least some of the energy storage members, the weight of the suction motor may partially counterbalance the weight of the batteries.

As previously discussed, in some embodiments, batteries used to power the hand vacuum cleaner 1000 may be provided at a single location, for example as one large battery pack 1500 that may include any suitable number of cells 1510, and may include, for example, lithium ion battery cells.

Optionally, a battery pack 1500 may be positioned such that some or all of the battery cells 1510 are positioned forward of a suction motor. In this configuration, the distribution of the weight of the battery pack 1500 and the weight of the suction motor 1200 may affect the hand feel and/or perceived balance of the hand vacuum 1000.

In the example illustrated in FIG. 10, suction motor 1200 is positioned rearward of cells 1510*a*, 1510*b*, 1510*c*, 1510*d*, and 1510*e* of battery pack 1500. In the example illustrated in FIG. 43, suction motor 1200 is positioned rearward of cells 1510*a*, 1510*b*, 1510*d*, 1510*e*, and 1510*g* of battery pack 1500. In the examples illustrated in FIGS. 36, 40, and 47, all of cells 1510*a*-1510*f* are positioned forward of the suction motor 1200.

Suction motor 1200 is preferably positioned at the upper end of a forwardly inclined handle 1020, as shown in the illustrated embodiments, although it may alternatively be positioned rearward of the upper end of the handle or at the lower end or at a mid-point of a handle. Additionally, or alternatively, the handle 1020 may be generally vertical or may be rearwardly inclined.

Optionally, a battery pack 1500 may be positioned such that a volume defined by the battery cells 1510 is positioned such that an axis of rotation 1115 of a cyclone chamber 1110 may intersect such a volume when the battery pack is secured to the main body 1010. For example, the cyclone chamber 1110 may be oriented horizontally, and the battery pack 1500 may be positioned rearward of the cyclone chamber. An advantage of such a configuration is that it may facilitate a more compact design of hand vacuum 1000.

It will be appreciated that some of the embodiments disclosed herein may not use the relative positioning of the suction motor, handle, and energy storage members as disclosed herein and that, in those embodiments, any suitable design may be used.

Nested Energy Storage Members

The following is a description of different features of a hand vacuum cleaner having an energy storage member (e.g. a battery pack that includes one or more battery cells) that is positioned rearward of a dirt collection region and at least partially underlies at least a portion of one or both of a cyclone chamber and a pre-motor filter. These features may be used by themselves in any surface cleaning apparatus or in any combination or sub-combination with any other feature or features described herein. For example, any of the battery pack configurations described herein may be used with any of the air flow paths, pre-motor filter assemblies, relative positioning of the suction motor and energy storage members, inclined battery packs, airflow cooling configurations, and other features described herein.

In accordance with this feature, the some or all of a battery pack may be located beneath some or all of a cyclone chamber and/or a pre-motor filter. For example, the dirt collection region may be configured to enable the battery pack to nest or partially nest therein. Accordingly, the overall length of the hand vacuum cleaner (in the forward/rearward direction) may be reduced, thereby providing a more compact hand vacuum cleaner.

As previously discussed, in some embodiments, batteries used to power the hand vacuum cleaner 1000 may be provided at a single location, for example as one large battery pack 1500 that may include any suitable number of cells 1510, and may include, for example, lithium ion battery cells.

Optionally, a battery pack 1500 may be positioned such that at least a portion of the battery pack 1500 is nested vertically spaced from a dirt collection region 1122. For example, at least a portion of the battery pack 1500 may underlie at least a portion of one or both of a cyclone chamber 1110 and a pre-motor filter 1320. In such a configuration, the overall size or length of the hand vacuum 1000 may be reduced.

Figure 36:
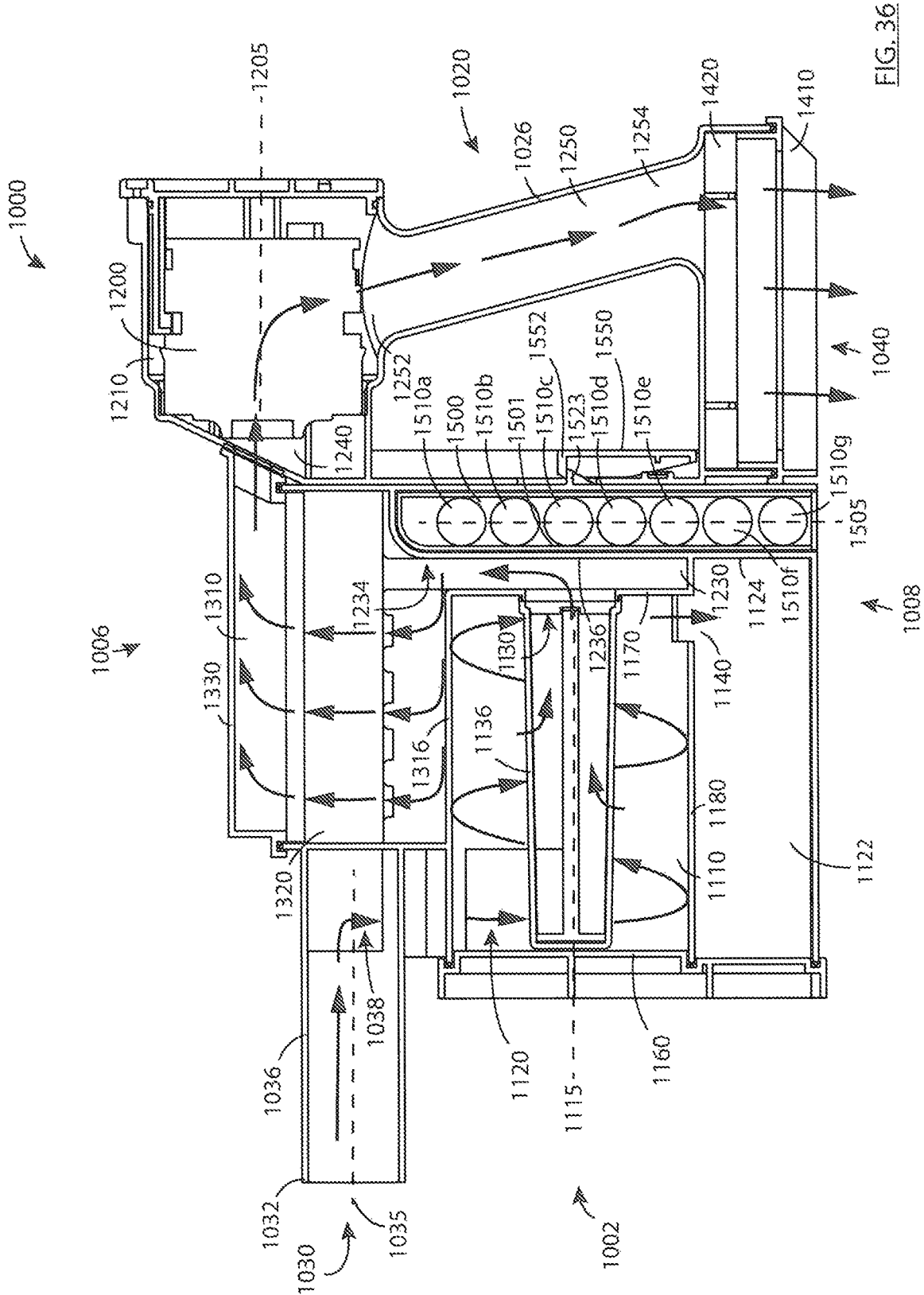
FIG. 36 is a cross-section view of the hand vacuum cleaner of FIG. 35, taken along line 36-36 in FIG. 35.
Figure 37:
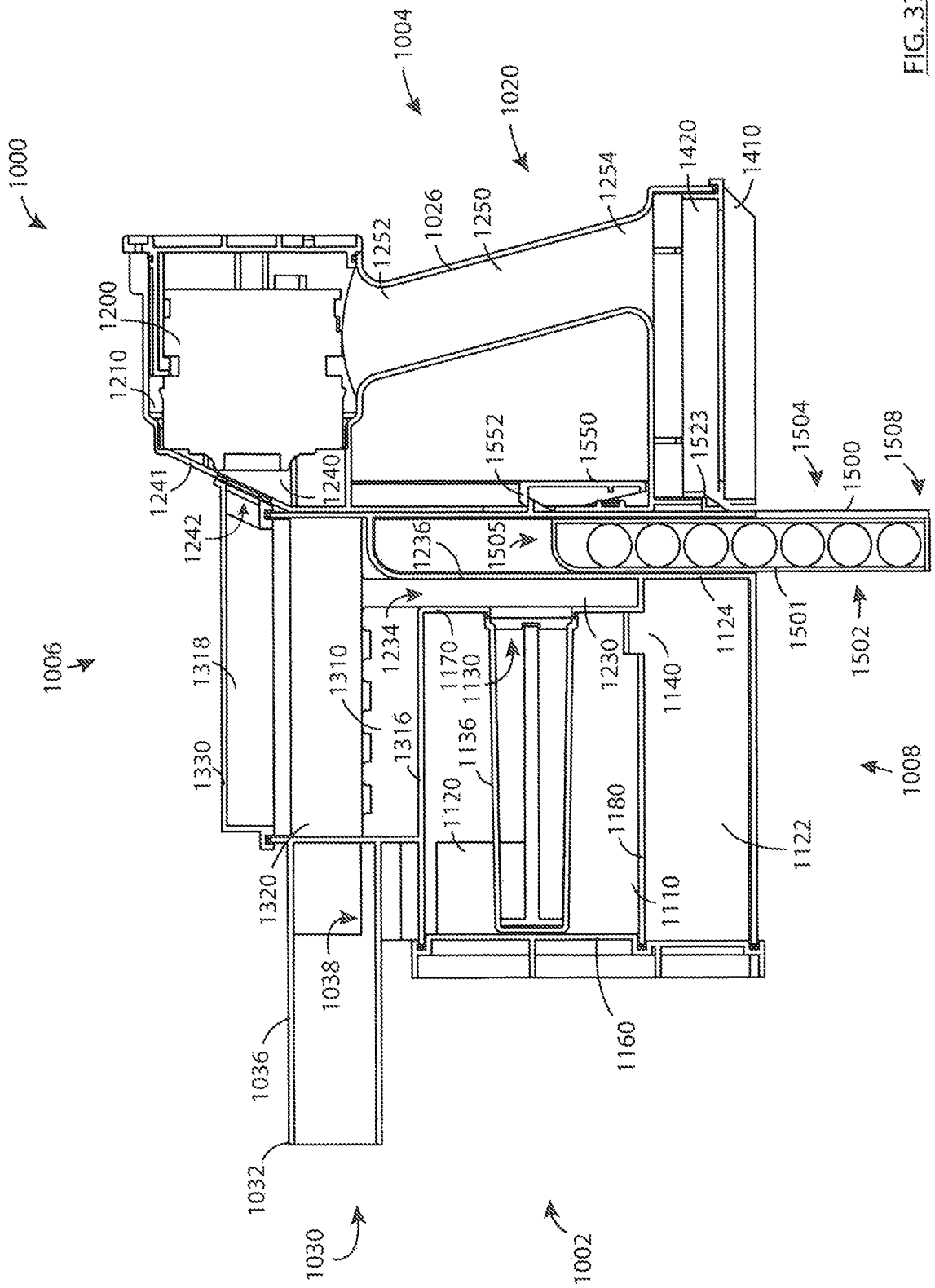
FIG. 37 is a cross-section view of the hand vacuum cleaner of FIG. 35, taken along line 36-36 in FIG. 35, with an energy storage member partially removed.
Figure 38:
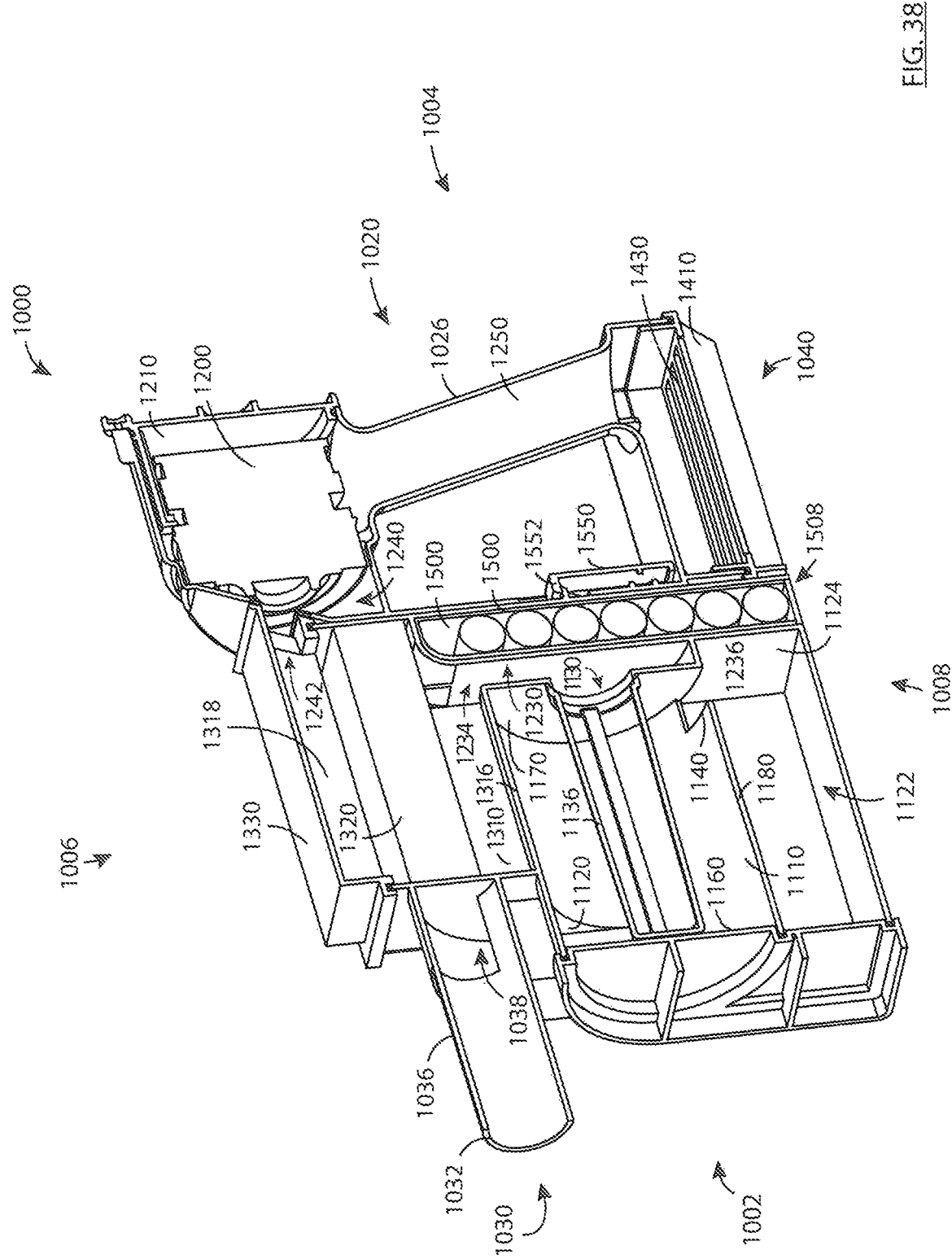
FIG. 38 is a perspective section view of the hand vacuum cleaner of FIG. 35, taken along line 36-36 in FIG. 35, with a post-motor filter removed.
Figure 39:
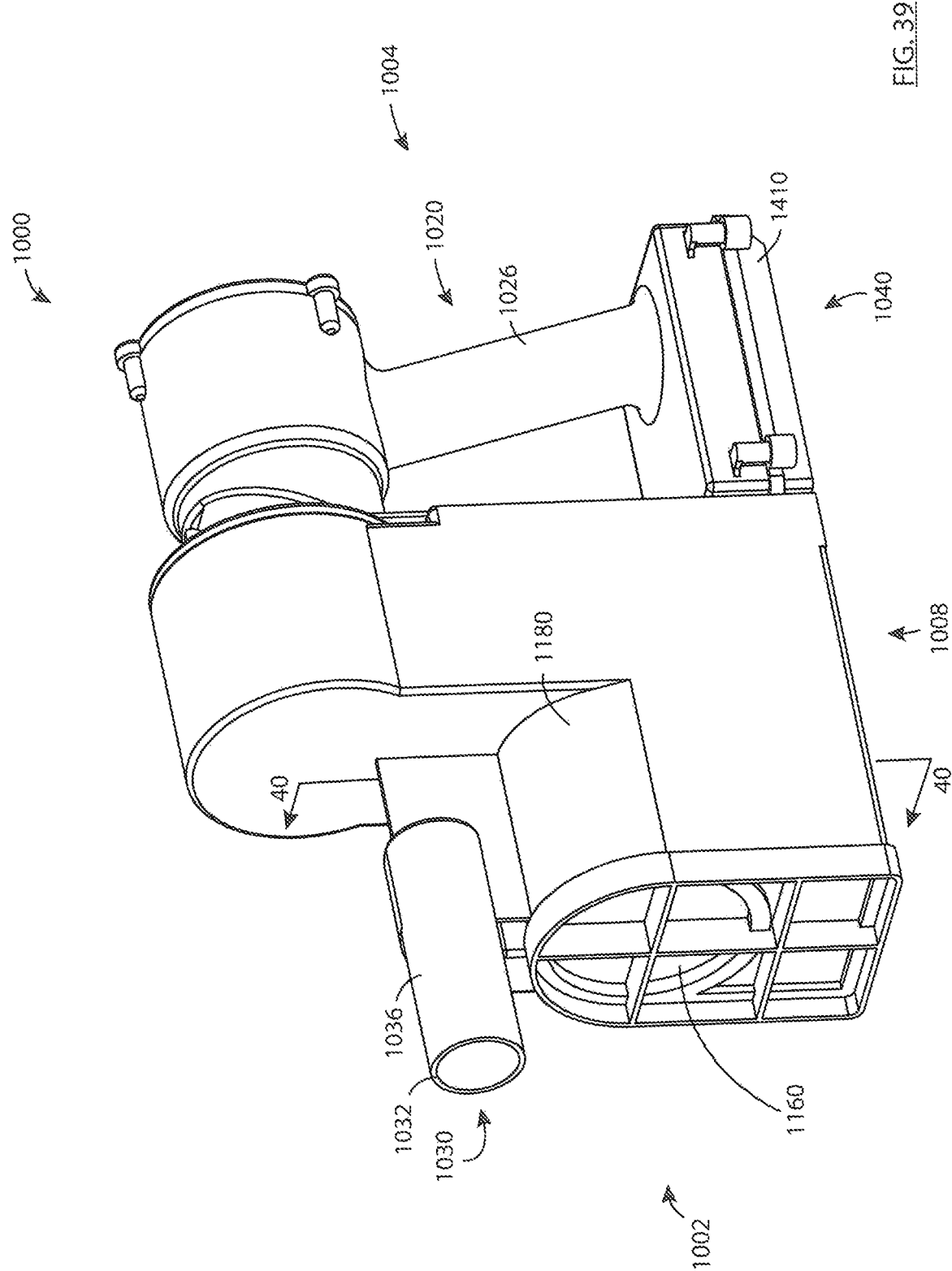
FIG. 39 is a perspective view of a hand vacuum cleaner in accordance with another embodiment.
Figure 40:
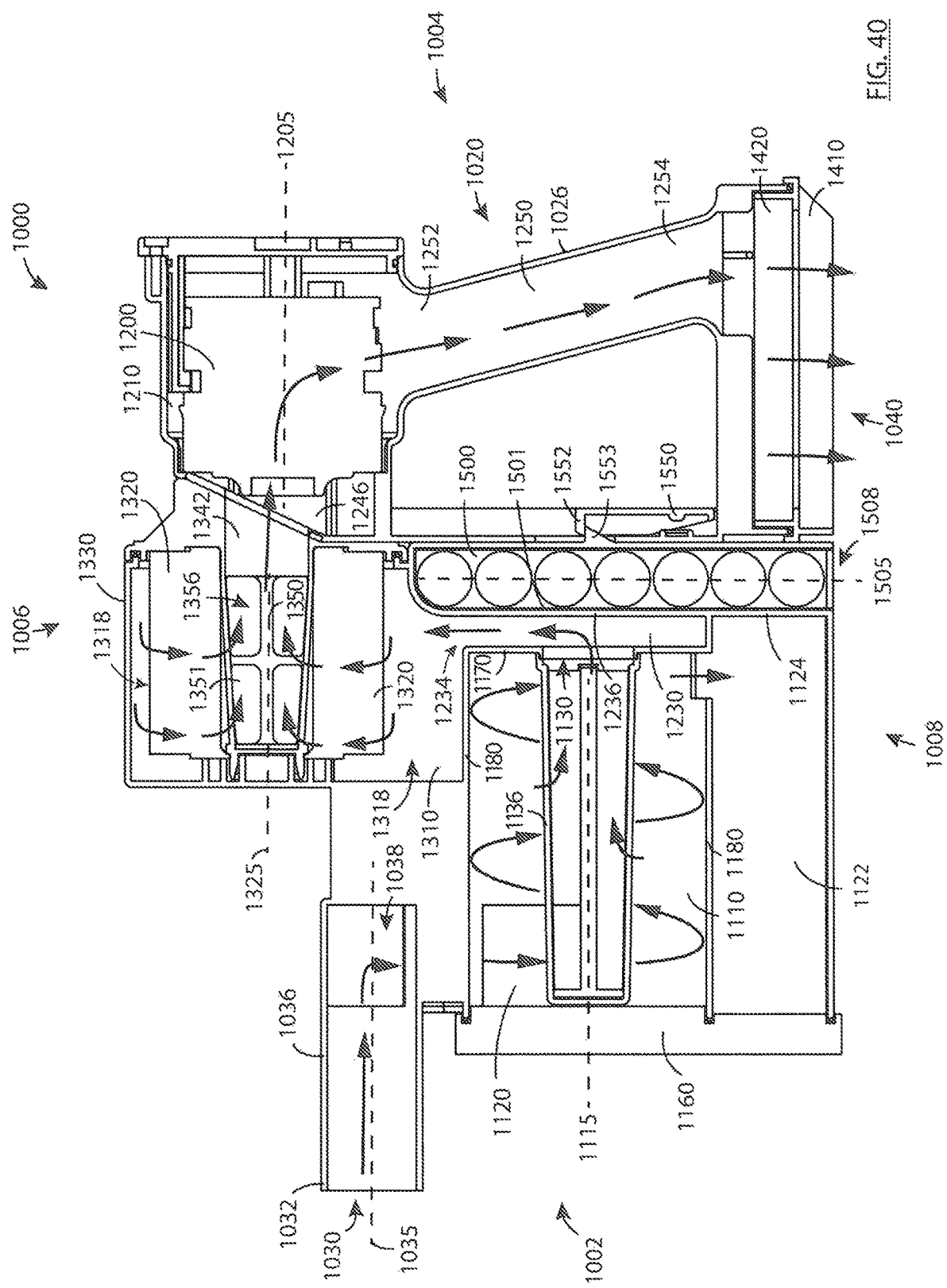
FIG. 40 is a cross-section view of the hand vacuum cleaner of FIG. 39, taken along line 40-40 in FIG. 39.
Figure 41:
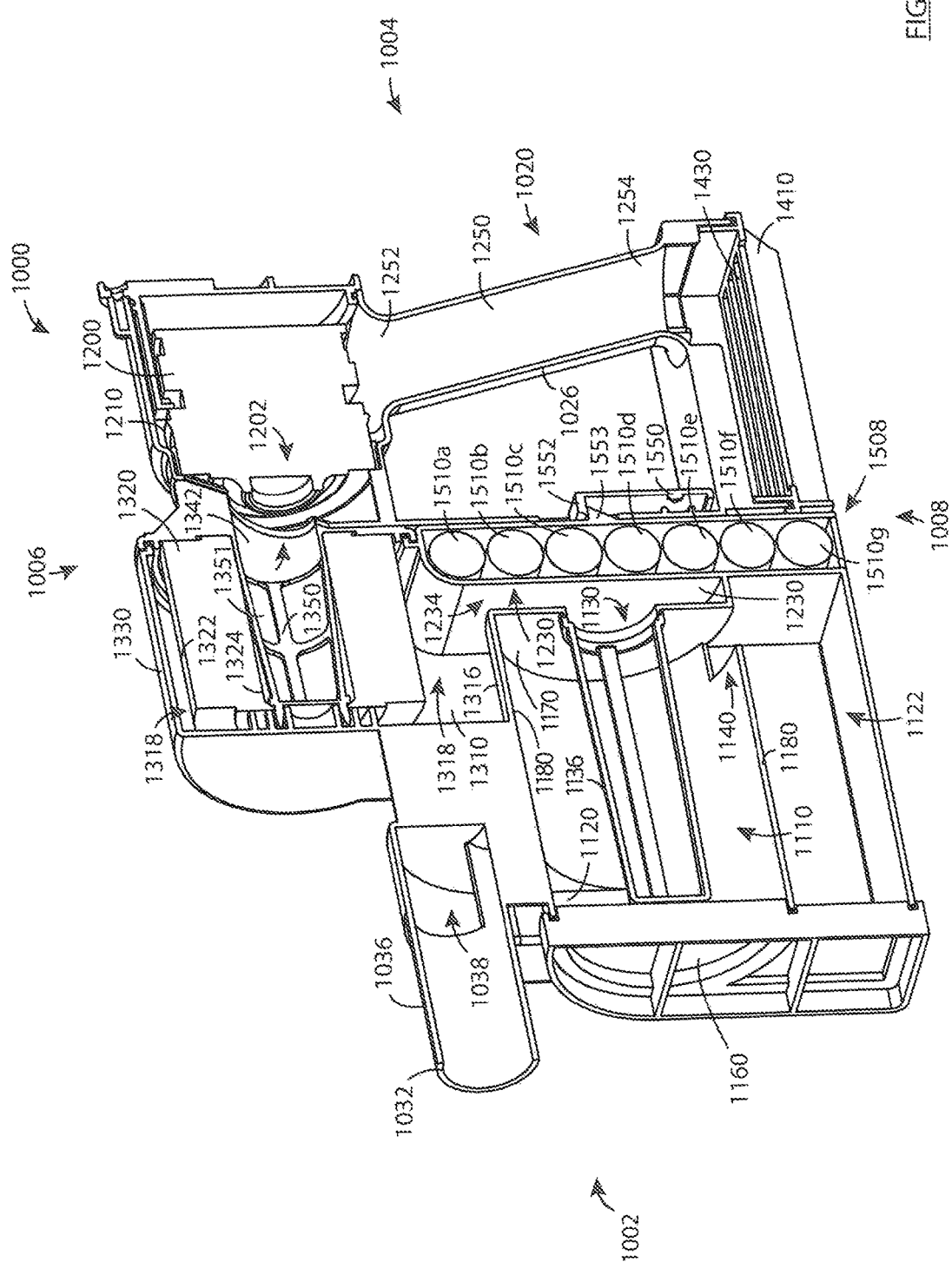
FIG. 41 is a perspective section view of the hand vacuum cleaner of FIG. 39, taken along line 40-40 in FIG. 39, with a post-motor filter removed.
Figure 42:
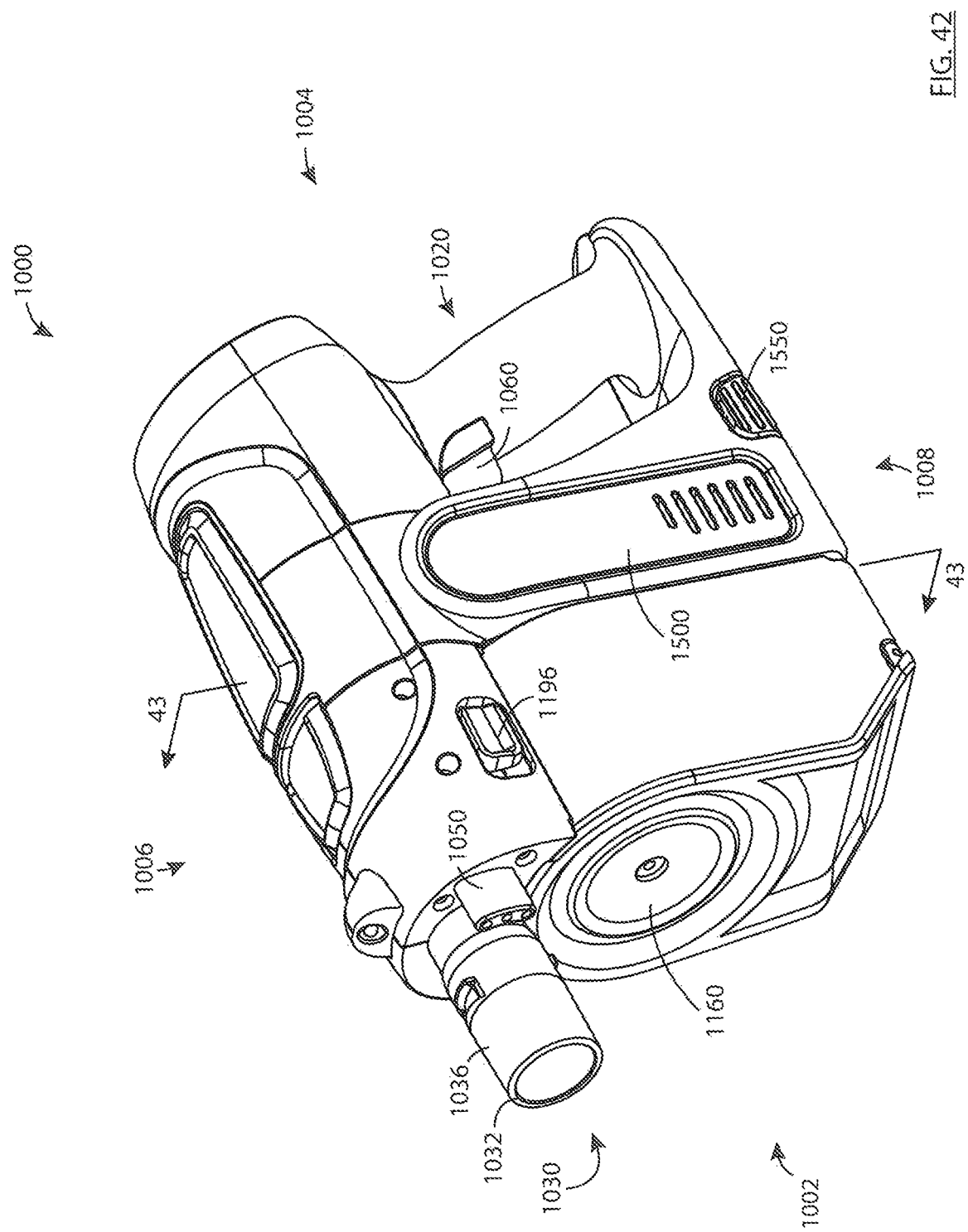
FIG. 42 is a perspective view of a hand vacuum cleaner in accordance with another embodiment.

For example, as illustrated in the embodiment of FIGS. 36 and 40, as well as the embodiment of FIG. 43, a battery pack 1500 is positioned rearward of a dirt collection region 1122, and the entire battery pack 1500 is below a rearward portion of a pre-motor filter 1320.

In the example illustrated in FIG. 47, a battery pack 1500 is positioned rearward of a dirt collection region 1122, and below a rearward portion of the cyclone chamber and below the pre-motor filter.

As discussed previously, battery pack 1500 may include any suitable number of individual battery cells, and the individual cells may be arranged in any suitable configuration. For example, some of the energy storage members (i.e. individual battery cells 1510) may be arranged one above another and some may be arranged one behind another, e.g. within a single battery pack 1500. For example, the energy storage members within a battery pack may be arranged in at least two columns in the forward/rearward direction. Accordingly, the battery pack may have a reduced height so as to assist in nesting the battery pack under a pre-motor filter and/or a cyclone chamber. An advantage of such configurations is that they may help provide a compact overall design without adversely affecting the hand feel and/or perceived balance of the hand vacuum.

Figure 47:
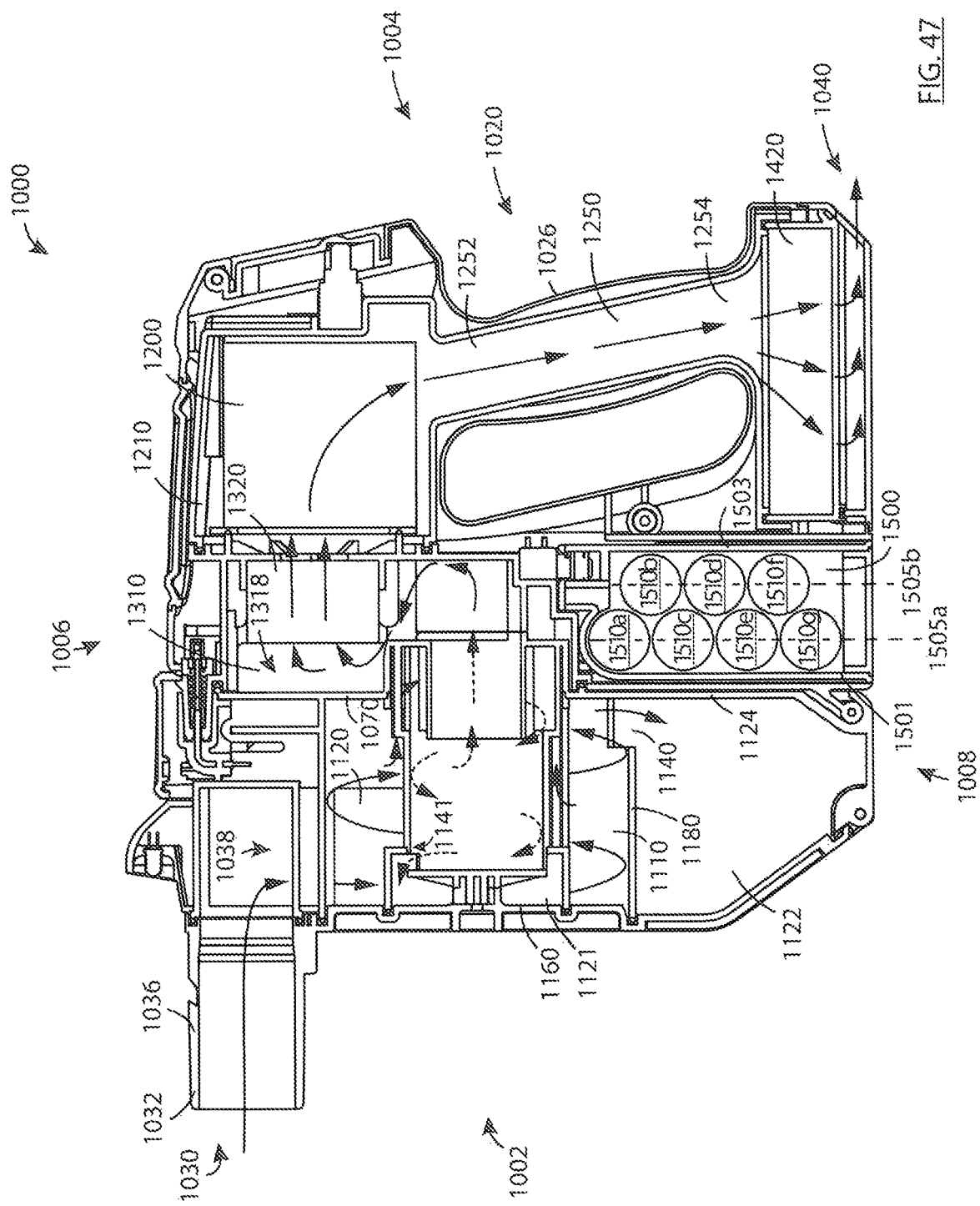
FIG. 47 is a cross-section view of the hand vacuum cleaner of FIG. 46, taken along line 47-47 in FIG. 46.
Figure 48:
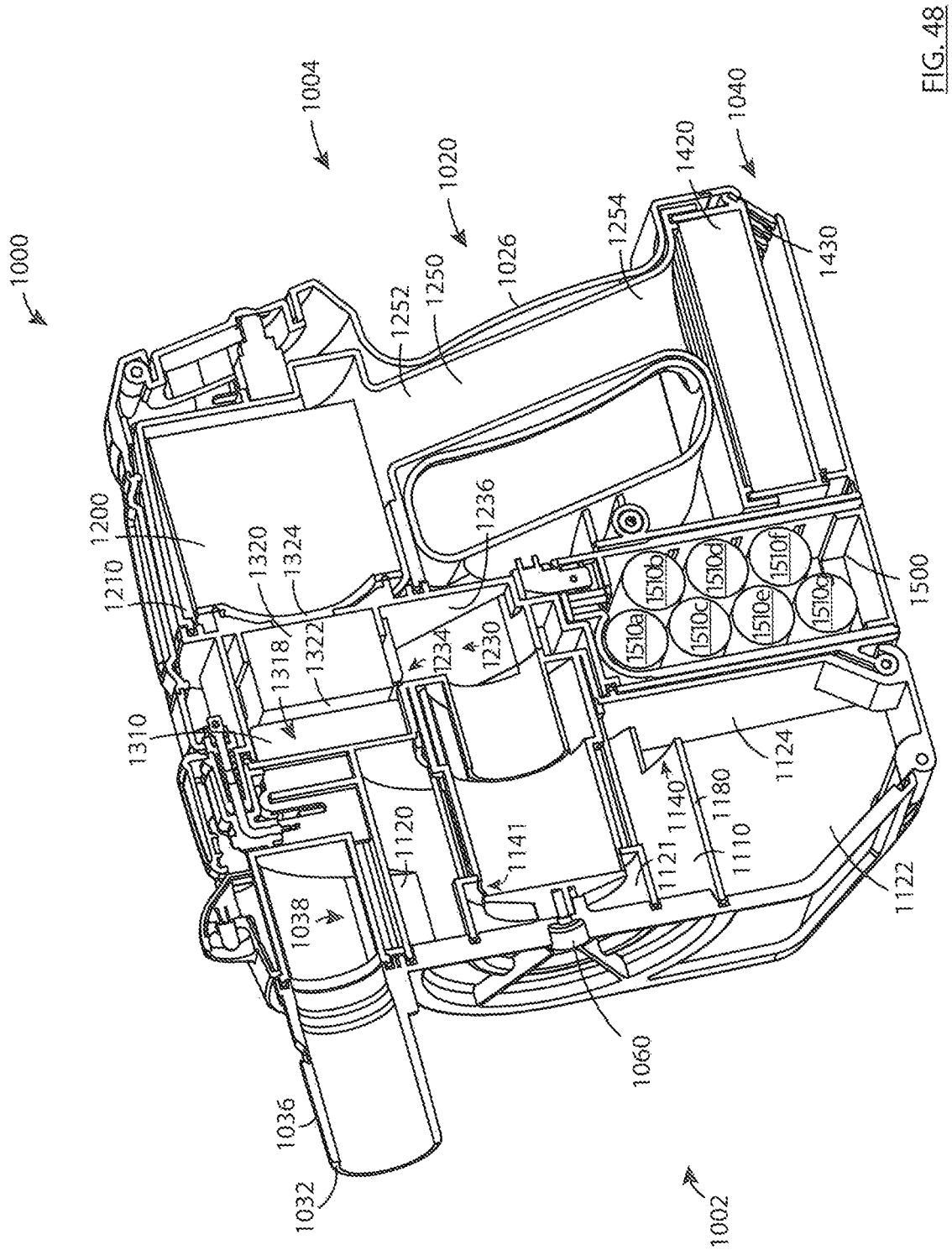
FIG. 48 is a perspective section view of the hand vacuum cleaner of FIG. 46, taken along line 47-47 in FIG. 46.
Figure 49:
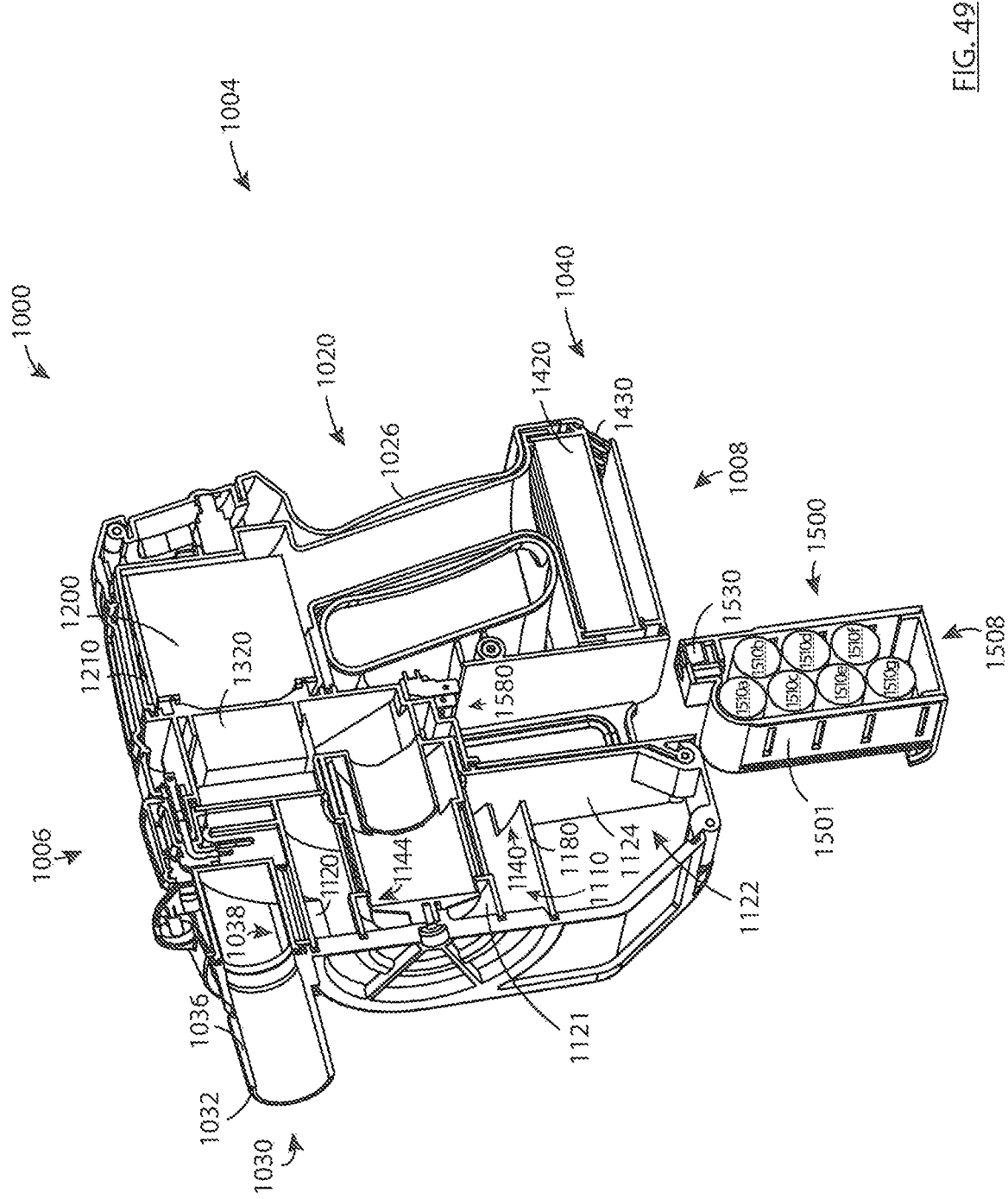
FIG. 49 is a perspective section view of the hand vacuum cleaner of FIG. 46, taken along line 47-47 in FIG. 46, with an energy storage member removed.

As illustrated in FIG. 47, cells 1510*a*-1510*g* are arranged generally in two linear columns of cells. Specifically, cells 1510*a*, 1510*c*, 1510*e*, and 1510*g* are arranged in a first generally vertical column along a column axis 1505*a* that in the illustrated example is adjacent and generally parallel to a front wall 1501 of the battery pack 1500, and cells 1510*b*, 1510*d*, and 1510*f* are arranged in a second generally vertical column along a column axis 1505*b* that in the illustrated example is adjacent and generally parallel to a rear wall 1503 of the battery pack 1500.

Figure 43:
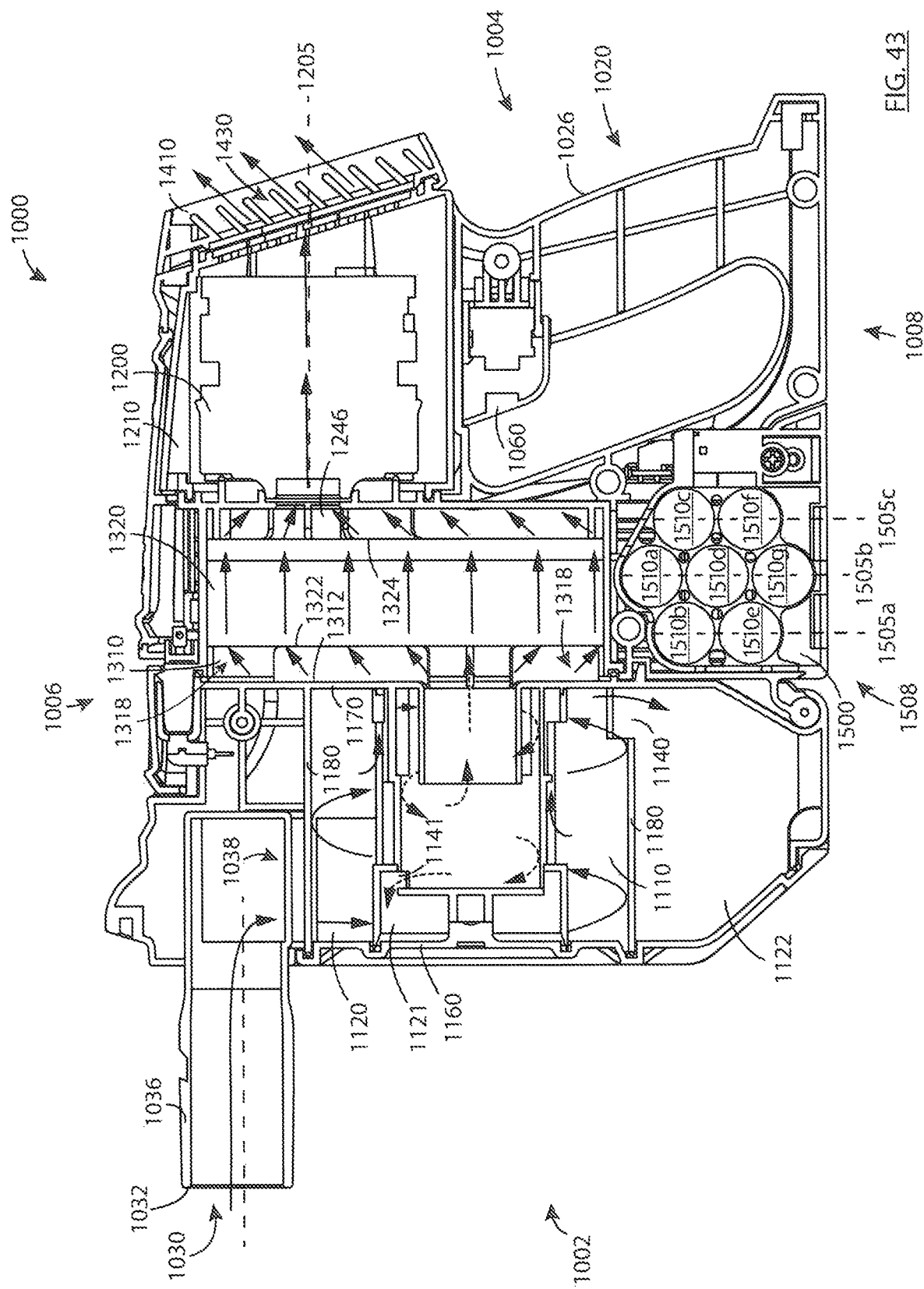
FIG. 43 is a cross-section view of the hand vacuum cleaner of FIG. 42, taken along line 43-43 in FIG. 42.
Figure 44:
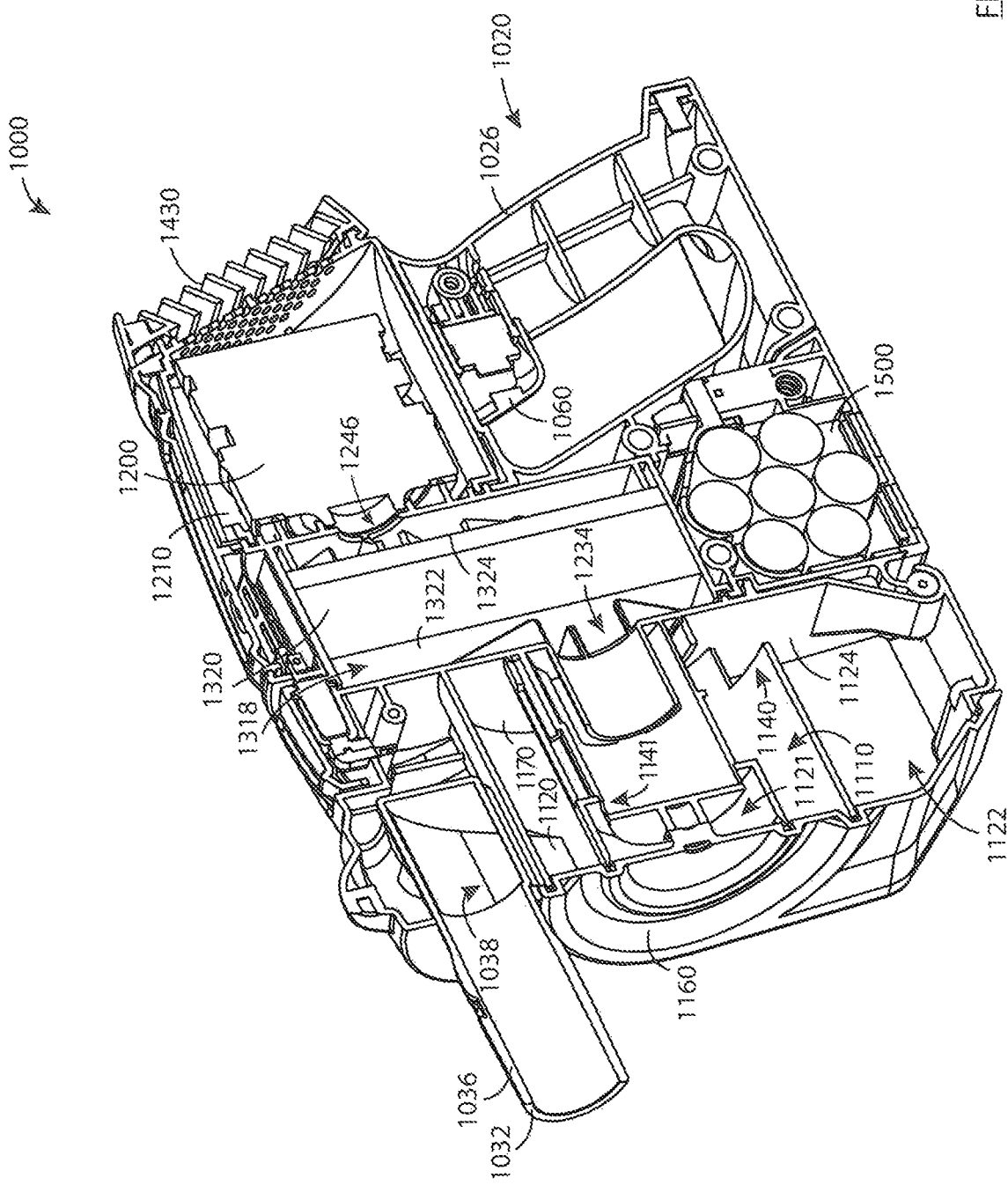
FIG. 44 is a perspective section view of the hand vacuum cleaner of FIG. 42, taken along line 43-43 in FIG. 42.
Figure 45:
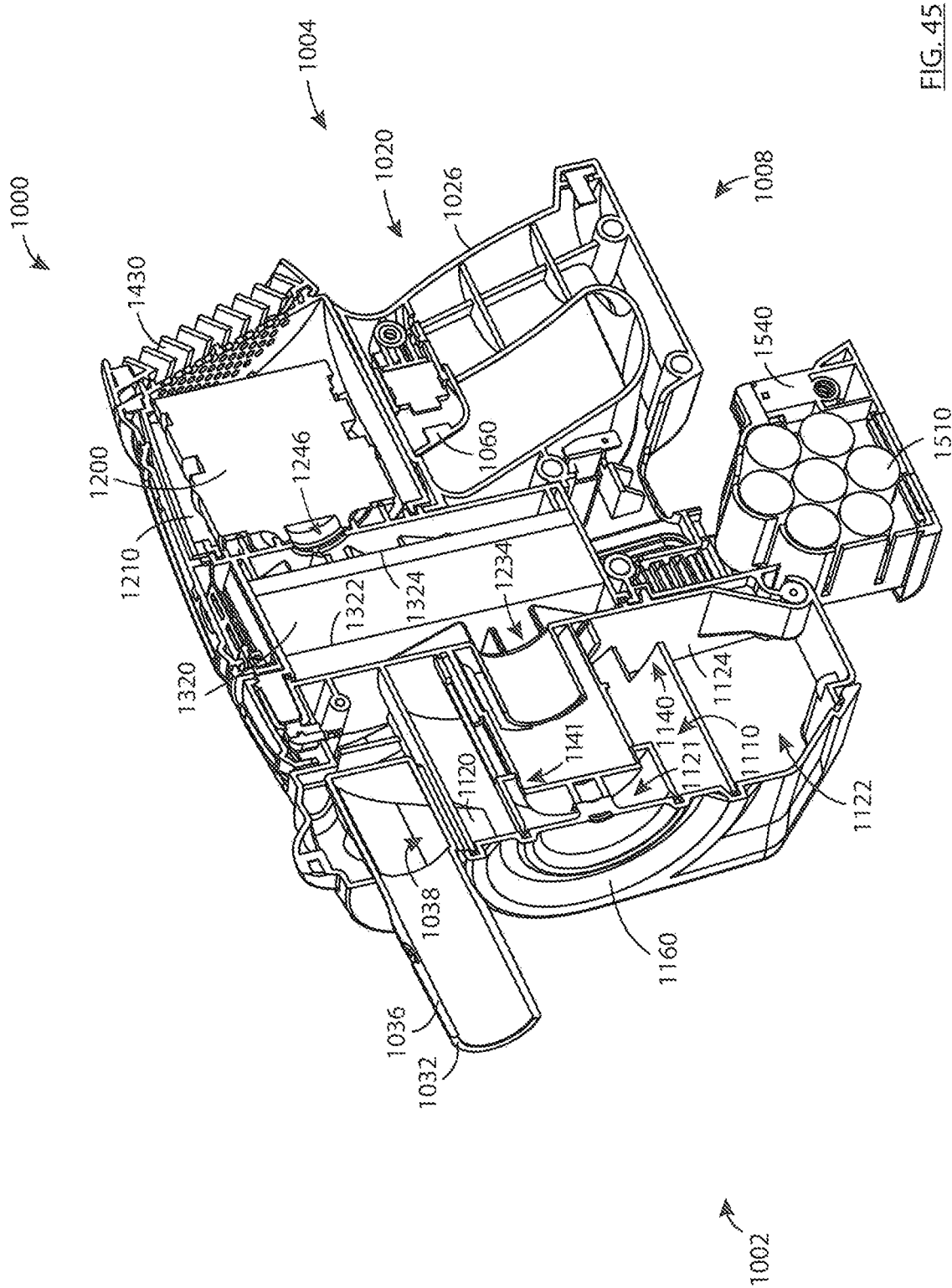
FIG. 45 is a perspective section view of the hand vacuum cleaner of FIG. 42, taken along line 43-43 in FIG. 42, with an energy storage member removed.
Figure 46:
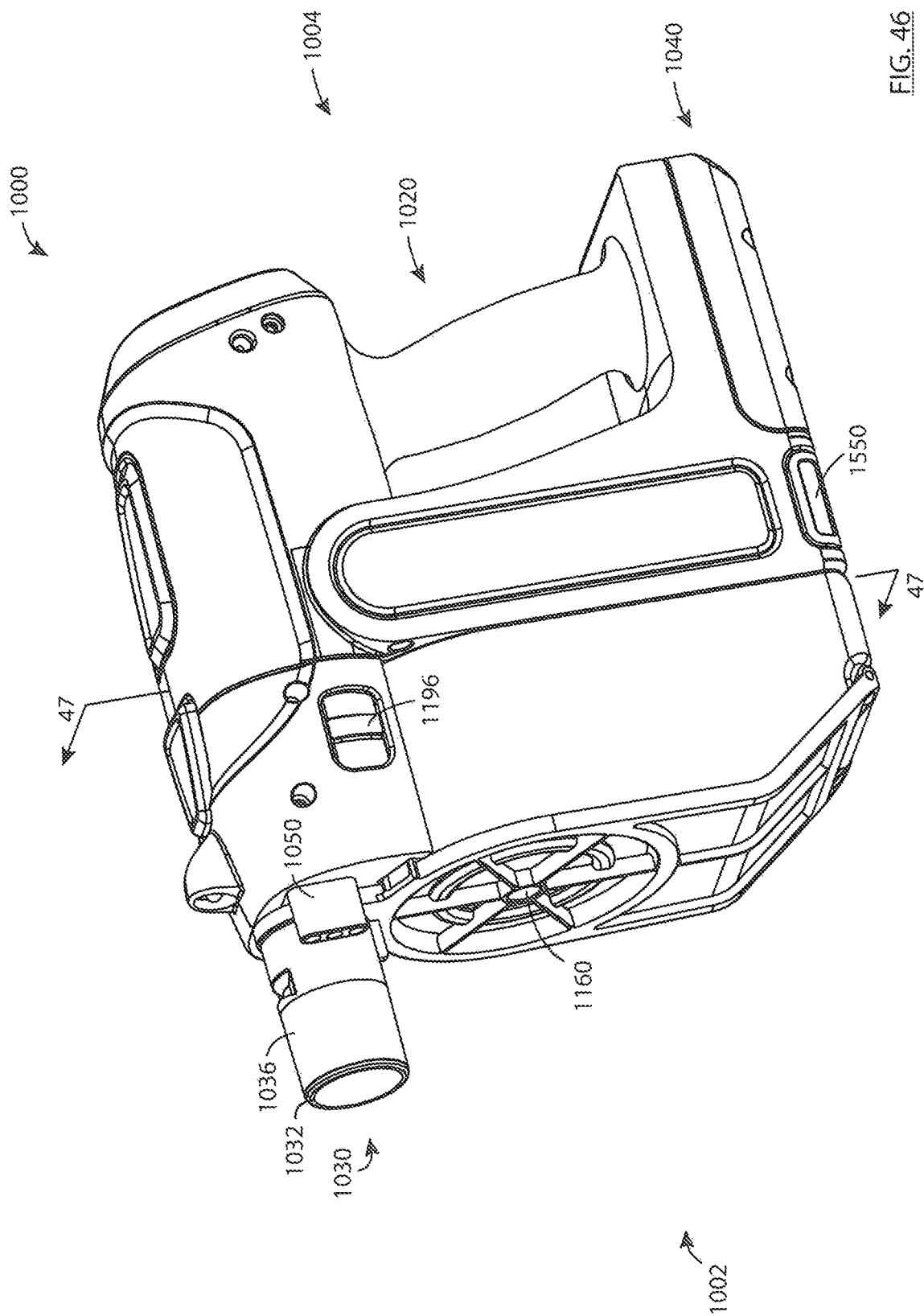
FIG. 46 is a perspective view of a hand vacuum cleaner in accordance with another embodiment.

As illustrated in FIG. 43, cells 1510*a*-1510*g* are arranged generally in three linear columns of cells. Specifically, cells 1510*b* and 1510*e* are arranged in a first generally vertical column along a column axis 1505*a* that in the illustrated example is adjacent and generally parallel to a front wall of the battery pack 1500, cells 1510*a*, 1510*d*, and 1510*g* are arranged in a second generally vertical column along a column axis 1505*b* positioned rearward of and generally parallel to column axis 1505*a*, and cells 1510*c* and 1510*f* are arranged in a third generally vertical column along a column axis 1505*c* positioned rearward of and generally parallel to column axis 1505*b*.

It will be appreciated that some of the embodiments disclosed herein may not use the nested energy storage members as disclosed herein and that, in those embodiments, any suitable positioning of the energy storage members, if provided, may be used.

Airflow Cooling of an Energy Storage Chamber

The following is a description of different features of a hand vacuum cleaner having an airflow path in which air exiting a cyclone chamber impinges on a wall of an energy storage chamber. These features may be used by themselves in any surface cleaning apparatus or in any combination or sub-combination with any other feature or features described herein. For example, any of the airflow configurations described herein may be used with any of the air flow paths, pre-motor filter assemblies, relative positioning of the suction motor and energy storage members, inclined battery packs, battery pack configurations, and other features described herein.

Optionally, at least a portion of an air flow path between the dirty air inlet 1030 and the clean air outlet 1040 may be directed against a wall of an energy storage chamber. For example, a cyclone air outlet may face a wall of an energy storage chamber, whereby air exiting the cyclone chamber impinges on the energy storage chamber wall. In such a configuration, an airflow generated by suction motor 1200 flowing against and/or over such a wall may help cool one or more energy storage members positioned within the energy storage chamber. For example, energy storage members may include chemical batteries, such as lithium-ion batteries, that produce heat while being discharged (e.g. while supplying power to the hand vacuum 1000). By directing a stream of air directly at, or at an angle to, a wall of a battery chamber, any boundary layer of air (which may act as an insulator) or laminar flow along a wall of a battery chamber is disrupted, thereby enabling enhanced cooling.

It will be appreciated that the battery pack may be provided in a chamber that receives a battery pack. Accordingly, there may be two walls between the impinging air stream and the batteries, i.e., a wall of the battery pack and a wall of the chamber in which the batter pack is received. Provided the walls contact each other or are adjacent, the impinging air stream will provide a cooling effect.

For example, in the examples illustrated in FIGS. 36 and 40, cyclone air outlet 1130 faces a rear wall 1236 of the upflow duct or conduit 1230 that directs air upwardly towards a pre-motor filter 1320. In these embodiments, rear wall 1236 is also a front wall of a recess in which battery pack 1500 is positioned. That is, rear wall 1236 is a wall of an energy storage chamber in which one or more energy storage members (e.g. individual cells 1510 and/or a battery pack 1500 containing a plurality of cells 1510) are positioned.

It will be appreciated that some of the embodiments disclosed herein may not use the airflow cooling of an energy storage member as disclosed herein and that, in those embodiments, any suitable airflow design may be used.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A hand vacuum cleaner having a front end having a dirty air inlet, a rear end, an upper end, a lower end and first and second laterally spaced apart sides and comprising:
    (a) an air flow path extending from the dirty air inlet to a clean air outlet;
    (b) a handle having a longitudinally extending hand grip portion having a longitudinally extending hand grip portion axis that is parallel to the handle and is oriented substantially vertically, an upper end of the handle is positioned forwardly of a lower end of the handle, the handle being positioned at the rear end of the hand vacuum cleaner;
    (c) a cyclone chamber positioned in the air flow path and having a cyclone air inlet, a cyclone air outlet and a cyclone axis of rotation that extends in a forward/rearward direction, wherein the cyclone axis of rotation is centrally located in the cyclone chamber;
    (d) a pre-motor filter positioned downstream of the cyclone chamber and upstream of the suction motor; and,
    (e) a suction motor positioned in the air flow path upstream of the clean air outlet, wherein the suction motor has a suction motor axis of rotation that extends in a forward/rearward direction, wherein the suction motor is located at the upper end of the handle, and wherein the suction motor axis of rotation is vertically displaced from the cyclone axis of rotation, wherein the suction motor axis of rotation and the cyclone axis of rotation are substantially parallel.

2. The hand vacuum cleaner of claim 1 wherein the suction motor is located at an upper end of the hand grip portion.

3. The hand vacuum cleaner of claim 2 wherein the cyclone axis of rotation intersects the hand grip portion.

4. The hand vacuum cleaner of claim 1 wherein the suction motor is located rearward of the cyclone chamber.

5. The hand vacuum cleaner of claim 1 wherein the suction motor has an inlet that faces towards the pre-motor filter.

6. The hand vacuum cleaner of claim 1 wherein the suction motor axis of rotation intersects a volume defined by a pre-motor filter housing.

7. The hand vacuum cleaner of claim 6 wherein the pre-motor filter is positioned above the cyclone axis of rotation.

8. The hand vacuum cleaner of claim 1 wherein the suction motor axis of rotation extends through a central portion of a volume containing the pre-motor filter.

9. The hand vacuum cleaner of claim 1 wherein the pre-motor filter is positioned above the cyclone axis of rotation.

10. The hand vacuum cleaner of claim 1 wherein the pre-motor filter is positioned above the cyclone chamber.

11. The hand vacuum cleaner of claim 1 wherein the cyclone axis of rotation intersects the hand grip portion, the pre-motor filter is positioned above the cyclone axis of rotation and the suction motor axis of rotation extends through a pre-motor filter housing.

12. The hand vacuum cleaner of claim 1 wherein the pre-motor filter comprises a generally cylindrical filter having a hollow interior wherein the suction motor axis of rotation intersects the hollow interior.

13. The hand vacuum cleaner of claim 12 wherein, after exiting a downstream side of the pre-motor filter, air travels generally linearly to the suction motor.

14. The hand vacuum cleaner of claim 1 wherein, after exiting a downstream side of the pre-motor filter, air travels generally linearly to the suction motor.

15. The hand vacuum cleaner of claim 1 wherein the pre-motor filter comprises a generally cylindrical filter having a hollow interior wherein the dirty air inlet has a dirty air inlet axis that extends generally rearwardly and intersects the hollow interior.

16. The hand vacuum cleaner of claim 15 wherein the dirty air inlet axis intersects the suction motor.

17. The hand vacuum cleaner of claim 16 wherein the cyclone axis of rotation intersects the hand grip portion.

18. The hand vacuum cleaner of claim 17 further comprising a plurality of energy storage members wherein at least some of the plurality of energy storage members are arranged one above another in a generally upwardly extending configuration, and the suction motor is positioned rearward of at least some of the energy storage members.

19. The hand vacuum cleaner of claim 1 further comprising a plurality of energy storage members wherein at least some of the plurality of energy storage members are arranged one above another in a generally upwardly extending configuration and the suction motor is positioned rearward of at least some of the energy storage members.

* * * * *